(12) United States Patent
Galstian et al.

(10) Patent No.: US 9,036,102 B2
(45) Date of Patent: May 19, 2015

(54) IMAGE STABILIZATION AND SHIFTING IN A LIQUID CRYSTAL LENS

(75) Inventors: Tigran Galstian, Québec (CA);
Vladimir Presniakov, Québec (CA);
Karen Asatryan, Québec (CA); Armen Zohrabyan, Quebec (CA)

(73) Assignee: LensVector Inc., Sunnyvale, CA (US)

( * ) Notice: Subject to any disclaimer, the term of this patent is extended or adjusted under 35 U.S.C. 154(b) by 241 days.

(21) Appl. No.: 13/517,189

(22) PCT Filed: Dec. 23, 2010

(86) PCT No.: PCT/CA2010/002023
§ 371 (c)(1),
(2), (4) Date: Jun. 19, 2012

(87) PCT Pub. No.: WO2011/075834
PCT Pub. Date: Jun. 30, 2011

(65) Prior Publication Data
US 2012/0257131 A1 Oct. 11, 2012

Related U.S. Application Data

(60) Provisional application No. 61/289,995, filed on Dec. 23, 2009.

(51) Int. Cl.
*G02F 1/133* (2006.01)
*G02F 1/13* (2006.01)
(Continued)

(52) U.S. Cl.
CPC ...... *G02F 1/134309* (2013.01); *G02F 1/13471* (2013.01); *G02F 1/135* (2013.01); *G02F 2001/294* (2013.01); *G02F 2203/06* (2013.01)

(58) Field of Classification Search
USPC ...................... 349/33, 36, 200–202
See application file for complete search history.

(56) References Cited

U.S. PATENT DOCUMENTS 7,859,640 B2 * 12/2010 Galstian et al. ............... 349/200
8,033,054 B2 * 10/2011 Galstian et al. ................ 49/57
(Continued)

FOREIGN PATENT DOCUMENTS

JP 2006-091392 A 4/2006
JP 2006-91826 A 4/2006
(Continued)

OTHER PUBLICATIONS

Search report and search opinion for EP application 10838467.8 dated on Oct. 23, 2013 with related claims 1-17.
(Continued)

*Primary Examiner* — Dung Nguyen
(74) *Attorney, Agent, or Firm* — Anglehart et al.

(57) ABSTRACT

Variable liquid crystal devices for controlling the propagation of light through a liquid crystal layer use a frequency dependent material to dynamically reconfigure effective electrode structures in the device. The frequency of a drive signal that generates an electric field in the device can be varied, and the frequency dependent material has different charge mobilities for the different frequencies. At a low charge mobility, the frequency dependent material has little effect on the existing electrode structures. However, at a high charge mobility, the frequency dependent material appears as an extension of the fixed electrodes, and can be used to change the effective electrode structure and, thereby, the spatial profile of the electric field. This, in turn, changes the optical properties of the liquid crystal, thus allowing the optical device to be frequency controllable.

14 Claims, 40 Drawing Sheets

(51) Int. Cl.
*G02F 1/1343* (2006.01)
*G02F 1/135* (2006.01)
*G02F 1/1347* (2006.01)
*G02F 1/29* (2006.01)

(56) References Cited

U.S. PATENT DOCUMENTS

| | | |
|---|---|---|
| 2002/0102100 A1 | 8/2002 | Kasuya |
| 2007/0139333 A1 | 6/2007 | Sato et al. |
| 2007/0229754 A1 | 10/2007 | Galstian et al. |
| 2007/0229934 A1 | 10/2007 | Makii |
| 2009/0096999 A1 | 4/2009 | Frahm et al. |
| 2009/0245074 A1 | 10/2009 | Tseng |
| 2010/0289941 A1 | 11/2010 | Ito et al. |
| 2011/0216257 A1 | 9/2011 | Galstian et al. |

FOREIGN PATENT DOCUMENTS

| | | |
|---|---|---|
| JP | 2006-313248 A | 11/2006 |
| JP | 2007-264153 A | 10/2007 |
| JP | 2008-310101 A | 12/2008 |
| JP | 2009-188973 A | 8/2009 |
| WO | 2007/098602 A1 | 9/2007 |
| WO | WO 2009/146530 A1 | 12/2009 |
| WO | WO 2009/153764 A2 | 12/2009 |

OTHER PUBLICATIONS

A.F.Naumov et al., Control optimization of spherical modal liquid crystal lenses, Optics Express, pp. 344-352, Apr. 26, 1999, vol. 4, No. 9.

PCT/CA2010/002023 international preliminary report.

PCT/CA2010/002023 international search report.

Nicolas Fraval et al., Liquid crystal lens auto-focus extended to optical image stabilization for wafer level camera, Proc. SPIE 7930, MOEMS and Miniaturized Systems X, 793009, Feb. 14, 2011.

Office action of JP2012-545032 dated Apr. 15, 2014 with related claims.

* cited by examiner

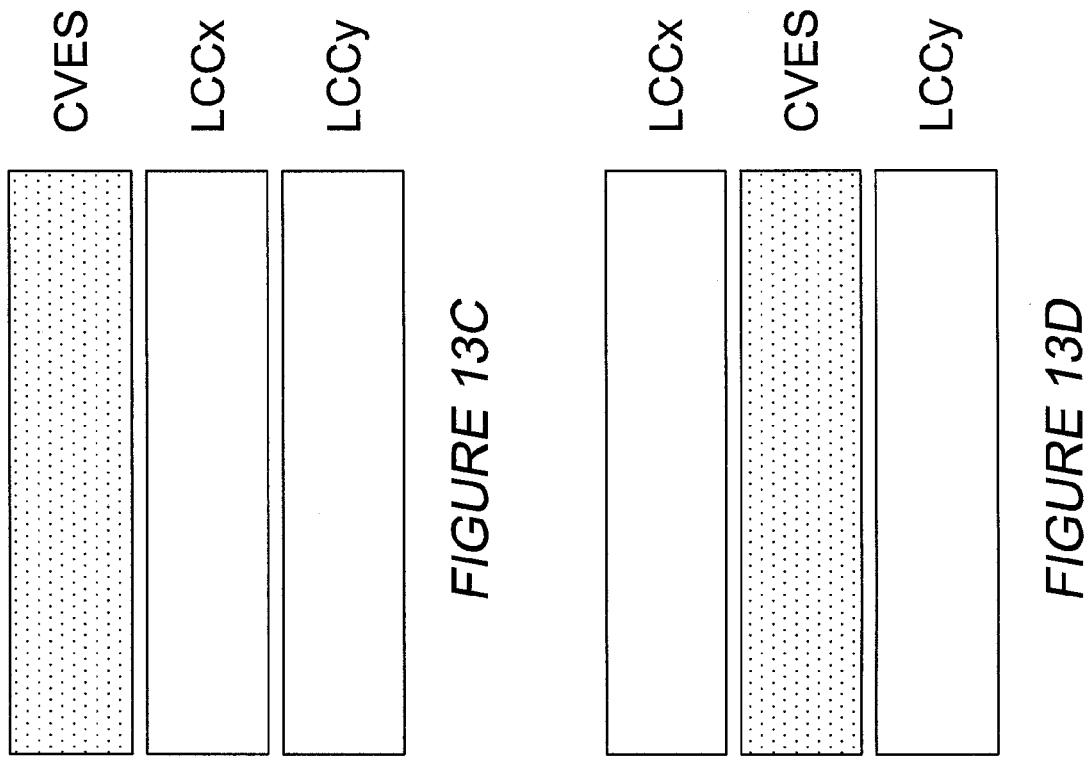
*FIGURE 13C*
*FIGURE 13D*
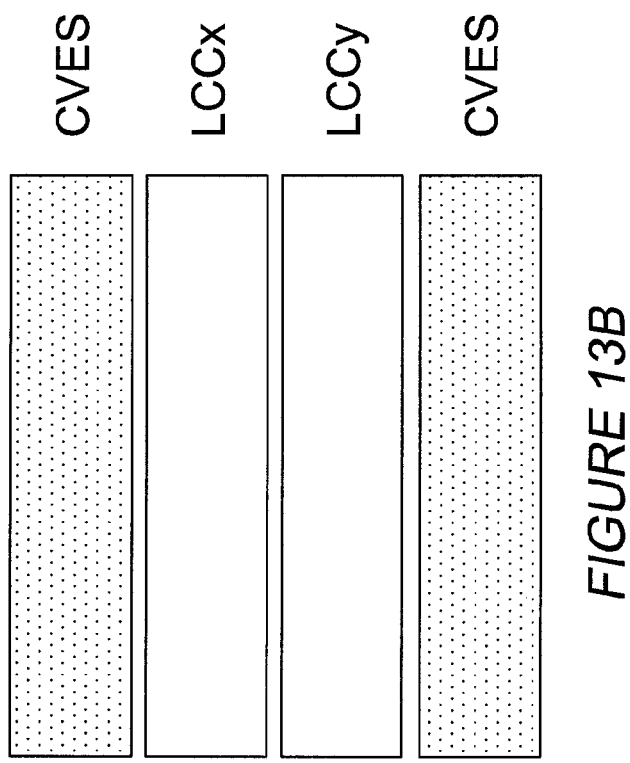
*FIGURE 13B*

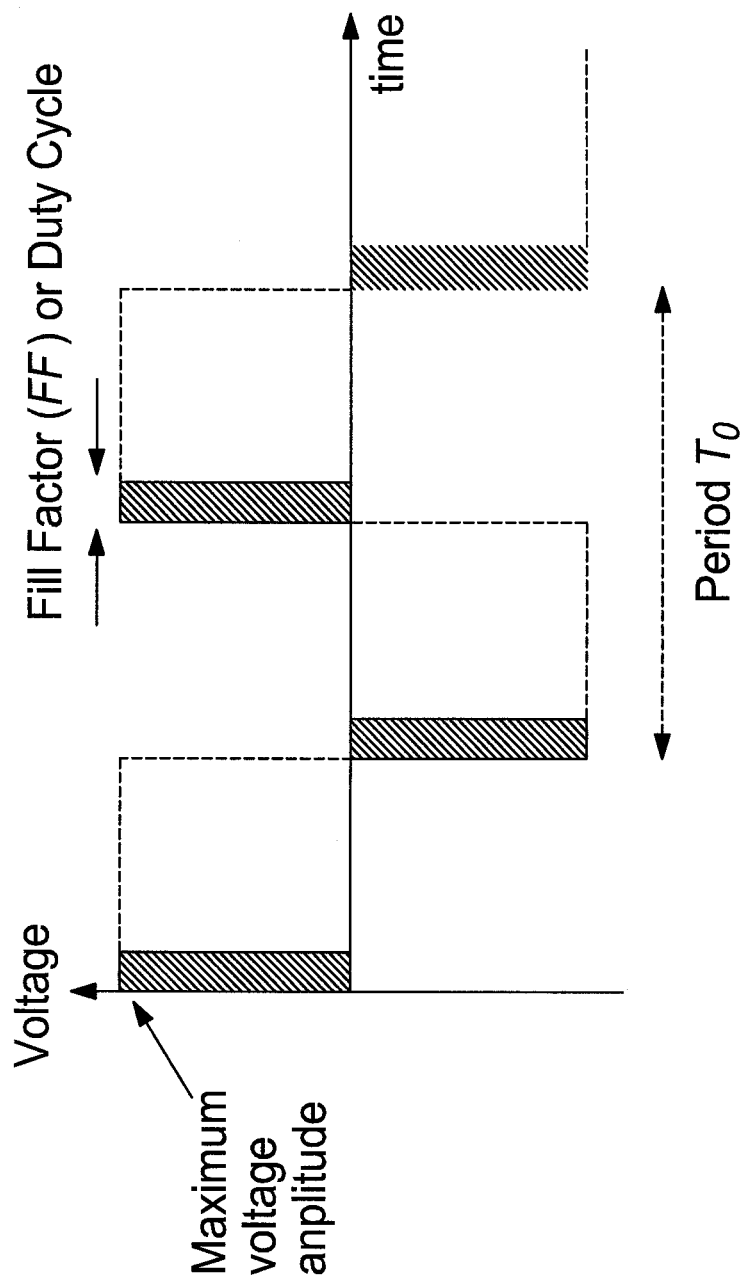

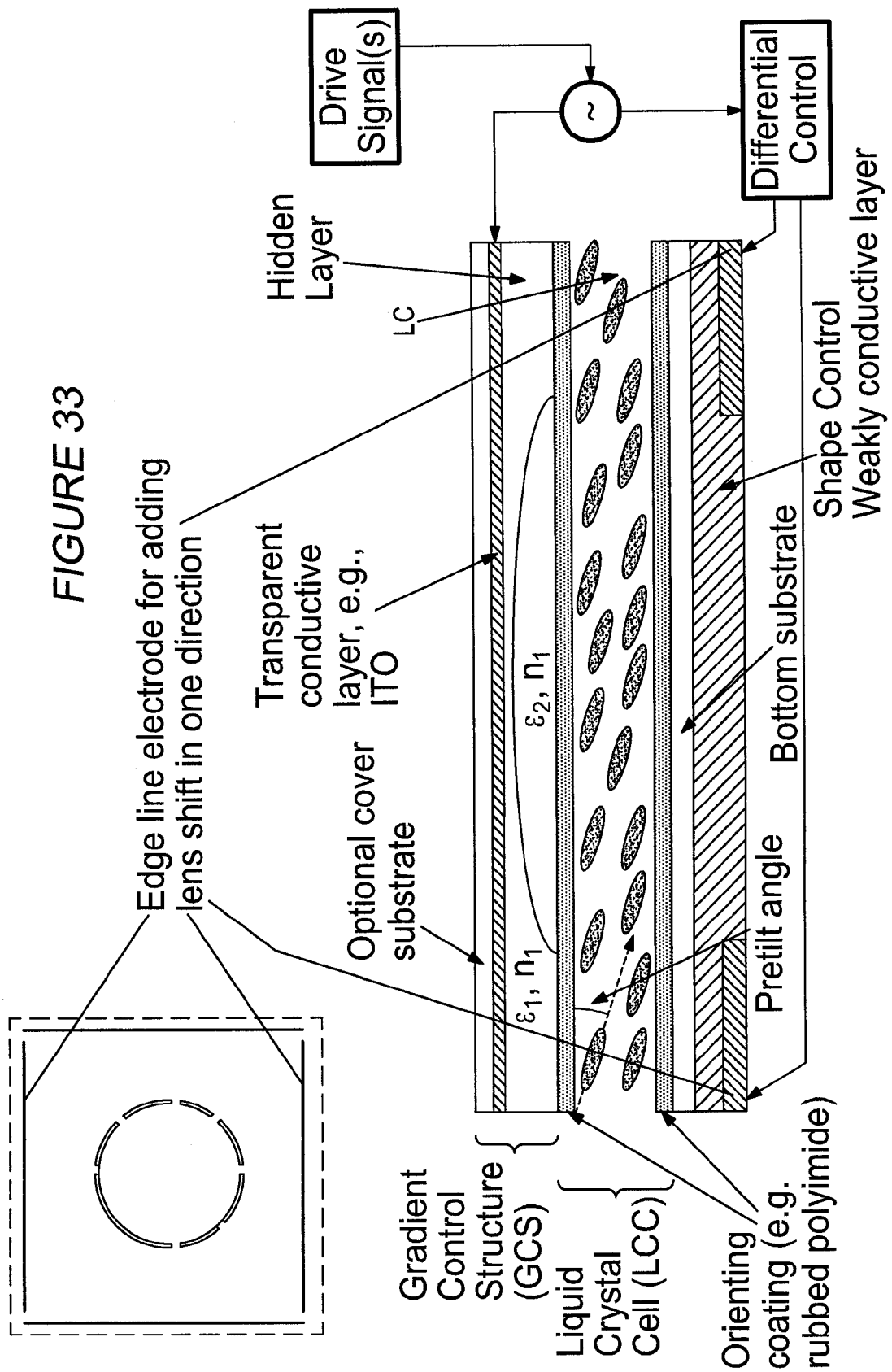

IMAGE STABILIZATION AND SHIFTING IN A LIQUID CRYSTAL LENS

TECHNICAL FIELD

The present application is directed to liquid crystal lens devices.

BACKGROUND OF THE INVENTION

Tunable liquid crystal lenses are described for example, in commonly-owned PCT patent application WO2009/153764 published Dec. 23, 2009 wherein a tunable liquid crystal lens uses a frequency dependent material (as defined therein) to shape an electric field and a corresponding refractive index gradient within a liquid crystal cell, suitable for creating a lens.

In the article titled "Liquid crystal lens with focus movable in focal plane" by Ye et al. published in Optics Communications, 259 (2006) 710-722, there is disclosed a liquid crystal lens in which the optical axis of the lens is movable by controlling the relative amplitudes of control signals applied to each quadrant of a four segment hole-patterned electrode. The lens arrangement uses the segmented electrode below a planar electrode, both electrodes which are fed a control signal to define the electric field as a function of relative amplitudes of fixed frequency control signals applied to the upper planar electrode and the lower segmented electrodes with respect to a bottom planar electrode. Experimental results demonstrating the effect of varying the relative amplitudes, show a shifting or change in the optical axis of the liquid crystal lens.

Tunable liquid crystal (LC) optical devices, such as lenses, operate with a uniform electric or magnetic control field, most use a spatially modulated field. Employing electric fields, there are a few prior art techniques used to spatially modulate the electric field. Spatially inhomogenous dielectric layers have been used to attenuate the electric field to provide a desired spatial profile. Electrodes have been spherically shaped to provide a desired electric field spatial profile. Another approach to spatially modulating the electric field is to use a planar electrode whose impedance properties are such that the voltage drop over the electrode as AC drive current is fed to the electrode leads to a spatially modulated electric field.

As shown in FIG. 1, one type of conventional LC cell is built by sandwiching the liquid crystal 102 between two substrates 104,106, each of which is first coated with (by) a transparent electrode 108, 110, which can be a layer of material such as indium tin oxide (ITO), and then coated by polymer layers 112 (typically polyimide) which are rubbed in a predetermined direction to cause alignment of LC molecules in a ground state, namely in the absence of a controlling electric field. The application of voltage to two ITO layers creates a uniform electric field and correspondingly uniform LC molecular reorientation which correspondingly provides a uniform refractive index distribution across the LC layer. In such a device, the index of refraction is different in a direction lengthwise with respect to the molecules than in a direction transverse to the molecules.

FIG. 2 illustrates a prior art LC cell configuration, in which a hole patterned electrode ring 204 of low resistivity surrounding a disk-shaped zone 205 of high resistivity material is used to generate an electric field gradient. This geometry has the advantages of being very thin (which is a key requirement, e.g., in cell phone applications) and of using only two electrodes (and thus one voltage control drive signal). Unfortunately, it is difficult to produce the required thickness of high resistivity material with high optical transparency, as well it is hard to produce an LC cell with good uniformity, and the manufacturing process typically has a low yield. Different lenses will have slightly different electrode resistances and this, coupled with the fact that the required control is also very dependent on the precise cell thickness, means that each individual lens needs to be calibrated separately. Also, the minimum diameter of a modal lens is limited to about 2 mm—below this size the required resistivity of the ITO layer exceeds some 10 MΩ/sq. Finally, such (so called "modal control") lenses must always be either positive or negative. It is not possible to switch between a diverging and converging lens.

FIG. 3 illustrates another prior art LC cell configuration with electric field gradient generation. Three distinct electrodes 304, 305, 307 (two of them in the inter-hole pattern formed on the same plane), and two voltages V1 and V2 are used with an additional distinct weakly conductive layer (WCL) 306. The role of the external hole patterned electrode 304 (with voltage V1 applied thereto) is to create a lens-like electric field profile, while the role of the central disk-shaped electrode 305 (with voltage V2 applied thereto) is to (avoid) reduce disclinations and to control the value of the gradient (e.g., to erase the lens). The role of the WCL 306 is to soften the profile created by V1 and to allow for the reduction of the overall thickness of the lens. Unfortunately, the complex patterning of the top electrode, the necessity of using two distinct voltages and a separate WCL are difficult to manufacture and inhibit the practical use of this approach. For example, the use of this approach to build a polarization independent lens would require the use of six to seven thick glass elements, which is a difficult task.

SUMMARY OF THE INVENTION

It is an object of the proposed solution to provide improved (efficient) control over the movement of the focus of a tunable liquid crystal lens.

It has been discovered that improved (efficient) control of an electric field generated using a frequency dependent material can be provided using a segmented electrode to control the movement of the focus of the resulting lens.

It has been discovered that the optical axis of a liquid crystal lens can be moved using a controllable heat source by affecting at least one of the electric field modulation and the liquid crystal.

It has been discovered that the optical axis of a liquid crystal lens can be moved using a controllable pressure source affecting (acting on) substrates of the liquid crystal lens structure. A suitable pressure source can be piezoelectric or a fluid-filled cell actuated by a heat source.

Shifting or changing the optical axis in a lens forming part of a lens arrangement for a camera is useful for image stabilization, for example: to compensate for camera vibration, image or lens position adjustment to provide alignment with other lens elements, angularly adjusting a lens (pitch and turn/pan and tilt), and provide image movement to achieve sub-pixel imaging using a discreet pixel imaging sensor. Thus, the optical axis adjustment mechanism can be set once, adjusted prior to image acquisition or dynamically adjusted during image acquisition, as required for the given application. In the case of dynamic control, adjustment of the optical axis can be provided via a vibration sensor achieved using an accelerometer sensor or by analyzing acquired images to determine camera movement.

In accordance with the proposed solution, a variable optical device is provided for controlling the propagation of light passing therethrough, where the device makes use of a frequency dependent material and an electrical signal generator that generates a drive signal having a plurality of different frequencies. The device includes a liquid crystal (LC) layer through which the light passes, the LC layer controlling light propagation. An electrode system is also provided that is connected to the electrical signal generator and arranged to generate an electric field that acts on the LC layer to alter its optical properties. The electrical signal generator generates a drive signal having a plurality of different frequencies and supplies the drive signal to the electrode system so as to generate the electric field. The frequency dependent material is located in the device so that it interacts with the electric field. This frequency dependent material has a charge mobility that is dependent on a frequency of the drive signal applied to it such that a variable electric field spatial profile is provided as a function of the drive signal frequency, spatially modulated electric field which is employed in turn to alter the properties of the LC layer. "Charge mobility" is used herein to describe the property of the frequency dependent material instead of "conductivity". At low frequencies, some frequency dependent materials exhibit high charge mobility as the time for the charge to flow within the frequency dependent material is longer. Similarly, at higher frequencies the short time that the electric potential is available in each positive or negative cycle results in low charge mobility. Thus "charge mobility" is used to refer to the overall ability of charge to flow within the frequency dependent material within the constraints of the alternating electric signal applied.

In some embodiments, the electrode system comprises a fixed conductor electrode connected to a body of frequency dependent material. The electric field can have a portion substantially defined by the fixed conductor electrode, and a portion defined by the frequency dependent material. The electric field can also be substantially defined by the frequency dependent material. The electrode system can have a fixed conductor electrode whose electric field is shaped by a body of frequency dependent material that is not connected to the fixed conductor electrode.

In some embodiments, the electrode system can be made using elements having a substantially flat layer geometry.

The electrode system can also be essentially optically hidden and thus can not interfere with the propagation of light through the optical device.

In some embodiments, the electrode system can comprise a patterned electrode in contact with a layer of frequency dependent material.

In some embodiments, the device is a tunable focus lens. The lens can be refractive or diffractive.

In some embodiments, the device includes a variable frequency control signal circuit configured to cause the device to control the propagation of light as a function of control signal frequency.

The use of a frequency dependent material and a drive signal of different frequencies allows for a variety of different embodiments of the optical device. Some examples of variations are the number, shape and configuration of electrodes, the number of different frequency dependent materials and their positions relative to the electrodes and to each other, the application of different drive signal frequencies and voltages and the use of additional materials in the optical device structure.

In one embodiment, the drive signal comprises a single frequency, the frequency being used to change the optical characteristics of the device. This can be done without any significant variation in the drive signal voltage amplitude, or it can also include changes in signal amplitude. In another embodiment, a plurality of drive signal components of different frequencies are mixed together and applied simultaneously to create a particular interaction with the frequency dependent layer and, correspondingly, to create a desired electric field profile.

In accordance with the proposed solution a frequency dependent material is used in conjunction with different drive signal frequencies in order to change an effective electrode structure within the optical device. The electrode structure determines the electric field profile which, in turn, determines the optical properties of the LC layer.

The frequency dependent material can be selected to exhibit different charge mobility at different frequencies such that, at different frequencies, it can selectively (controllably) appear as a conductive or as a non-conductive material. For frequencies at which it appears as a conductor (high charge mobility), the frequency dependent material can create an effective electrode structure that is positioned differently than one of the fixed electrodes. However, for frequencies at which charge mobility in the frequency dependent material is relatively low, it does not appear as a conductor, and the effective electrode structure is determined by the actual position of the fixed electrodes. Thus, with proper positioning of a frequency dependent material, and the selection of different drive frequencies, the effective conductor configuration can be altered and the optical properties of the LC layer can be dynamically changed.

In one group of embodiments, a frequency dependent material is used in conjunction with a patterned electrode that (in the absence of a different electrode structure) would create a spatially non-uniform electric field. Such a structure can be used for creating a particular characteristic in the LC layer, such as a lens structure, resulting from a non-uniform reorientation of the LC molecules by the spatially modulated electric field. In such an embodiment, however, it can also be desirable to create a spatially uniform electric field so as to provide an initial common alignment tendency to all of the LC molecules (e.g., to avoid disclinations). In this embodiment of the proposed solution, the frequency dependent material can be located such that, when a frequency of the drive signal is selected that provides a high degree of charge mobility (which allows charges to travel larger distances) in the frequency dependent material, an effective electrode structure is created that causes the spatial profile of the electric field to be substantially uniform. For example, the patterned electrode could be a ring electrode, the space in the center of the electrode being filled with the frequency dependent material. In such a case, the application of a drive signal at a first frequency, such as a relatively high frequency for which there is little charge mobility (i.e., relatively small distances traveled by charges) in the frequency dependent material, results in limited (no) effective extension of the electrode surface. A non-uniform (spatially modulated) electric field is generated by the ring electrode structure of the patterned electrode, and the spatially modulated electric field is applied to the LC layer. However, applying a relatively low frequency at which the frequency dependent material has a relatively high amount of charge mobility, causes the frequency dependent material to appear as an extension of the ring electrode, and the effective electrode structure becomes substantially planar. As such, the generated electric field is (essentially) substantially uniform.

In the foregoing embodiment, other shapes can be used for the fixed patterned electrode as described in commonly assigned U.S. Provisional Patent application 61/289,995 filed 23 Dec. 2009 which is incorporated herein by reference.

In another embodiment of the proposed solution, the variable optical device includes a central layer positioned between two LC layers, the central layer including a particular geometric arrangement of a fixed electrode, such as a hole patterned electrode, and a frequency dependent material, and functions as a gradient control layer by shaping the electric field seen by each of the LC layers in a symmetrical way. Each of the liquid crystal layers can have a different direction of LC molecular orientation in the ground state. Electrodes to which the drive signal is applied, are located, respectively, adjacent to each LC layer, to the side away from the central layer. Electric field shaping is dependent on the frequency of the drive signal, which determines the extent of charge mobility in the common frequency dependent layer. At a frequency corresponding to low charge mobility, the gradient control layer shapes the electric field according to the shape of the fixed central layer electrode. At a frequency corresponding to high charge mobility, however, the frequency dependent layer creates an effective electrode surface, and the gradient control layer shapes the electric field according to an overall electrode geometry of the central layer resulting from the fixed electrode and the frequency dependent layer together.

In another embodiment of the invention, the optical device has a plurality of frequency dependent materials that have differing amounts of charge mobility at certain frequencies. These materials can be arranged together in a particular geometrical configuration to create a dynamically adjustable effective electrode structure shape. For example, the two frequency dependent materials can be located in a common layer with one of the materials having a lens-like (lenticular) shape and being surrounded by the other. With this common frequency dependent material layer and a LC layer being located together between two planar electrodes, the electric field profile can be changed by changing the frequency of the drive signal voltage and thereby changing whether or not the effective electrode structure adopts a shape created by the frequency dependent materials, such as might be created along a border between the two materials.

The different materials (not necessarily all frequency dependent) can also be arranged with surfaces perpendicular to an optical axis of the optical device, if desired, for better optical efficiency. As well, non-conductive materials can also be used together with the other materials to construct desired effective electrode shapes.

Another variation of the proposed solution makes use of a frequency dependent layer that has a frequency dependent charge mobility that varies along a gradient through the layer. Thus, one portion of the layer exhibits a higher degree of charge mobility in response to a first frequency than that of another portion of the layer. As such, adjustment of the frequency of a drive signal applied to the device, changes (selects) the portion of the gradient layer which behaves as a conductor. The shape of the gradient in the gradient layer can therefore be used to create an effective electrode shape that varies with changing drive signal frequency. This type of a gradient layer can also be combined with different fixed electrode structures, including a patterned electrode, to produce more complex effective electrode shapes.

The frequency dependent materials can consist of a variety of different possible materials. In one embodiment, the material is a thermally polymerizable conductive material, while in another embodiment it is a photo polymerizable conductive material. Other possibilities include vacuum (or otherwise, e.g., sol-gel) deposited thin films, high dielectric constant liquids, electrolyte gels, conductive ionic liquids, electronic conductive polymers or material with electronic conductive nanoparticles. The employed feature of the frequency dependent material is the charge mobility that is frequency dependent.

When the frequency dependent material is a thermally or photo polymerizable conductive material, it can include: a polymerizable monomer compound having at least one ethylenically unsaturated double bond; an initiator that is a combination of UV-vis, NIR sensitive or thermally sensitive molecules; an additive to change the dielectric constant of the mixture, where the additive is selected from the group consisting of organic ionic compounds and inorganic ionic compounds; and a filler to change a viscosity of the mixture. The material can also include an adhesive selective from the group consisting of adhesives sensitive to UV-Vis, adhesives sensitive to NIR and adhesives polymerized using a thermal initiator. An optical elastomer can also be included.

When the frequency dependent material is a high dielectric constant liquid, it can include a transparent liquid material having an epsilon between 2.0 and 180.0 at a relatively low frequency that allowing electric charge to move in a frequency dependent manner.

When the frequency dependent material is an electrolyte gel material, it can include: a polymer material; an ionic composition; and an ion transporter. When the frequency dependent material is a conductive ionic liquid, it can include an ionic species selected from the group consisting of chlorate, perchlorate, borate, phosphate and carbonate.

The various embodiments of the proposed solution also include a drive signal that can be varied in signal frequency. The drive signal generator can output a single frequency drive signal for which the frequency can be changed, a drive signal that is a mixture (combination) of different individual drive signal components of different frequencies, or some other form of drive signal for which the frequency content can be varied. In one embodiment, the drive signal generator generates a pulse width modulated drive signal for which the filling factor can be varied. In such a case, the filling factor can be modified to change the amount of high frequency content in the combined drive signal. In another embodiment, the drive signal generator generates an amplitude modulated drive signal in its basic mode or in a mode for which a drive signal component of a first frequency is modulated by a signal component of a second frequency. In yet another embodiment, the drive signal generator generates a drive signal that is a combination of several different individual drive signal components having predetermined relative frequencies and amplitudes. The selection of the appropriate drive signal can be made taking into account the specific electrode and frequency dependent layer configuration of a particular application.

In a particular group of embodiments of the proposed solution, an electrode structure (system) is used that includes a fixed conductor electrode having a non-flat geometry. A frequency dependent material having a non-flat geometry can also be used either alternatively, or in combination with, the non-flat fixed electrode. The structural configurations in this embodiment are varied, and can include a fixed conductor electrode that comprises a curved layer of conductive material coated atop a lens-like (lenticular) polymer structure. In another embodiment, the fixed conductor electrode is a multi-level flat-surface layer of conductive material coated atop a flat-aperture polymer structure. The frequency dependent material can also be a flat layer of material located between the LC layer and the fixed conductor electrode. In a variation, a flat-surface polymer structure can be formed of a pair of lens-like polymer structures having opposite and matching curved surfaces. The curved layer of frequency dependent material can also include a layer of optically transparent glue that attaches the matching curved surfaces together.

In still another embodiment of the proposed solution, a variable optical device includes a LC layer that itself has a frequency dependent charge mobility. In one version of this embodiment, no external frequency dependent material is necessary, as the LC layer itself changes its degree of charge mobility with changes in the drive frequency. Thus, the spatial profile of the electric field interacting with the LC layer can be frequency dependent resulting in an LC layer the optical properties of which can be modified by changing the frequency content of the drive signal. In one version of this embodiment, the electrode structure (assembly) generates a spatially non-uniform electric field and, when a frequency is generated that creates a high degree of charge mobility in the LC layer, the electric field is modified to be more spatially uniform. In another variation, the electrode structure (system) includes a hole-patterned electrode with an optically transparent material in the central zone of the electrode.

Those skilled in the art will recognize that the various principles and embodiments described herein can also be mixed and matched to create optical devices with various electric field generating characteristics. Electrodes of different shapes and configurations, frequency dependent materials of different types, shapes and positions, different drive signal generators, and variations including described herein can be used in combination to create an optical device with a particular characteristic. The devices can also be frequency controlled, voltage controlled, or a combination of the two.

For example, an LC layer can be used that has a low angle pre-tilt alignment layer, and a first frequency can be applied for which the effective electrode structure is uniform. At this frequency, the voltage can then be increased to a level at which the LC molecules all have an initial reorientation at a uniform tilt. The frequency of the voltage can then be changed to modify the effective voltage structure and introduce non-uniformities into the electric field so as to change the optical characteristic of the liquid crystal, such as to form a lens structure. By applying an initial uniform electric field strength to the liquid crystal before introducing electric field non-uniformities, disclinations in the LC layer are minimized (avoided). The drive signal can also be applied so as to prevent the liquid crystal molecules from remaining close to a ground state, and to thereby reduce optical (image) aberrations. In another example, frequency control can be used to alter the optical power of an LC lens, but the voltage of the drive signal switched from one level to another at different optical powers so as to improve the performance of the lens. Many other similar control paradigms are likewise possible.

BRIEF DESCRIPTION OF THE DRAWINGS

FIG. 13B is a schematic view of a LC cell configuration for controlling two orthogonal polarizations of light.

FIG. 13C is a schematic view of a LC cell configuration like that of FIG. 13B, but for which a single combined variable electrode structure controls both LC cells.

FIG. 13D is a schematic view of an LC cell configuration like that of FIG. 13C, but for which the combined variable electrode structure is located in between two cross oriented LC cells.

FIG. 14 is a graphical view showing the parameters of a pulse width modulated signal.

FIG. 33 illustrates a side sectional view of a tunable liquid crystal lens, with an inset top view of a top, having a TLC lens structure employing a spatially uniform electric field to provide a lensing effect employing a hidden electrode layer having the same index of refraction n throughout however having different complex dielectric constant portions with a lenticular interface therebetween for lens formation, and a frequency dependent weakly conductive layer employed separately from lens formation, for example to provide pan, tilt, beam steering, image stabilization, optical error correction in accordance with another embodiment of the proposed solution.

DETAILED DESCRIPTION

The proposed solution is directed to a tunable liquid crystal (LC) lens using a frequency dependent material to modify a spatial profile of an applied electric field via frequency tuning. Thus, tuning of the lens can be frequency controlled. The devices of the proposed solution can be used for tunable focusing, diffracting, steering, etc. The devices of the proposed solution can also be used for controlling a (LC) optical device that is fixed.

Figure 1:
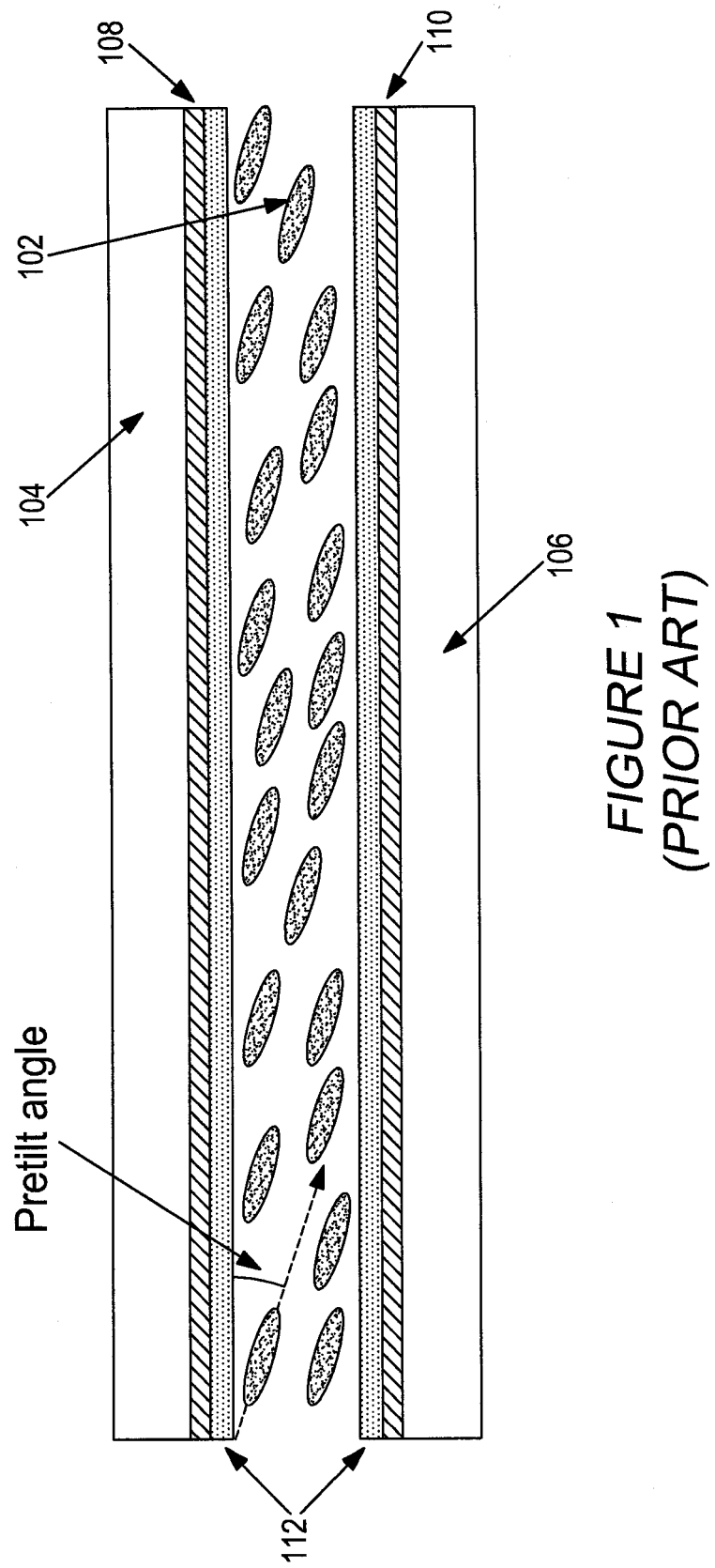
FIG. 1 is a schematic view of a prior art tunable liquid crystal (LC) lens structure.
Figure 2:
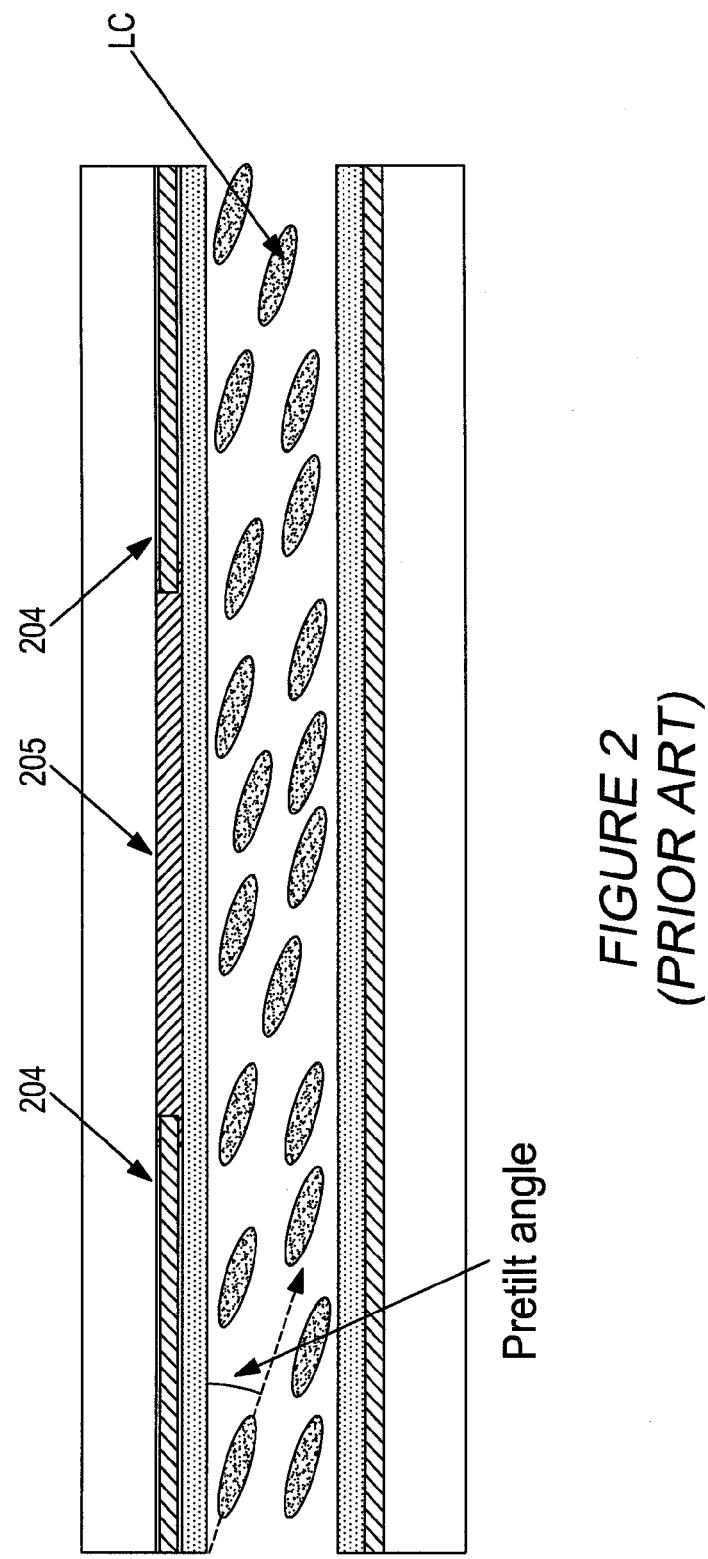
FIG. 2 is a schematic view of a prior art tunable LC lens structure having a hole patterned electrode.
Figure 3:
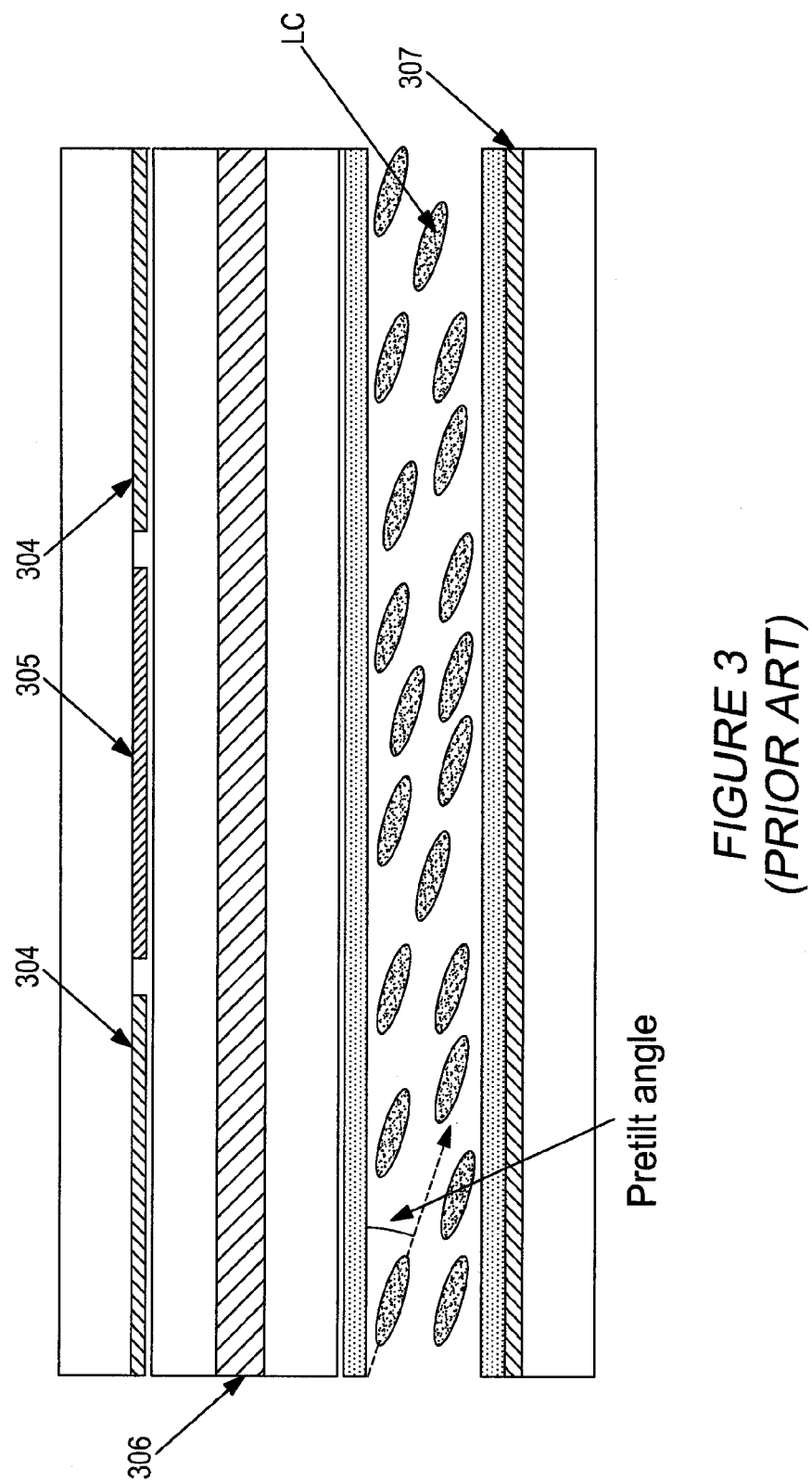
FIG. 3 is a schematic view of a prior art tunable LC lens structure having a two element top electrode.
Figure 4:
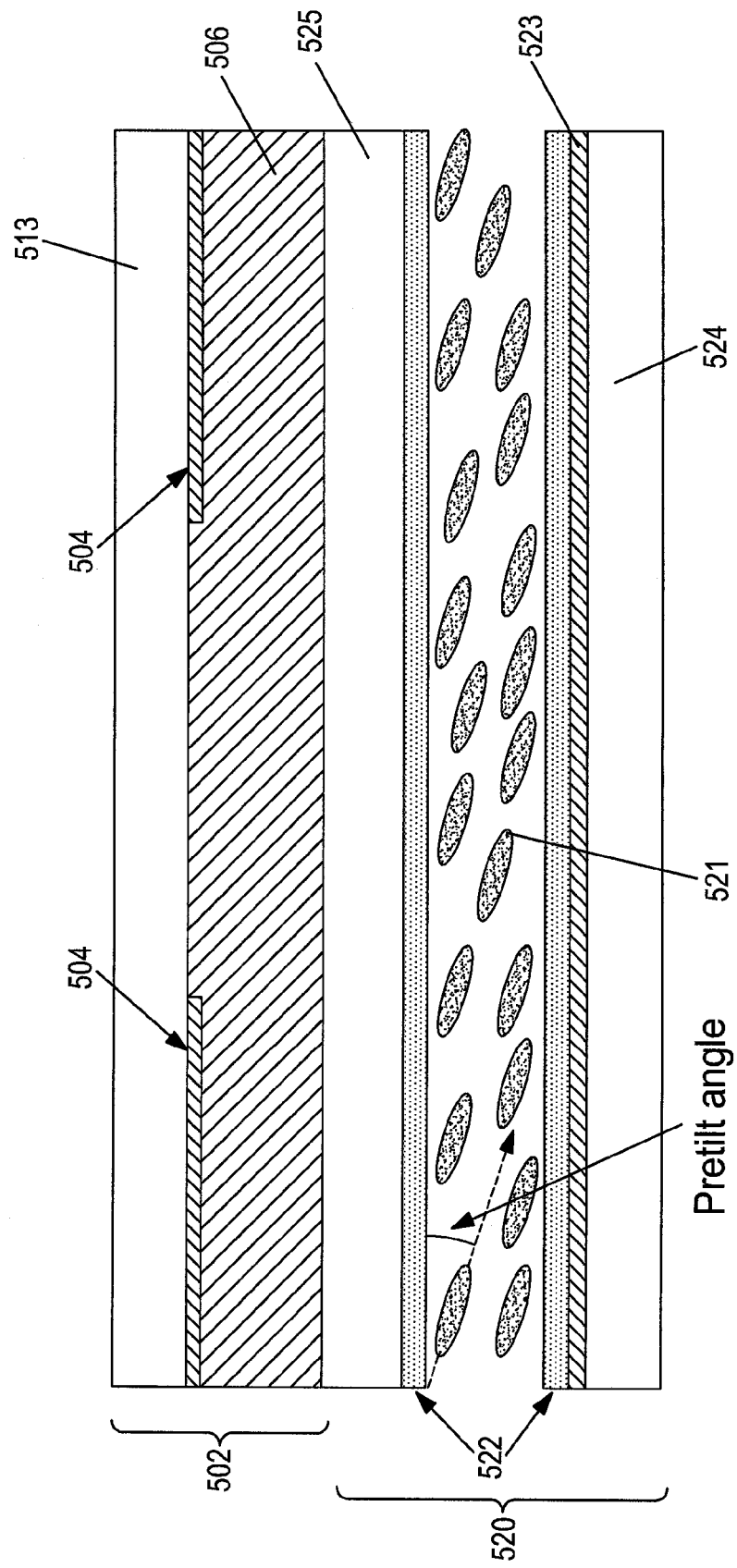
FIG. 4 is a schematic view of a tunable LC lens structure having a frequency dependent material layer and a hole patterned top electrode located near the top of the layer in accordance with the proposed solution.

FIG. 4 schematically illustrates a tunable LC lens using a layer 506 of a material having a frequency dependent characteristic. This material can be, for example, a high dielectric constant material, or a material of weak conductivity, and is hereinafter referred to, for brevity, as the "frequency dependent material." Functionally, the material has the characteristic of allowing a limited degree of charge mobility through it, and that degree of charge mobility is dependent on the frequency of the electrical signal applied to the device. Thus, for a given frequency dependent material, an electrical signal of relatively low frequency can result in a high degree of charge movement (penetration/transport distance) in the material, while a relatively high frequency results in a relatively low degree of charge mobility. When using the frequency dependent material in conjunction with an electrode structure (pair) that generates an electric field in response to an applied drive signal, the extent of charge mobility determines the depth of charge penetration into the frequency dependent material and, therefore, in the context of electric field formation determines the portion of the material that behaves like a "good" conductive layer, as well the portion that behaves like a "poor" conductor. Thus, with a high degree of charge mobility, a larger portion (segment) of the frequency dependent material will appear as a conductor and therefore (appear) act as an extension of a nearby electrode. This frequency dependent characteristic is therefore used in the proposed solution to create dynamically configurable effective electrode surfaces which can be changed by changing the frequency of the drive signal. Changing the effective electrode profile in this manner results in a corresponding change in the profile (spatial modulation) of an electric field between the two electrodes of the electrode structure. With an LC layer located between the electrodes, the dynamically changeable electric field profile can thus be used to dynamically change the optical properties of the LC layer.

Referring again to FIG. 4, the liquid crystal cell (LCC) 520 is composed of a layer of LC material 521, which is sandwiched between "orienting" coatings 522, formed of a material such as rubbed polyimide. The lower surface of the LCC 520 includes a relatively uniform transparent conductive layer (i.e., electrode) 523 formed from a suitable material such as indium tin oxide (ITO). A substrate 524 (for example glass) is provided (on the lower surface) and supports the transparent conductive layer. Optionally, a middle (buffer) layer 525 can be provided on the upper surface of the LCC, above uppermost oriented coating 522.

In accordance with the proposed solution, a gradient control structure 502 of the tunable LC lens uses a hidden electrode to provide spatial modulation of the electric field via frequency tuning. The gradient control structure 502 is composed of a hole-patterned fixed conductive electrode ring 504 that, optionally, can be made optically transparent. In FIG. 4, the electrode 504 is located at the top of the layer of frequency dependent material 506, while the (layered structure) arrangement in FIG. 5 has the electrode 504 located at the bottom of the frequency dependent material 506. This layer 506 is the portion of the electrode structure that may also be referred to herein as a hidden electrode. An optional cover substrate 513 (for example glass) can also be provided in the upper portion of the gradient control structure 502, above the transparent central electrode 504 and the frequency dependent layer 506.

As mentioned above, the frequency dependent layer 506 includes a complex dielectric material for which the depth of penetration of electrical charge resulting from an applied AC excitation drive signal will be different at different frequencies. The different depths of charge penetration for different frequencies (allows for) provides reconfiguration of the electrode structure by extending (moving) the effective electrode surfaces. In other words, a depth of penetration of electrical charge for one frequency can create an effective, or "virtual," electrode surface having a different extent (that is in a different position for the effective electrode surface) for a different frequency. As the electrodes are used to generate an electric field that is applied to the LC layer, the different effective electrode surfaces can be used to change the electric field experienced by the LC layer, and therefore to change its optical properties. Thus, for example, a tunable LC lens can be made frequency tunable, since optical properties of the LC cell are controllable by the frequency applied to the electrodes. Moreover, the frequency tuning can be voltage amplitude independent, in that the tuning can be accomplished using substantially (essentially) the same RMS voltage for the excitation drive signals of different frequencies.

Referring again to FIG. 4, the lens shown can operate in different possible regimes. For control drive signal frequencies that have a high degree of charge transport in the frequency dependent layer 506, the combination of electrode 504 and layer 506 will (together) appear as a uniform "top" electrode. That is, the high degree of charge penetration into the layer 506 will create an "extension" of the electrode 504, and the effective electrode will extend across the entire extent (length) of the layer 506, in this configuration across the aperture of the electrode 504. Since the bottom electrode structure 523 is also flat and uniform, the electric field across the LC layer will be substantially (approximately) uniform, and the LC molecules will be reoriented uniformly (and without orientation defects, known as disclinations, which can otherwise affect LC structures that are reoriented by changing the voltage amplitude on a hole patterned electrode). In contrast, if a frequency is applied to the electrodes for which the charge transport through the layer 506 is very limited, the effective top electrode shape will be close to that of the conductive electrode 504 alone, and the resulting electric field generated across the LC layer will be non-uniform (spatially modulated). In this example the non-uniform field will be concentrated around the hole patterned electrode 504, and will change the optical properties of the LC layer 521 in a predetermined way. Frequency control can thus be used to provide the desired optical tuning.

By frequency tuning instead of essentially voltage amplitude tuning, voltage ranges can be used that are more efficient, either for power consumption purposes or for liquid crystal modulation purposes. Frequency control can also be used to provide the capacity of dynamic control of the effective shape of the electrodes, and thus of the shape of the electric field generated by these electrodes.

Figure 6:
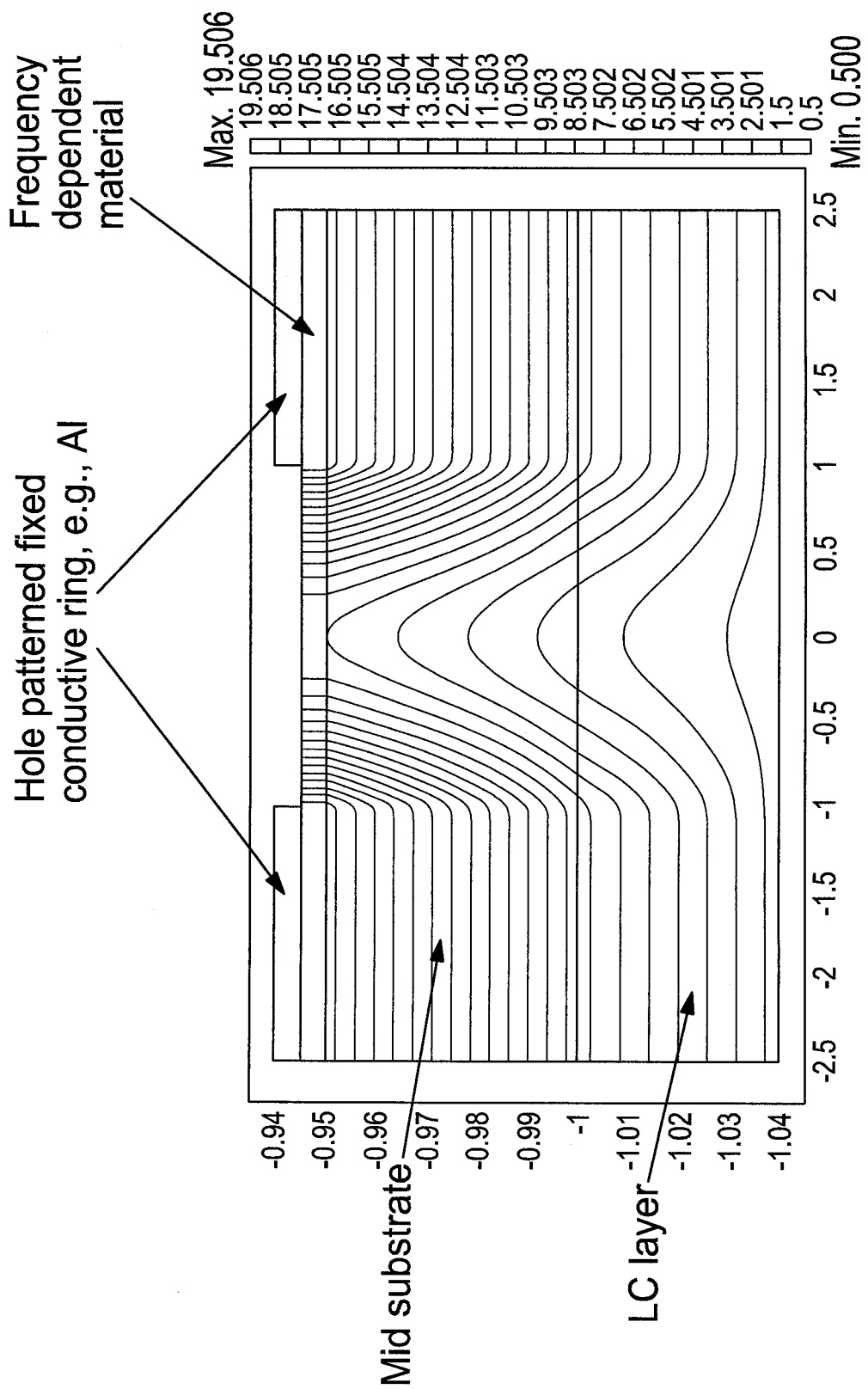
FIG. 6 is a graphical view showing equipotential planes for the configuration of FIG. 4 when using a drive signal having a relatively high frequency in accordance with the proposed solution.
Figure 7:
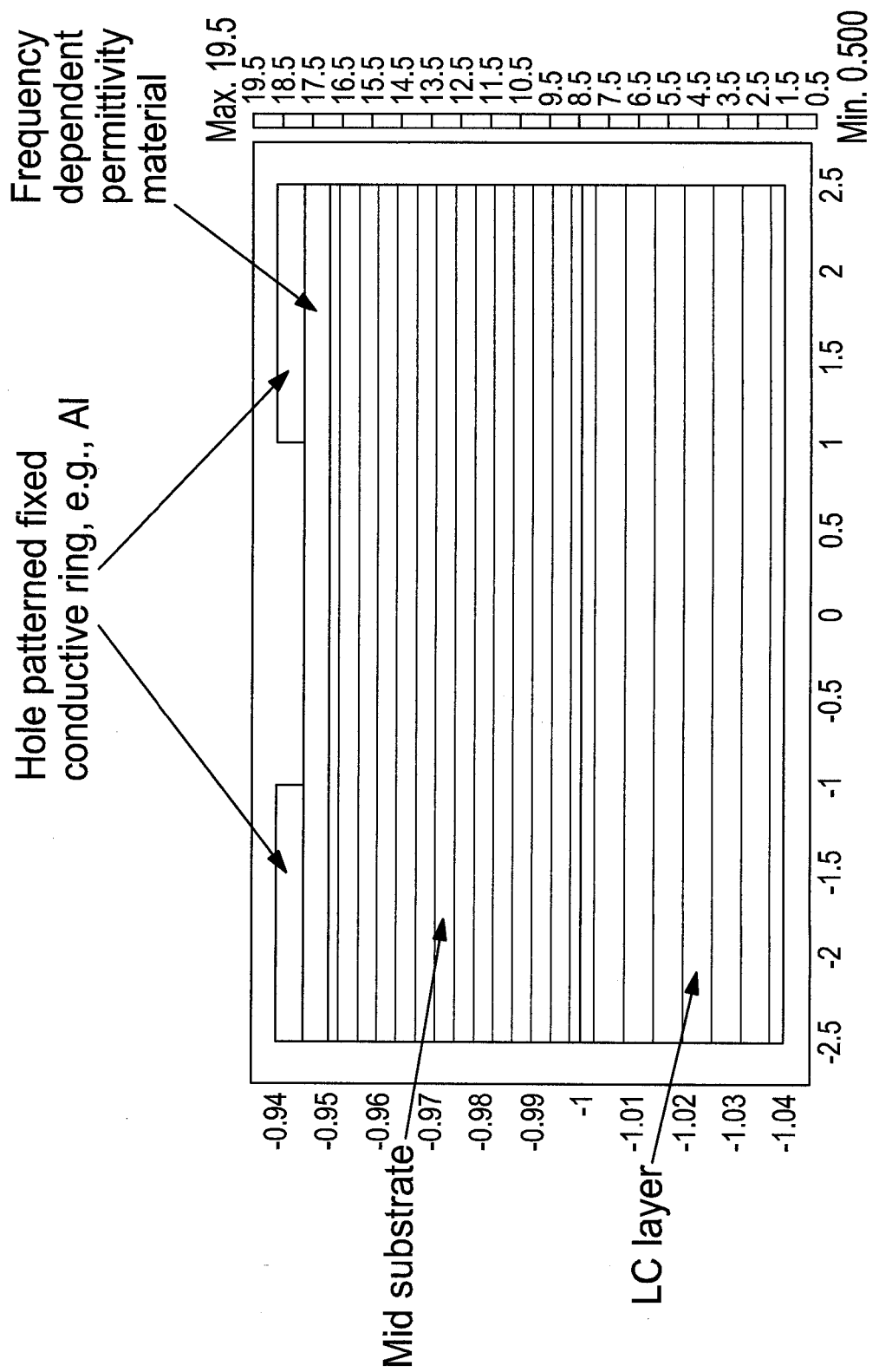
FIG. 7 is a graphical view showing equipotential planes for the configuration of FIG. 4 when using a drive signal having a relatively low frequency in accordance with the proposed solution.

FIGS. 6 and 7 illustrate corresponding equi-potential planes for the layered structure configuration of FIG. 4. As shown, in FIG. 6, the use of a moderate/high frequency drive signal (in this case 3 kHz at 20 V) creates a moderate amount of charge penetration (movement) in the frequency dependent layer that generates a particular electric field, shown in the figure to have a smooth gradient. The operational frequency range depends upon the parameters of the frequency dependent material used. As shown in FIG. 7, the use of a relatively low frequency drive signal (in this case 100 Hz at 20 V) results in more (movement) charge penetration in the frequency dependent layer. This flattens the electric field profile, correspondingly inducing uniform director reorientation in the LC layer (and allows one to easily avoid orientation defects, or so called disclinations). This type of electric field profile also allows the "erasure" of the lens at low RMS voltages without necessitating a third electrode or a change in the drive signal voltage amplitude to very low (e.g., 0 Volts) or very high voltages (e.g., 100 Volts), which tend to reduce performance or violate voltage limits of a host device. The flat equi-potential planes correspond to a flat electric field across the diameter of the lens. Here also, the "low" frequency range depends upon the parameters of the frequency dependent material used.

Figure 5:
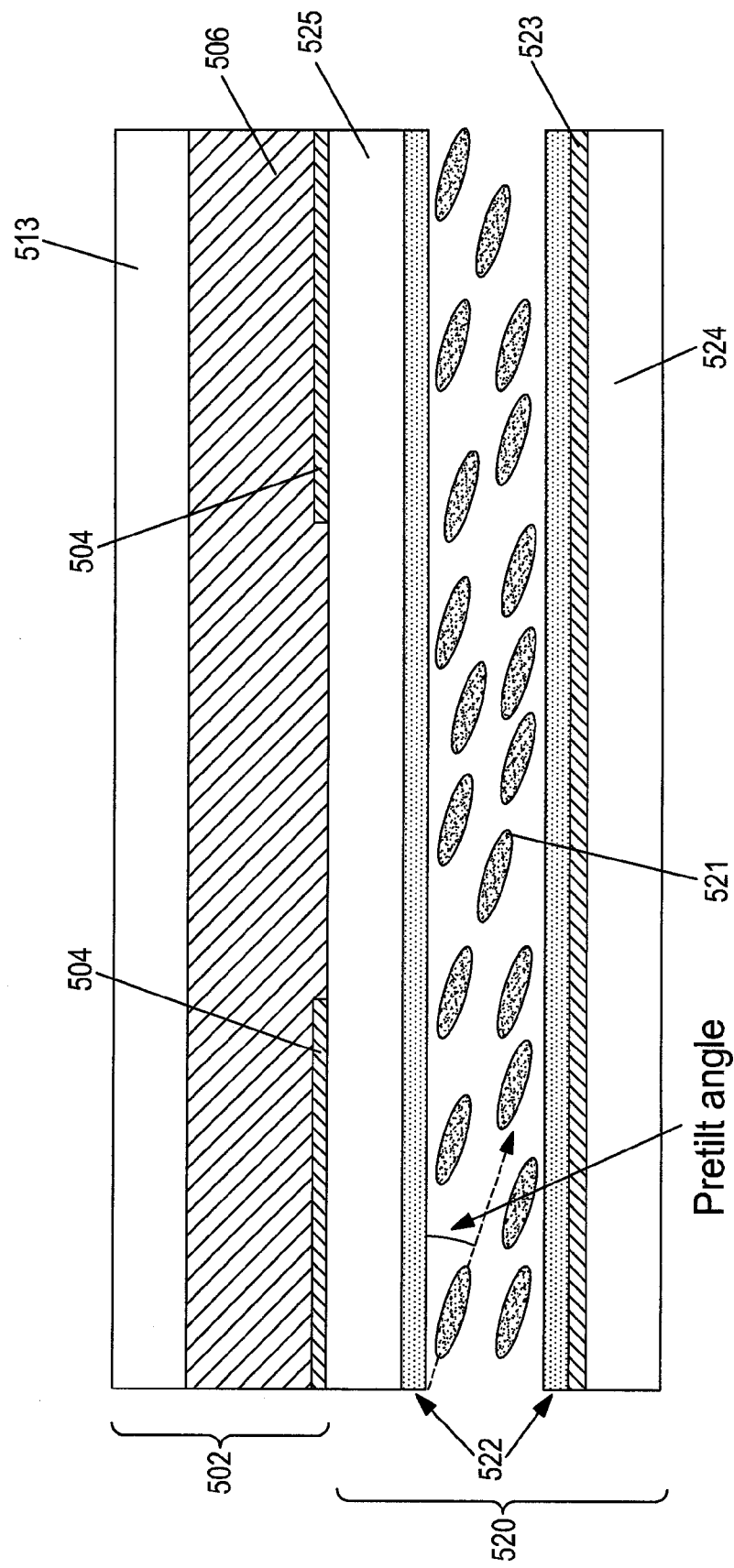
FIG. 5 is a schematic view of a tunable LC lens structure having a frequency dependent material layer and a hole patterned top electrode located near the bottom of the layer in accordance with the proposed solution.
Figure 8:
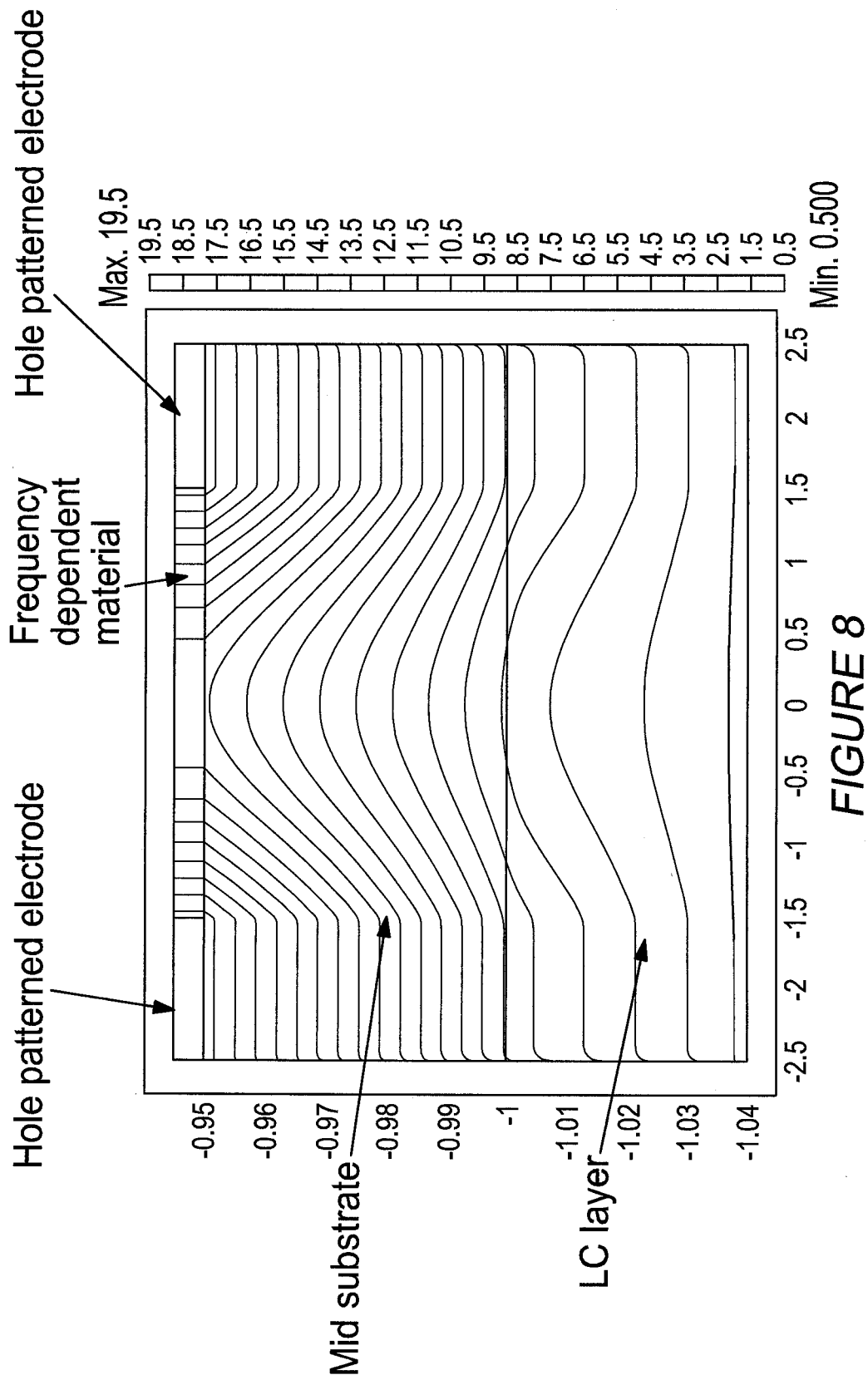
FIG. 8 is a graphical view showing equipotential planes for the configuration of FIG. 5 when using a drive signal having a relatively high frequency in accordance with the proposed solution.
Figure 9:
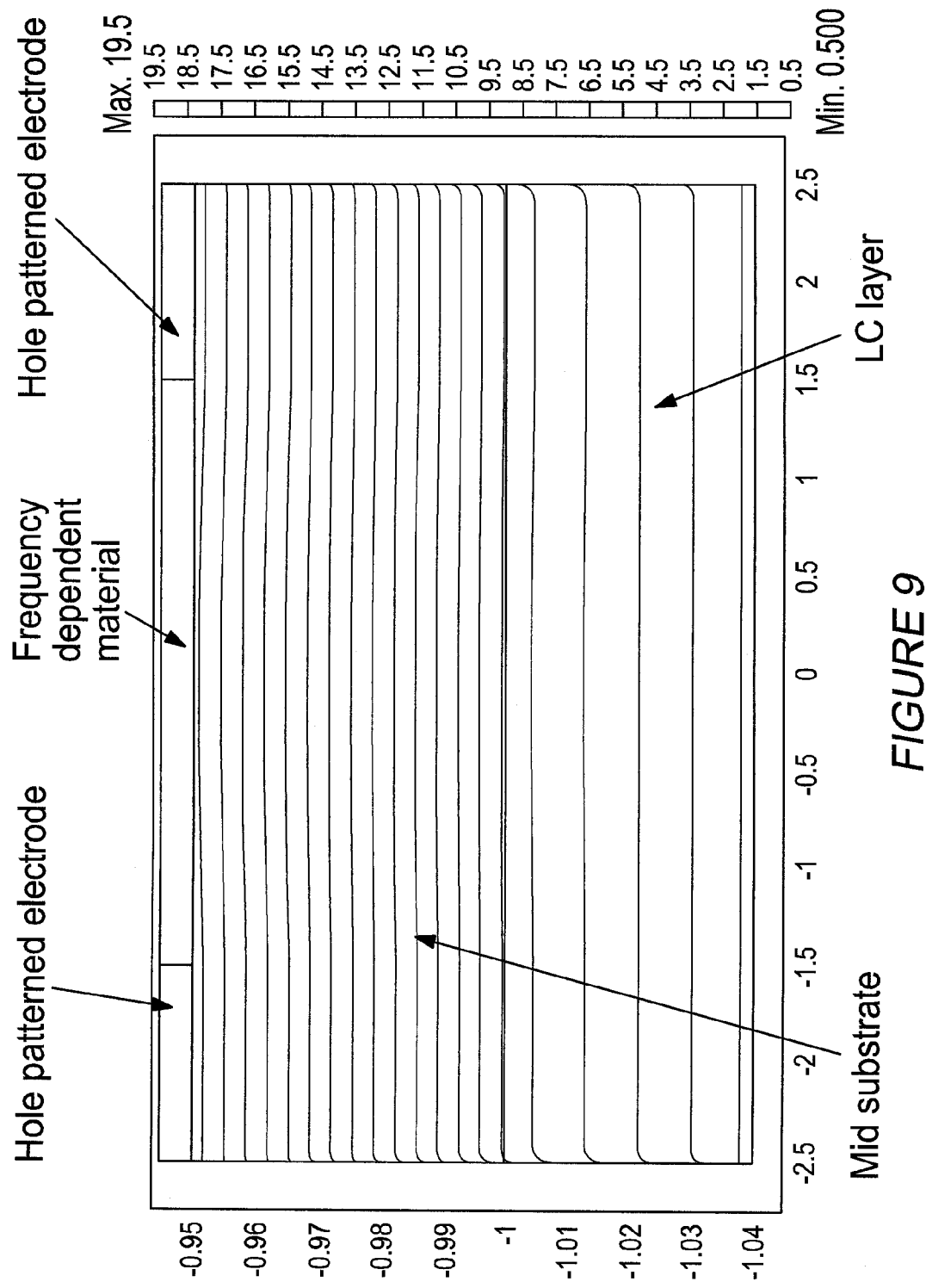
FIG. 9 is a graphical view showing equipotential planes for the configuration of FIG. 5 when using a drive signal having a relatively low frequency in accordance with the proposed solution.

FIGS. 8 and 9 illustrate corresponding equi-potential planes for the configuration of FIG. 5. FIG. 8 shows the electric field profile for the layered structure arrangement of FIG. 5 provided with a drive signal having a frequency of 700 Hz at 25V. This relatively high frequency drive signal creates a moderate charge movement in the frequency dependent material that results in a spatially variable electric field profile having a smooth variation, as indicated in the figure. In contrast, a low frequency drive signal (e.g., 100 Hz at 25V) produces a (comparatively) relatively flat spatial distribution of the electric field, as shown in FIG. 9.

Figure 10E:
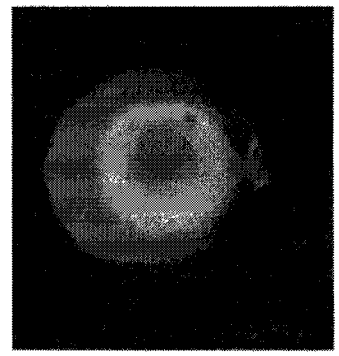
FIGS. 10A-10E are illustrative images showing the tunable lens effect for a configuration like that of FIG. 4 in accordance with the proposed solution.
Figure 10B:
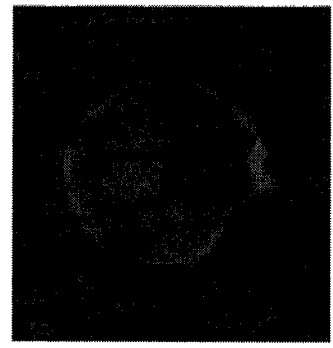
Figure 10D:
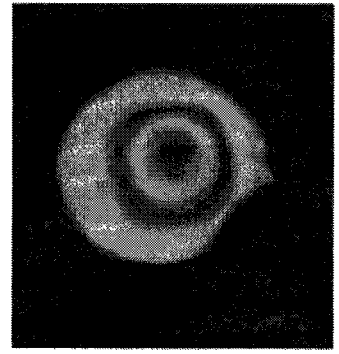
Figure 10A:
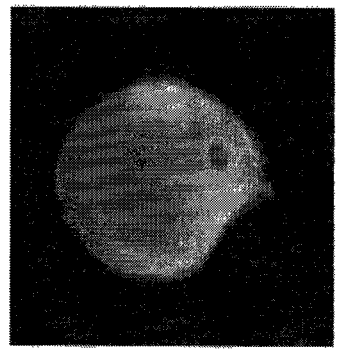
Figure 10C:
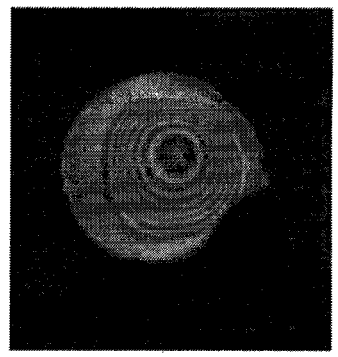

FIGS. 10A to 10E illustrate an experimental demonstration of the tunable LC lens (TLCL) effect for the (cell) layered structure configuration shown in FIG. 4. To obtain the images shown, a tunable lens with a single liquid crystal layer is placed (at 45°) between two cross polarizers. FIG. 10A demonstrates the uniform profile of LC alignment before excitation with a control drive signal. FIG. 10B shows the uniform LC molecular orientation profile when excited by a drive signal applied to the electrodes at a relatively low excitation frequency. The uniform electric field profile generated by this low frequency excitation includes the corresponding uniform LC molecular orientation profile without a lensing effect. An increase in drive signal voltage amplitude from 0 V (FIG. 10A) to 35 V (FIG. 10B) changes the orientation of the liquid crystal molecules, but does not create an orientation gradient, so there is no lensing effect. FIGS. 10C-10E show the operation of the lens at drive signal frequencies where the charge mobility of the frequency dependent material layer (permittivity) is moderate. Thus, at 1.1 MHz, 10 $V_{RMS}$ (FIG. 10C) many interferential fringes show the presence of a gradient and corresponding lens effect. The increase of voltage to 35 $V_{RMS}$ (FIG. 10D) partially decreases that gradient and, correspondingly, the optical power of the lens (less fringes). As shown in FIG. 10E, a similar optical power reduction effect can be obtained if the voltage is the same but the frequency is reduced to the point where the charge mobility of the frequency dependent layer is higher (approaching the situation shown in FIG. 10B).

Figure 11B:
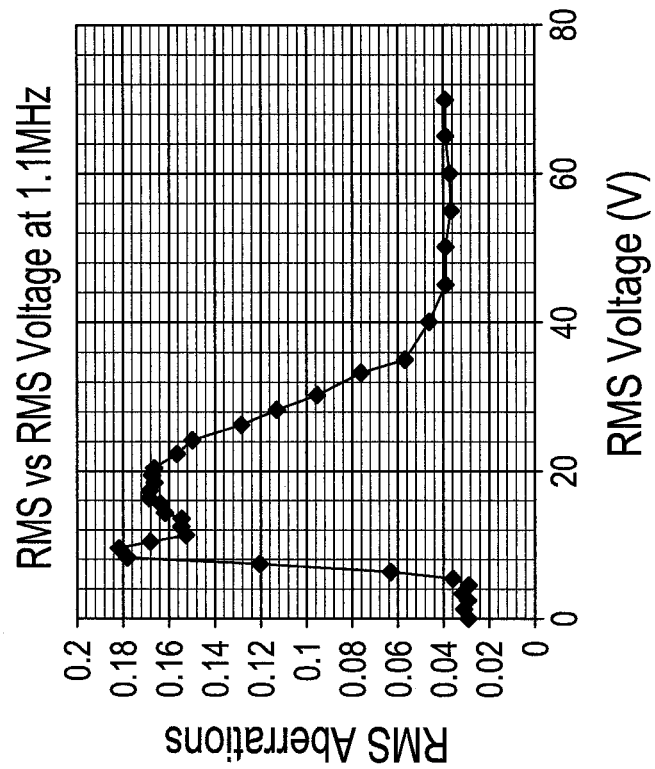
FIG. 11B shows graphically experimental data on RMS aberration versus RMS voltage for the configuration like that of FIG. 4.
Figure 11A:
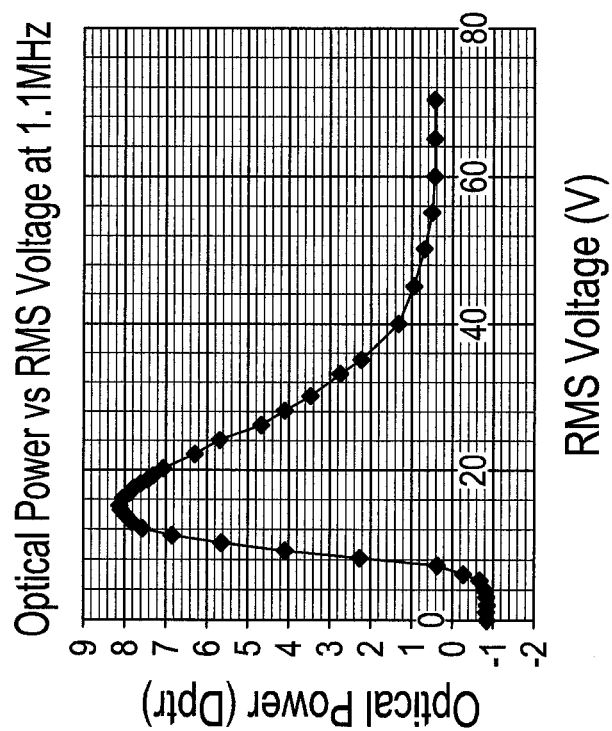
FIG. 11A shows graphically experimental data on optical power versus RMS voltage for the configuration of FIG. 4.

FIGS. 11A and 11B show experimental data (Shack-Hartmann data) on the optical power and RMS aberrations, respectively, vs. RMS voltage for the cell configuration shown in FIG. 4 operated in an amplitude modulation regime (constant frequency). In this example, a drive voltage of 1.1 MHz is applied to the LC lens illustrated in FIG. 4, and the magnitude of the drive signal voltage is varied. The smooth change in optical power is clearly evident from FIG. 11A, while FIG. 11B demonstrates the excellent (very low) aberration levels that are obtained using a simple voltage amplitude control without any additional frequency adjustment. As shown, even at nine Diopters of optical power, the aberrations are below 0.18 micrometers. However, it should be noted that the "erasure" of the lens by increasing voltage is not efficient. Even at V>70$V_{RMS}$ there is a "residual optical power" of about 1.5 Diopters, making frequency control that much more attractive.

Those skilled in the art will recognize that the figures showing the different embodiments of the proposed solution, such as FIGS. 4 and 5, are schematic and not to scale. Thus, while the frequency dependent layer is shown as being relatively thick as compared to other layers, it can actually be quite thin and used to dynamically create an effective electrode profile based on the location of the frequency dependent material. The "extension" of an electrode can also be in either or both of a direction parallel to, or a direction perpendicular to, an optical axis of the lens. Thus, for example, in the structure of FIG. 5, a drive signal applied between the hole patterned electrode 504 and the flat electrode layer 523 will, in the absence of any significant charge mobility in the frequency dependent layer 506, create a non-uniform electric field across the LC layer 521, for example, giving a desired lensing profile to the LC layer. However, when a drive signal is applied that has a frequency for which there is a significant amount of charge mobility in the frequency dependent layer, the effective electrode structure is substantially extended into the "hole" region in the center of the hole patterned electrode, thus creating an effective electrode that is flat across the entire electrode structure. This "horizontal" extension of the hole patterned electrode changes the electric field profile to be uniform as a result of the two uniform electrodes in the structure. This uniform field has a uniform reorienting effect on the liquid crystal molecules so that any lensing effect is erased.

Within a frequency range between the relatively high and relatively low frequencies discussed above, the frequency of the driving signal can be adjusted so as to create a gradually changing optical parameter of the LC layer. An example of this is to create a lens with an optical power that can be varied between a minimum and a maximum by changing the frequency of the driving signal. Prior art tunable LC lenses use a driving signal of a constant frequency and adjust the voltage level to change the optical properties of the LC layer. Thus, changing the voltage amplitude between a flat electrode and a hole patterned electrode (like that of FIGS. 4 and 5) can change an optical power of a lens. However, with fixed electrode structures like those of prior art systems, frequency tuning is not possible and complex shaping of the electric field profile is not possible.

Another problem with prior art systems having patterned electrodes is the effect of "disclination." In a typical LC lens, the LC molecules are all provided with a common pretilt angle so that they are aligned at a zero voltage. When using voltage tuning of a lens having a patterned electrode, the increasing voltage creates nonuniform electric field lines that cause some of the LC molecules to realign differently than others which experience the same electric field strength. These disclinations cause aberrations in the lens such disclinations can be removed by aligning all of the molecules with a drive signal of a very high voltage that erases the lens, before reducing the voltage back to the appropriate range for providing a desired optical power. However, in accordance with the proposed solution, in an embodiment such as that of FIG. 5, the initial application of a relatively low frequency excitation drive signal creates an effective uniform electrode profile and corresponding electric field profile. By raising the voltage amplitude to a level beyond a threshold voltage, the LC molecules will all be reoriented in a common angular orientation (in which state, there is zero optical power). The frequency of the excitation drive signal can then be increased to reduce the charge mobility in the frequency dependent material. As the frequency increases, the nonuniform profile of the electric field develops, creating a desired lensing effect. Since all of the LC molecules were prealigned by the low frequency drive signal above the threshold, no disclinations persist (occur) when the lens profile is introduced.

Figure 12B:
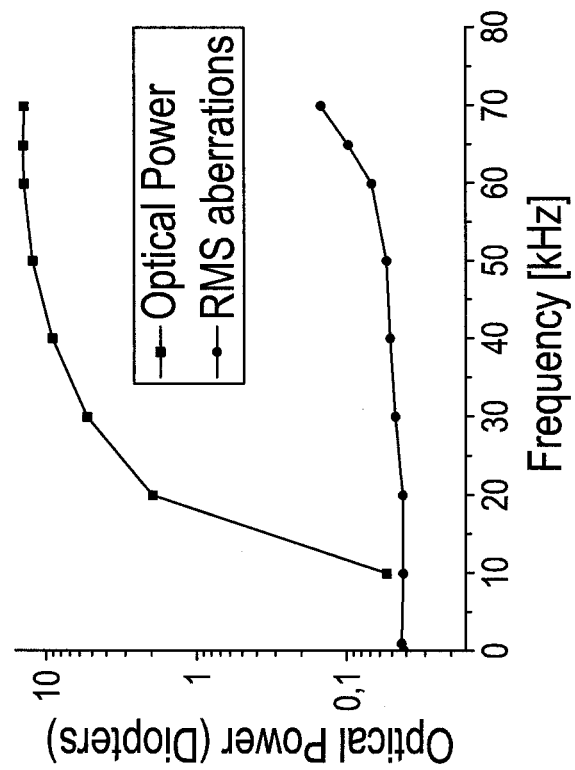
FIG. 12B shows graphically experimental data on optical power versus frequency for a configuration like that of FIG. 4, as well as a corresponding indication of aberration over the same frequency range.
Figure 12A:
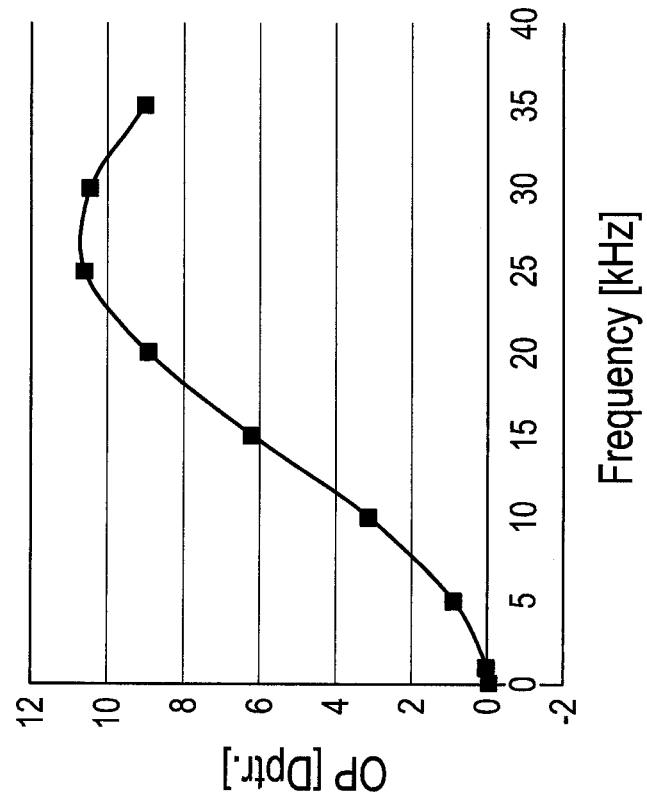
FIG. 12A shows graphically experimental data on optical power versus frequency for a configuration like that of FIG. 4.

FIG. 12A shows a graphical example of how frequency tuning can be accomplished by a lens structure according to the proposed solution. Although the curve shown extends to zero frequency, as mentioned above, the initial drive signal provided to the lens can be at a low AC frequency, such as 100 Hz. At this frequency, the optical power is low because all of the LC molecules are essentially commonly aligned. Without changing the voltage of the drive signal, the frequency can then be increased and, as shown in the figure, the optical power rises as the nonuniform electric field begins to develop a lens characteristic in the LC layer. In this example, a maximum optical power is reached at about 25 kHz, after which it begins to reduce again. It can thus be seen how frequency tuning can be used in place, or in addition to, voltage tuning of an LC lens. FIG. 12B is similar to FIG. 12A in that it shows another lens structure that is frequency tunable, in this case over a higher frequency range. However, FIG. 12B also shows a very low RMS aberration level produced over the active optical power range.

Figure 13A:
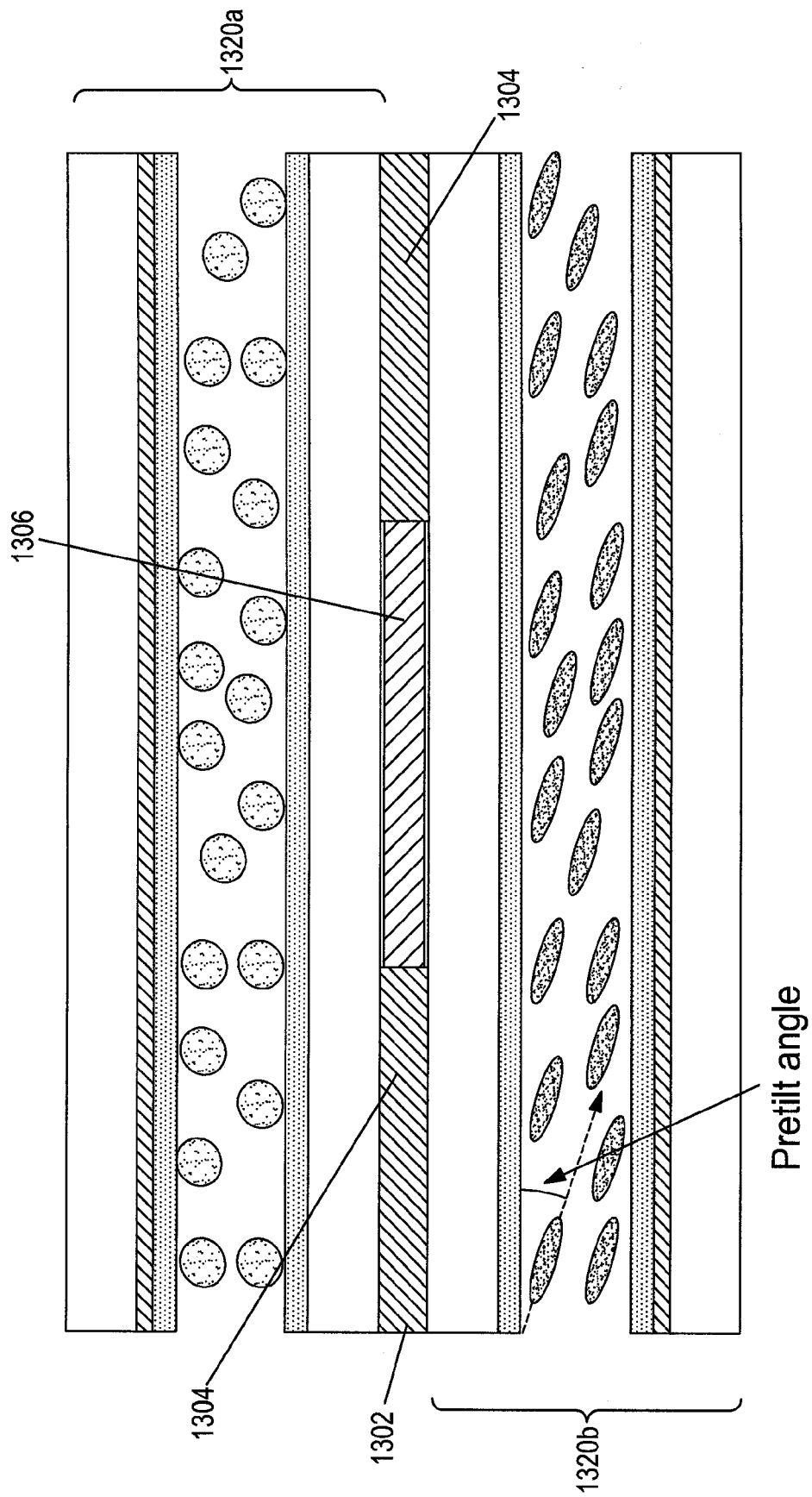
FIG. 13A is a schematic view of a structure according to the proposed solution in which a gradient control structure having a hole patterned electrode and frequency dependent material sandwiched between two LC cells.

In the case of gradient index liquid crystal lenses (GRIN) that use spatially uniform low-angle pre-tilt alignment layers, the liquid crystal material undergoes a reorientation from a ground state through to a desired maximum reorientation in a direction of the electric field. When the pre-tilt angle is close to 90 degrees with respect to the electric field, the ability of the field to reorient LC molecules is weakest. Therefore, it can be advantageous in some designs of tunable GRIN optical devices to select as the tunable range, orientations of liquid crystal that avoid the orientations at which the electric field has a weak ability to reorient the liquid crystal. This can be done by applying a uniform electric field that results in reorientation of the liquid crystal away from the ground state to thus have a new, more responsive, "ground" or base state and then on top of that uniform field, applying a modulated electric field to form the lens or other optical device. Alternatively, this can be achieved by having the variation in index of refraction resulting from an orientation close to alignment with an electric field (the lowest optical power) and a spatially modulated orientation deviating from that uniform field alignment in a direction of a ground state (the higher optical power). This avoids aberrations caused by the weak interaction between the electric field and the liquid crystal in the ground state. Thus, it will be appreciated that the proposed solution can use a frequency dependent material to form such a suitable electric field Full TLCL FIG. 13A illustrates an additional variant of a tunable LC lens using a hidden electrode to provide spatial modulation of the electric field via frequency tuning. In FIG. 13A, the structure that controls the electric field gradient is composed of a hole patterned peripheral electrode 1304 of fixed (preferably low) electrical resistance, while the central disk-shaped region in the center of this electrode (on the same plane) and the area around that plane is filled by a frequency dependent material 1306. This gradient control structure (GCS) 1302 is sandwiched between two LC cells 1320a, 1320b having directors (average orientation of long molecular axis of LC) in orthogonal planes. For example, one of the directors might be in the XZ plane with the second director being in the YZ plane, the normal of the sandwich being the Z axis. (In this embodiment, one of the traditionally used "internal" electrodes of LC cells is removed to allow the formation of the electric field gradient within the LC layer.) The position of the GCS 1302 can be advantageously used to combine multiple functions for the GCS, such as electrode, heater, and sheet resistance (of frequency dependent material), temperature sensor, optical element shaping, beam steering, pan/tilt, optical error compensation, image stabilization, etc. The heater and the temperature sensor can be used together to help keep the temperature of the device at an optimal level. Additional patterning of the electrode 1304 could also be used to measure the electrical properties of the frequency dependent material 1306, such as sheet resistance, which plays an important role in the formation of the electric field profile, and which might change part-to-part over time with aging. In this context, the GCS can be made in different forms and from a special alloy (e.g., Mo/Al) to perform such multiple functions. Providing a layer that provides spatial modulation of the electric field in the middle of the layered structure (assembly) has the advantage that it equally affects the electric field in the layer or layers below the modulation layer, as well above. By providing a middle electrode in the electrode structure, the separation between electrodes is essentially halved, and in spite of the need to drive two electrode cells simultaneously, the drive signal variations and part-to-part variations are less significant.

For example, it can be appreciated that wafer level manufacturing can include layer by layer deposition building up the full TLCL layered structure illustrated in FIG. 13A, as well the wafer level manufacturing can include layer by layer deposition building up separate half TLCLs (single polarity) wherein one of the two halves is flipped and 90 deg rotated before being bonded on top of the other. In the latter case, the patterned electrode 1302 and 1304 can be either (be implemented by being) deposited on only one of the halves or half layers can be deposited (double deposition), the half layers forming layer 1302/1304 after bonding. For the double deposition implementation, surprisingly it has been discovered that in operation the bonded weakly conductive half layers couple and their electrical properties average out. The coupling is understood to be, at least in part, the result of evanescent field coupling. Advantages are derived from this surprising coupling and property averaging which translate great manufacturing improvements. For example the natural percolation zone variability of conductivity of the weakly conductive layer results in a low manufacturing yield, however double deposition implementation provides for selecting half TLCL pairs (mix and match) which when flipped, turned and bonded cause the weakly conductive layer to have average electrical properties at the desired range. High manufacturing yields have been achieved employing this implementation.

Furthermore, for implementations employing FIG. 5 half TLCLs, turning flipping and bonding to build a full TLCL results in a combined weakly conductive layer sandwiched between upper and lower hole patterned electrodes. Surprisingly it has been discovered that in operation the separate hope patterned electrodes couple (through the combined weakly conductive layer) and appear in electrically as one. Accordingly, it has been discovered that combinations of adjacent weakly conductive layers and electrodes effectively form and operate as a single weakly conductive layer/electrode structure.

To summarize different electrode structure arrangements are possible in a TLCL layered structure, each having advantages and shortcomings, wherein some shortcomings can be less important in particular applications. FIGS. 13B and 13C illustrate, respectively, two possible configurations combining the novel electrode structure of the proposed solution with LC cells in order to handle s and p polarizations of light. In the configuration of FIG. 13B, two liquid crystal cells ($LCC_x$ and $LCC_y$) are oriented in the cross directions to handle the perpendicular light polarizations, and a (control electrode structure) CVES is located to either side of the LCC layers. In this example, each of the CVES layers is used to control a different one of the LCC layers. The use of dual weakly conductive layers may need to be carefully considered in view of conductivity mismatches, and may be called for in certain applications. The alternative configuration of FIG. 13C is similar, but uses only one electrode structure to control two cross oriented LCCs. In this case, the bottom flat electrode of the top LCCx is oriented such as to allow the creation of the control electric field by the top electrode structure and the bottom flat electrode of the LCCy. It is also possible to use a configuration as shown in FIG. 13D, for which the CVES layer is adapted and located in the middle of the final device (between two cross oriented LC cells).

Any of the frequency dependent materials discussed herein can be used in the different LC lens configurations above. Such materials have a complex dielectric permittivity that can be varied (including the weakly conductive properties) by the change of driving frequency. The specific characteristics of the material can be selected according to the particular lens structure in question. It should be noted that various material compositions, various LC layers, various electrodes, various geometrical forms, etc. can be used to fabricate the above-described LC lens, without departing from the scope of the claimed invention. It should also be appreciated by the reader that various optical devices can be developed using the LC lens described herein.

Example

It will be appreciated that the tunable LC optical device can be fabricated using a layer by layer assembly and, preferentially, in a parallel way (many units simultaneously, referred to as "wafer level fabrication"), the final product being obtained by singulation and, optionally, joining lenses with operation axes (directors) in cross directions to focus two (both) orthogonal light polarizations.

By way of a non-limiting example, the dimensions of a variable focus flat refractive lens embodiment of the invention will be provided. It will be appreciated that dimensions can vary greatly depending on design choice and the choice of materials. The cover substrate can be made of glass with a thickness of 50 to 100 microns. The hole-patterned electrode can be made of an opaque metal such as aluminum, or it can be made of Indium Tin Oxide (ITO) which is transparent. The thickness of the electrode can be in the range of 10 to 50 nm. The frequency dependent material can be made of titanium oxide with a thickness of about 10 nm. Titanium oxide has semiconductor properties that change with control signal frequency.

The frequency dependent permittivity (or complex dielectric) material can comprise a variety of materials as set out in the following. The essential property of such a material is that it can exhibit a weak conductivity that will provide for charge mobility that is variable as a function of the frequency of the control signal. This allows frequency tuning of the shape of the electric field to control optical quality or power, as well frequency tuning of the on/off operation of the LC optical device.

Top and bottom alignment layers can be polyimide layers of about 20 to 40 nm thick that are rubbed to yield surfaces that induce a liquid crystal ground state alignment with a low angle pre-tilt. The layer of liquid crystal can be 5 to 30 microns thick, as an example. Such a single layer of liquid crystal with spatial modulation forms a gradient index lens which focuses a single linear polarization of light. In the embodiment of FIG. 13A, a hole-patterned electrode 1304 and frequency dependent material 1306 are placed on the top substrate, and this electrode is shared between two LC layers or cells 1320a and 1320b.

It will be appreciated that a two to four layer TLCL can be assembled in this manner that can have a lens diameter of about 1 to 3 mm with a thickness of about 460 microns. The optical power of the TLCL can be roughly from 8 to 16 diopters, which is suitable for most camera applications. One TLCL can provide variable focusing, while two can provide a zoom lens.

In the above embodiments, the structure of the TLCL is essentially all flat, namely, the frequency dependent layer, electrode layer (ITO or the like), LC layer, etc. are flat. The electric field shaping is either a result of patterning the electrode layer or the complex impedance of the frequency dependent layer, or both. It is however possible to use other structural configurations to provide the electric field shaping.

Frequency-Dependent Material

As mentioned above, the proposed solution provides various chemical compositions of a frequency dependent material, suitable for use in tunable optical devices, such as the LC lenses described herein. Those skilled in the art will recognize that such materials can also be used in other frequency-dependent optical applications, such as beam steering devices, shutters, and the like. A uniform or non-uniform layer of the frequency dependent material can be incorporated into the lens, beam steering device, and/or shutter configuration, in order to provide for spatial modulation of an electric field via frequency tuning. Thus, tuning can be frequency controlled. Such a device can be used for tunable focusing, diffracting, steering, and the like.

For the different LC lens configurations discussed above, the frequency dependent layer is made of a material having a complex dielectric permittivity which is dependent (including the weakly conductive properties) on a driving frequency applied to the system electrodes. According to a non-limiting example of implementation, this material can be a thermally or photo polymerizable conductive material, whose composition can include the following elements:
(i) a polymerizable monomer (linear or cyclic) compound;
(ii) an initiator;
(iii) an additive to change the dielectric constant or conductivity of the final composition;
(iv) an adhesive to increase the adhesion of the polymer to a glass surface (the adhesive can be used as surface treatment agent or incorporated directly to the solution to increase the adhesion); and
(v) a filler to change the viscosity of the mixture.

In one example, 90 (wt.) of isodecyl acrylate (SR256) is mixed with 0.3% Li$^+$ClO4$^-$ (wt %). Then 3% of an initiator; 2-hydroxyl 2-methyl 1,1-phenyl propanone (Darocure 1173) is added and the mixture stirred carefully at room temperature to obtain a homogeneous clear solution. Then a quantity of 10% of ECA (2-ethyl cyanoacrylate) (wt % of total mass of the monomers) was added and the final solution stirred carefully for 15 minutes at room temperature and dark conditions.

The mixture can be polymerized by a UV source by exposing the material for three minutes at an intensity of 15 mV/cm$^2$.

In another example, in order to prepare a first part of the composition, 35% (wt.) of optical adhesive OA9352HT2 (HT) is mixed with 65% (wt.) of (2(2-Ethoxyethoxy) Ethylacrylate monomer) and the mixture is stirred carefully at room temperature to obtain a homogeneous clear solution. Then a quantity of 10% of 4-methylphenyl)[4-(2-methylpropyl)phenyl]-hexafluorophosphate (wt. of total mass of the monomers) is added and the final solution is stirred carefully for 15 minutes at room temperature and dark conditions.

A second part of the composition having low epsilon or conductivity is a 55% wt. of isodecyl acrylate (SR395) mixed with an optical adhesive (45% wt., AT6001). The solution is stirred carefully for 15 minutes at room temperature and dark conditions. The mixture can be polymerized by an UV source by exposing the material for 3 minutes with an intensity of 15 mV/cm$^2$. Optionally, an optical elastomer from the silicone family can be included in the thermal- or photo-polymerizable conductive material and used as a low epsilon part of the composition. This material can be classed as a thermally curable compound (and can be a one or two part silicone elastomer).

It should be noted that various material compositions, various LC layers, various electrodes, various director alignments, various geometrical forms, etc. can be used to fabricate the same optical device. That is, different combinations of materials and physical structures disclosed herein can be used for a particular application, although the use of a frequency dependent material, which allows for frequency tuning of the optical device, is common to each of these embodiments.

It has been determined that various different chemical compositions of a material with complex dielectric permittivity can be suitable for use in the above-described frequency tunable lens, beam steering device, and/or shutter configurations, where this material can be altered (including the weakly conductive properties) by modulating a driving frequency applied to the electrodes.

According to one embodiment of the proposed solution, the polymerizable monomer compound has at least one ethylenically unsaturated double bond and has a complex dielectric constant including an imaginary part which describes the conductivity, and the initiator is a combination of UV-Vis, NIR sensitive or thermally sensitive molecules.

One particular initiator compound can include, for example, mixed triarylsulfonium hexafluoroantimonate salts, hexafluorophosphate salts, and any other suitable initiators known to those skilled in the art. A preferred initiator compound is 4-methylphenyl[4-(2-methylpropyl)phenyl]-hexafluorophosphate.

The additive to change the dielectric constant or conductivity of the thermal- or photo-polymerizable conductive material can be an organic ionic compound (such as iodonium (4-methylphenyl)[4-(2-methylpropyl)phenyl]-hexafluorophosphate or triarylsulfonium hexafluoroantimonate salts, mixed in propylene carbonate), an inorganic ionic compound (such as Li$^+$ClO4$^-$, K$^+$ClO4$^-$ etc.), an ionic organometallic compound, or a mixture of any of these, and any other suitable additives known to those skilled in the art.

The adhesive is sensitive to UV-Vis, NIR, or is an adhesive that is polymerized using a thermal initiator and can be used as surface treatment agent, or incorporated directly to the solution to increase the adhesion. In the example above, the adhesive is optical adhesive OA9352HT2 (HT), but other suitable adhesives will be known to those skilled in the art.

The optical elastomer, as discussed in the example above, can be selected from a group including isodecyl acrylate (SR395) mixed with an optical adhesive (AT6001), and any other suitable optical elastomers known to those skilled in the art.

According to another embodiment of the proposed solution, the frequency dependent material is a high dielectric constant liquid, chosen from all transparent liquid materials having an epsilon value between 2.0 and 180.0 able to provide for charge mobility. Preferably, the high dielectric constant liquid has an epsilon value between 30.0 and 150.0. More preferably, the high dielectric constant liquid has an epsilon value between 60.0 and 120.0. The liquid can be pure, or a mixture of alkylene carbonates family, such as propylene carbonate (PC) or glycerin carbonate (GC) having epsilon of 67 and 111, respectively, alkyl group, a substituted alkyl group, an alkyl carbonyl group, an alkoxycarbonyl group, an aryl group, a substituted aryl group and an aryl carbonyl group. Furthermore, use of water, glycerol, and mixtures of water with an organic or inorganic compound such as glycerol, alkaline salts, or rare earth alkaline salts are also envisioned. One particular example is a mixture of 7% distilled water with 93% glycerol. The solution is stirred for fifteen minutes at room temperature.

According to another embodiment of the proposed solution, the frequency dependent material is an electrolyte gel, which includes a polymer material (used as a matrix), an ionic composition, and an ion transporter.

In general, all commercially available polymers (such as polyacrylic, epoxy material, polyurethane, polycarbonate, and polyphenylic material) which are miscible with the ionic composition and ion transporter material can be used as polymer matrix. The ionic composition having the anion and cationic species can be selected from the group including soluble alkaline or rare alkaline salts (such as $Li^+$, $K^+$, etc.), organic, or organometallic compound.

The ion transporter material can be a pure liquid such as propylene carbonate (PC), ethylene carbonate (EC) or a mixture of two or more liquids or a monomer having a polar group such as etheric or phenoxy group. This polar group can be a side chain or can be incorporated in polymer's main chain. For example: (2(2-ethoxyethoxy) ethylacrylate monomer), in which the etheric group is a long side chain and plays a role of ion transporter. An example of an electrolyte gel might be 10% wt. of PMMA dissolved in 80% propylene carbonate (PC). The solution is stirred over night at room temperature. Then a quantity of 10% wt. of $Li^+ClO4^-$ is added to the solution and stirred at room temperature. The final gel like material is used as the high dielectric constant layer part of a tunable LC lens.

According to a further embodiment of the proposed solution, the frequency dependent material can be a conductive ionic liquid. This material is classed in different organic, inorganic or organometallic compounds having the ionic species such as chlorate, perchlorate, borate, phosphate and carbonate. Specific, non-limiting examples of such materials include (1-butyl-3-methylimidazolium tetrafluoroborate) and (1-butyl-3-methyl imidazolium hexafluorophosphate).

Yet another example of the frequency dependent material is an electronic conductive polymer. The most important aspect of conjugated polymers is their ability to act as electronic conductors. These materials range from conventional polymers (e.g., polythiophene, polyaniline, polypyrrole, poly acetylene) or PEDOT poly(3,4-ethylenedioxythiophene) and PEDT from Clevios to new polymers with specialized conductivity properties such as low band gap and intrinsically conducting polymers. In a nano particle environment, materials can be dispersed in water, an organic solvent, monomer. For example, ATO $((SnO_2)_{0.9}(Sb_2O_5)_{0.1})$ dispersed in the water or in the polyethylene glycol diacrylate, or the nano particle used in a powder form coated by sputtering as a thin layer on the substrate. Or the carbon nanotubes (CNTs) that are allotropes of carbon with a cylindrical nanostructure. This material can be used as dispersed nanoparticles in the water or an organic material such as a monomer. The nanoparticles can be deposited by different techniques such as spin coating process on the surface of the glass.

Another possibility for preparing the frequency dependent layer is based on the deposition of metallic oxide as a thin film on the surface of a glass substrate. In this case, the metallic compound is deposited on the surface of the glass followed by an oxidation process. In this method, a metallic target is used for e-beam, sputtering or thermal evaporation process. For example, metallic oxide compounds such as $SnO2$, $Ti3O5$, $ZnS$, $ZnO2$, etc. prepared by e-beam technique can be used as a frequency dependent portion.

Conductive glass can also be used as a frequency dependent portion of a tunable LC lens. In this case, the conductive material can be doped in glass (bulk) and used as a target in a thin film deposition technique (such as e-beam, sputtering or sol-gel process, etc.). Examples include molybdenum, silver or a mixture of them doped directly into the glass and used as conductive glass target for thin film deposition technique. While a $Ti3O5$ (titanium oxide) layer can be about 10 nm thick, a polymer that provides some ionic conductivity can work well, although the thickness would be in the range of 0.1 to 30 microns.

The use of this "hidden and frequency controlled" electrode including frequency dependent material to provide for the spatial modulation of the electric field opens up a very large choice of optically transparent materials. Such a configuration of an LC lens is also simple and cost-effective to fabricate, while being insensitive to variations of physical parameters. Finally, the frequency dependence of conductivity is an additional tool, which allows the building of thicker films, and the control of the electric field spatial profile by its conductivity.

Those skilled in the art will also recognize that certain devices can make use of materials that have low, or no frequency dependence, but that can still be "sensitive" to the frequency of the excitation signal. This is the case where the combination of different elements provides electric field attenuation (in the transverse plane) depending upon the frequency, such as in distributed RCL electronic circuits.

Drive Signals

The specific materials used herein to provide frequency-dependent control of a corresponding optical device can make use of a variety of different driving signals having different characteristics. These signal characteristics include frequency variations (frequency modulation), and can also include amplitude (amplitude modulation) and duty cycle control (pulse width modulation). Some examples of these are discussed in more detail below.

Pulse-Width Modulation

Figure 15:
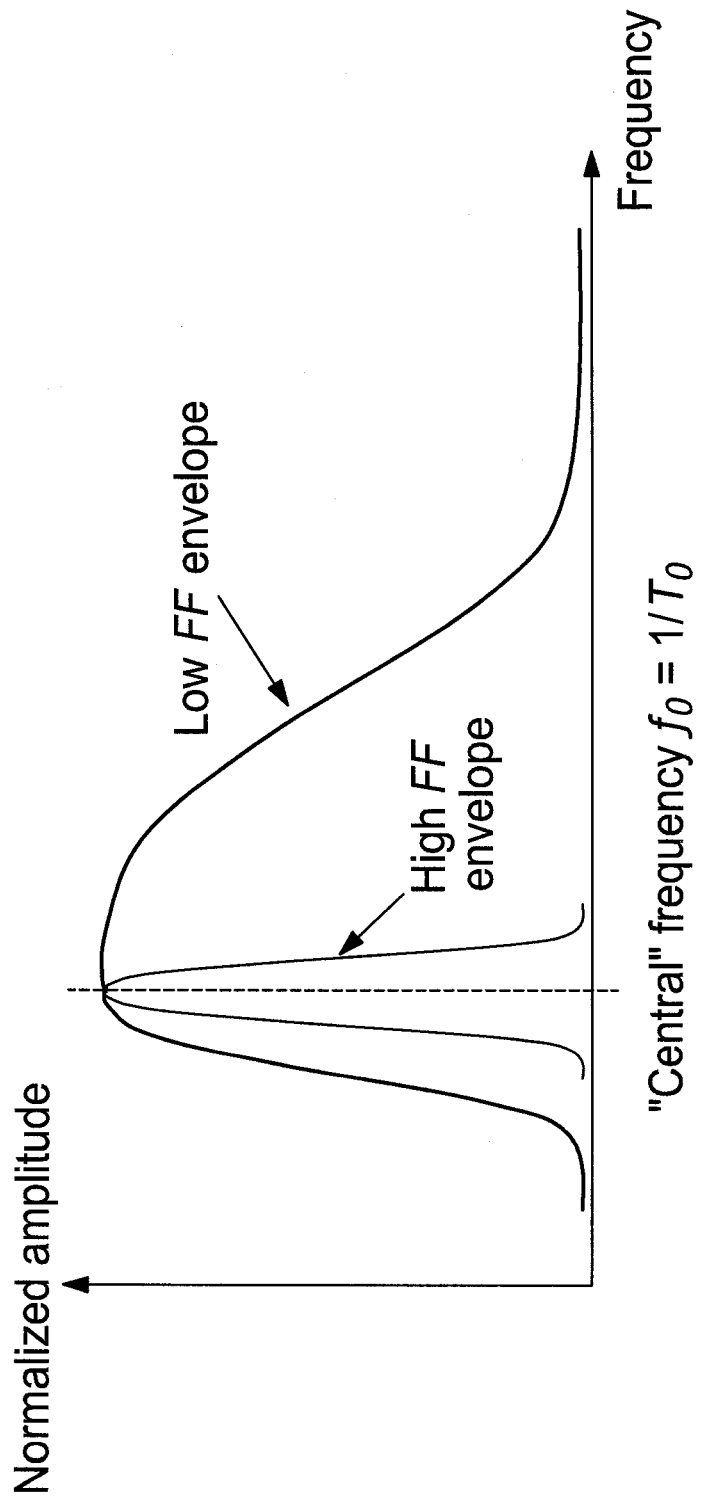
FIG. 15 is a graphical view showing the frequency domain characteristics of a pulse width modulated signal.

One way of providing frequency control is by using a so-called "pulse width modulation" (PWM) signal. FIG. 14 illustrates the parameters of a PWM signal, namely amplitude, period and duty cycle or fill factor ("FF"). As shown, the PWM signal has a characteristic defined by the total period, and the duration of the pulses determines the duty cycle. The frequency domain characteristics of the PWM signal are shown schematically in FIG. 15, which indicates the frequency content of a PWM waveform for different fill factors. It will be appreciated that a pulse train contains a dominant frequency corresponding to the waveform period. However, as the Fourier series for such a waveform demonstrates, higher frequency components of lower amplitude are contained in a square wave. Thus, while most of the energy of a 50% duty cycle square wave pulse train is contained in the "central" frequency corresponding to the PWM signal period, some energy is still carried in other frequencies. This is demonstrated by the fill factor shown in the "high FF" envelope indicated in FIG. 15. In the case of lower fill factors, the amount of energy in the PWM signal away from the central frequency is greater. This corresponds to a broader envelope that has more energy in the higher frequencies. In the case of higher duty cycles, the amount of energy in the PWM signal away from the central frequency is less. As an example, changing a PWM duty cycle from 50% duty cycle down to 5% would change RMS voltage by an order of magnitude from a normalized 1.0 down to 0.1, while at the same time causing a significant increase in the energy at higher frequencies.

Figure 16:
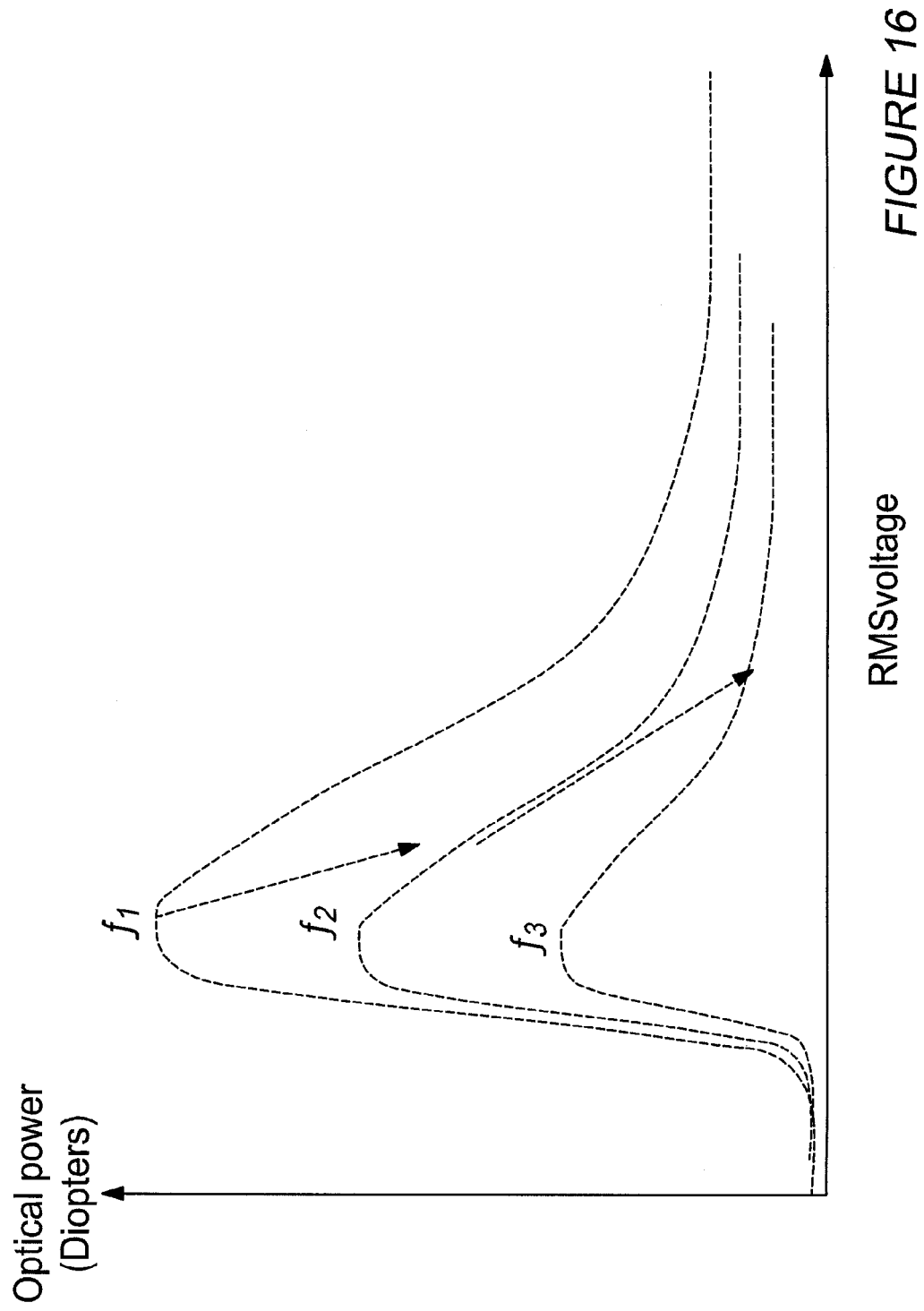
FIG. 16 is a graphical view showing transfer functions (optical power versus RMS voltage) of the LC lens driven at three different frequencies.

The control of a TLCL can make use of PWM, for example, in certain applications such as lenses for cell phone cameras. PWM control provides certain advantages for such a TLCL and can be seen as having the following characteristics:

1) For a given "central" frequency, e.g., $f=f_1$, the driving "maximum amplitude" can be set such that a maximum of optical power is achieved at relatively low FF taking into account that the real spectra of driving signal will be significantly broadened. Then, simply increasing the FF will increase the RMS voltage and thus will decrease the optical power, but this decrease will not follow the curve for $f_1$ (FIG. 16). In fact, due to the increase of FF, the spectral content of the driving signal will be significantly reduced, thus, the optical power will be reduced not only because of the growth of the RMS voltage but also because of the decrease of high frequency signal components. This will bring a much "faster" decrease of optical power, allowing the use of comparatively low voltages.

2). Once the maximum optical power is achieved for a given driving frequency and FF, the driving frequency can be shifted down, effectively changing from one transfer function to another (such as changing from $f_1$ to $f_2$ in FIG. 16). This helps avoid the need for high RMS voltages to bring the optical power of the lens to a minimum.

3). Combined or simultaneous FF and frequency changes can also be used to achieve optical power control. The proposed solution is directed to a tunable LC lens using a hidden (curved) electrode system to provide spatial modulation of the electric field via frequency tuning. Thus, tuning of the lens can be frequency controlled, although adjustment of the FF also changes the relative frequency content of the driving signal. As such, both FF and frequency can be used to tune the lens. As mentioned above, the devices of the proposed solution can be used for a variety of different applications, including tunable focusing, diffracting, steering, etc.

Amplitude Modulation

In contrast to PWM mode, amplitude modulation (AM) mode can also be used to modulate the lens at a particular frequency. FIG. 16 schematically demonstrates the transfer functions showing optical power versus RMS voltage for different driving frequencies $f_1$-$f_3$ in the Amplitude Modulation mode. Different options of control are possible with the proposed TLCL in both amplitude modulation (AM) and PWM mode. AM mode differs from PWM mode in that the PWM signal relies on control of the RMS amplitude by changing the filling factor to determine the relative high or low frequency content of the signal. In contrast, AM uses a set frequency signal with 100% fill factor and changes only the amplitude of it. The different curves in FIG. 16 show how, for different selected frequencies, RMS voltage can be used to change optical power of a TLCL. Such behavior is typical, e.g., for the lens shown in FIG. 33.

Frequency Modulation

Figure 17:
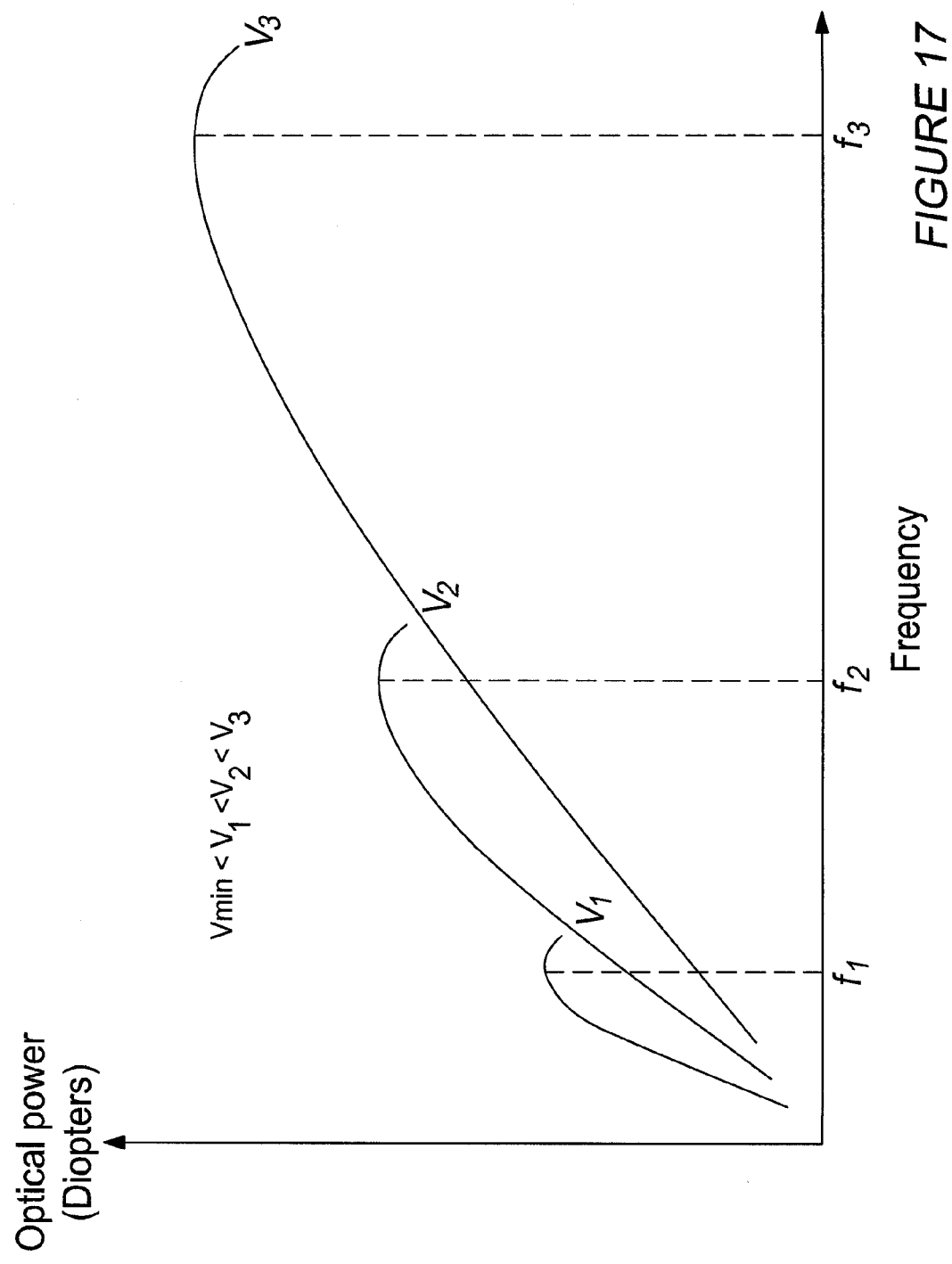
FIG. 17 is a schematic graphical view showing transfer functions of optical power versus frequency for a frequency tunable LC lens for three different control voltages.

FIG. 17 shows how a frequency controlled lens would behave for different control voltage amplitudes. For the different voltage amplitudes shown, the increase in frequency corresponds to an increase (and subsequent decrease) in the optical power of the lens. However, depending on the voltage, the optical power can have a higher maximum, and that maximum can occur at a higher frequency. Such behavior is typical, e.g., for the lens shown in FIG. 5. FIG. 17 is schematic emphasizing the features of frequency control of a TLCL. FIG. 17 mimics experimental results however FIG. 17 is not to scale in either dimension.

Complex Frequency Signals

Although PWM or AM signals are specifically discussed above, it is possible to use a driving signal that is simply carried on one frequency or is the combination of multiple individual frequency components. Such a "complex frequency" signal can be, for example a combination of individual signals at different frequencies all mixed together in a predetermined ratio (but dynamically variable). Unlike the PWM method, the complex frequency signal does not rely exclusively on square wave type signal shapes, and does not use an adjustment of filling factor to change the level of high and low frequency components. Examples of electric field profile shaping employing complex frequency signal are described in co-pending commonly assigned U.S. Provisional Patent application 61/289,995 filed 23 Dec. 2009 which is incorporated herein by reference.

Control Signal Generator Component

The control signal for tuning the optical device can be provided by a variable frequency control signal circuit configured to cause said device to control light propagation in the device as a function of control drive signal frequency.

Figure 18:
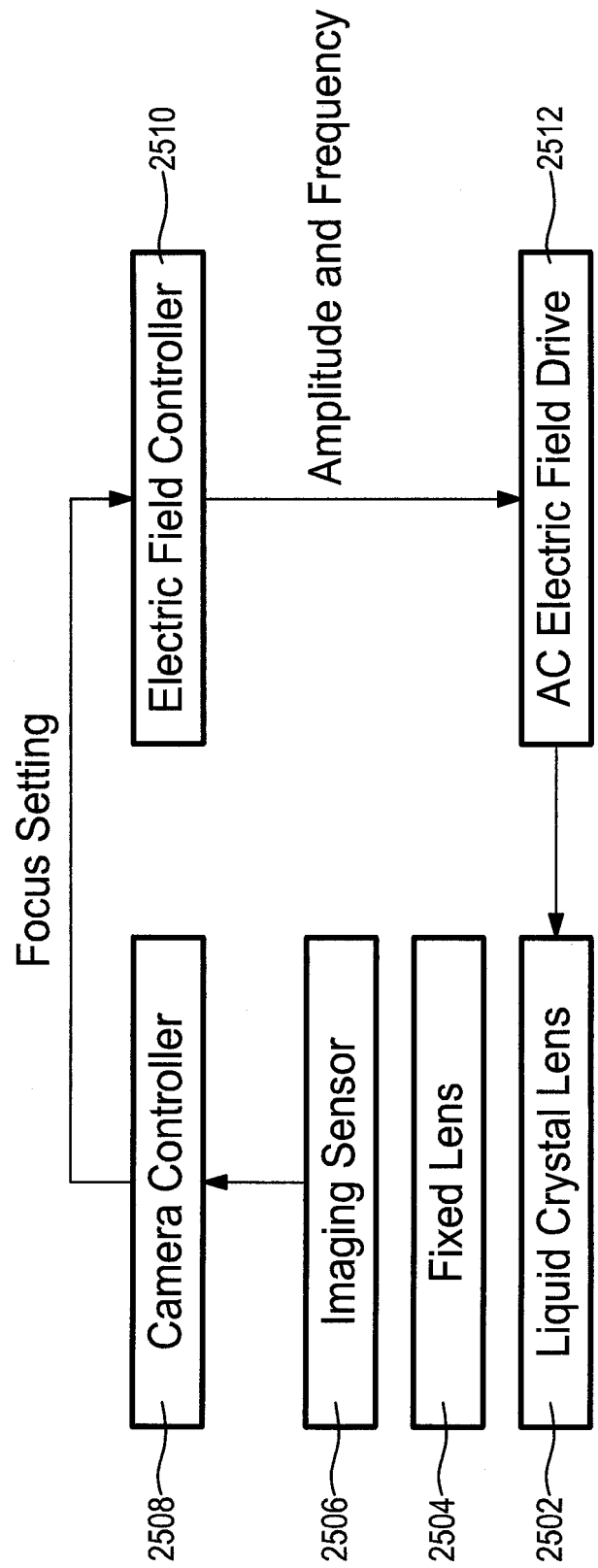
FIG. 18 is a schematic view of a camera system having a frequency tunable LC lens.

The control signal for tuning the optical device can be provided by a variable frequency control signal circuit configured to cause the device to control propagation of light in the device as a function of control signal frequency. As an example, in FIG. 18, there is shown schematically a camera having a LC lens 2502 combined with at least one fixed lens 2504 to focus an image onto an image sensor 2506 with the LC lens 2502 providing focus control. The image is fed to a camera controller 2508 that includes an autofocus function that outputs a desired focus value. An electric field controller 2510, typically using lookup tables (with possible/optional information about the geometry, material, temperature, sheet resistance, camera, etc.), translates the focus value into an electrical parameter, in this case a desired fill factor. In the case that tuning cannot be achieved only by the fill factor setting at a single PWM waveform amplitude and period, the controller 2510 can adjust a PWM amplitude setting and period setting. The PWM drive circuit 2512 itself can be a conventional PWM circuit. Those skilled in the art will appreciate that components 2508 and 2510 can be implemented using microcode executed on a microcontroller, while component 2512 can comprise voltage sources switched under the control of the microcontroller to pulse width modulation circuitry also controlled by the microcontroller to have a desired frequency and duty cycle.

In the case that the frequency content is to be controlled to reduce the presence of the higher frequencies, the PWM amplitude can be stepped down while the duty cycle is then increased to achieve the same RMS voltage as a mechanism to avoid the creation of the higher frequencies that the electrode system or the LC cell will respond to in an undesirable manner.

Parametric Liquid Crystal Lens

Having described the use of frequency dependent materials in a Tunable Liquid Crystal Lens (TLCL), it is understood that the above description relates to ideal manufacturing conditions and applications wherein such TLC lenses can be positioned with a high degree of accuracy and precision. However as it is apparent from FIGS. 10A to 10E, raw usable aperture can be quite different from that defined by the layered structure, for example by a hole patterned electrode structure. For example the uniformity of the TLC lens across the hole patterned electrode aperture can be less than theoretically possible, manufacturing of optical assemblies including TLC lenses can introduce abnormalities/aberrations (astigmatism, coma, dispersion, optical axis tilt, optical axis shift, etc) either in fabricating the TLC lens itself or in the overall optical assembly. As another example, the application itself may require image stabilization. There is a need to address at least these scenarios.

Figure 19:
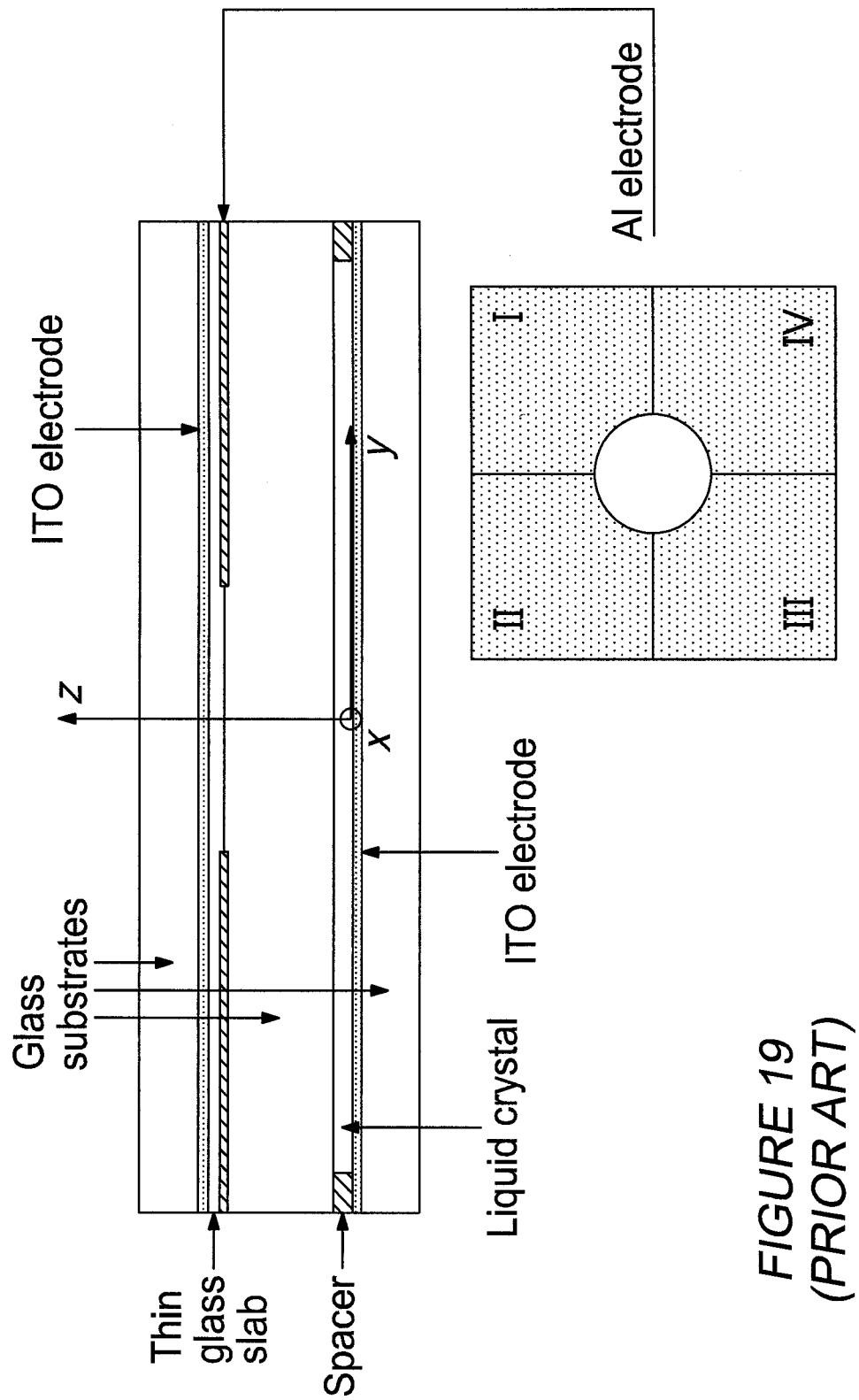
FIG. 19 illustrates a prior art liquid crystal lens design using a uniform planar upper electrode, a segmented, four-quadrant electrode placed below the upper electrode, and a bottom uniform planar electrode on a bottom of a liquid crystal cell.

FIG. 19 illustrates a prior art liquid crystal lens design using a uniform planar upper electrode, a segmented four-quadrant electrode placed below the upper electrode, and a bottom uniform planar electrode on a bottom of a liquid crystal cell.

Figure 20A:
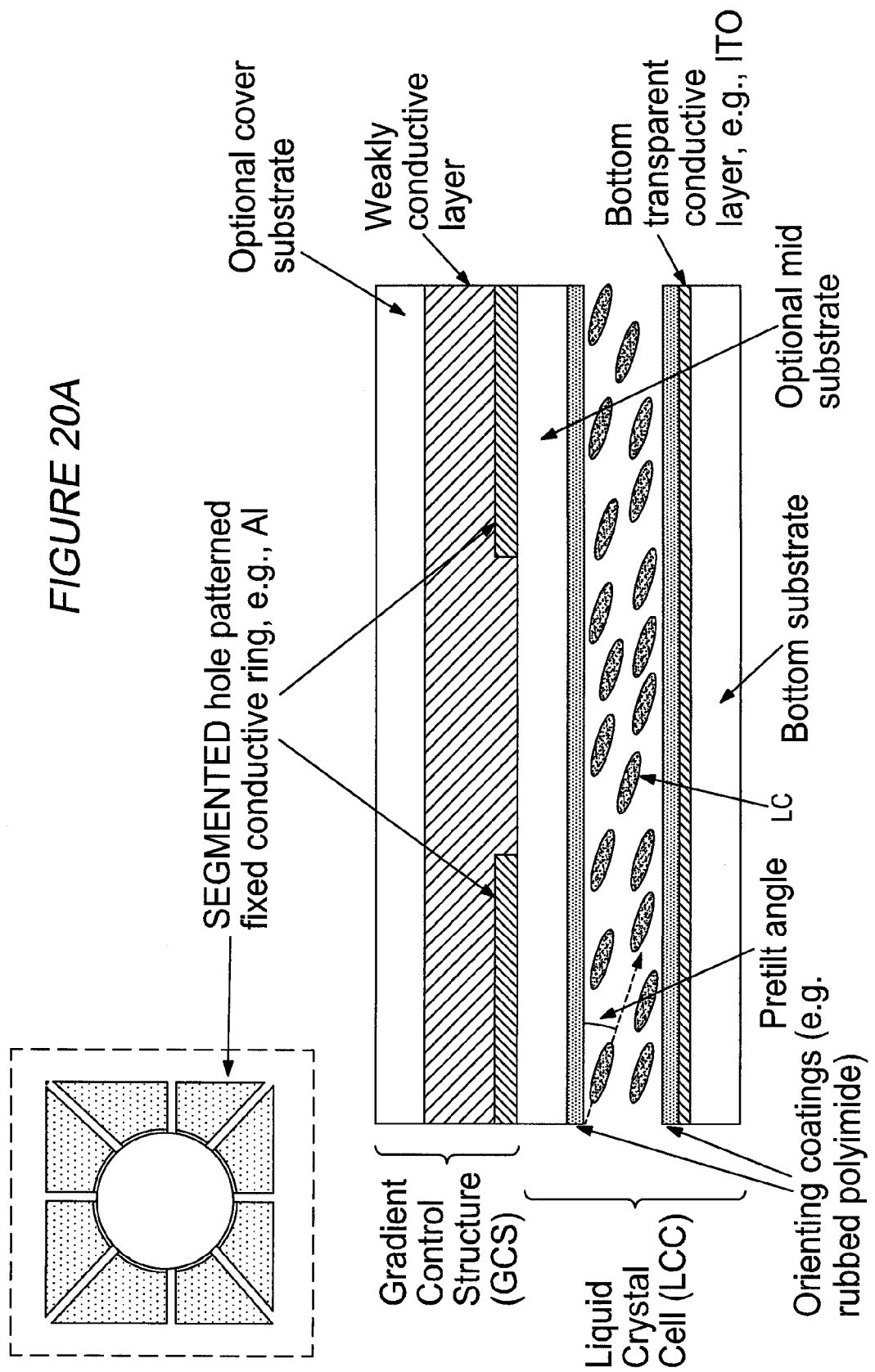
FIG. 20A illustrates a side sectional view of a tunable liquid crystal lens with an inset top view of a segmented top electrode according to an embodiment in which a frequency dependent material is above the segmented, hole patterned electrode.
Figure 20B:
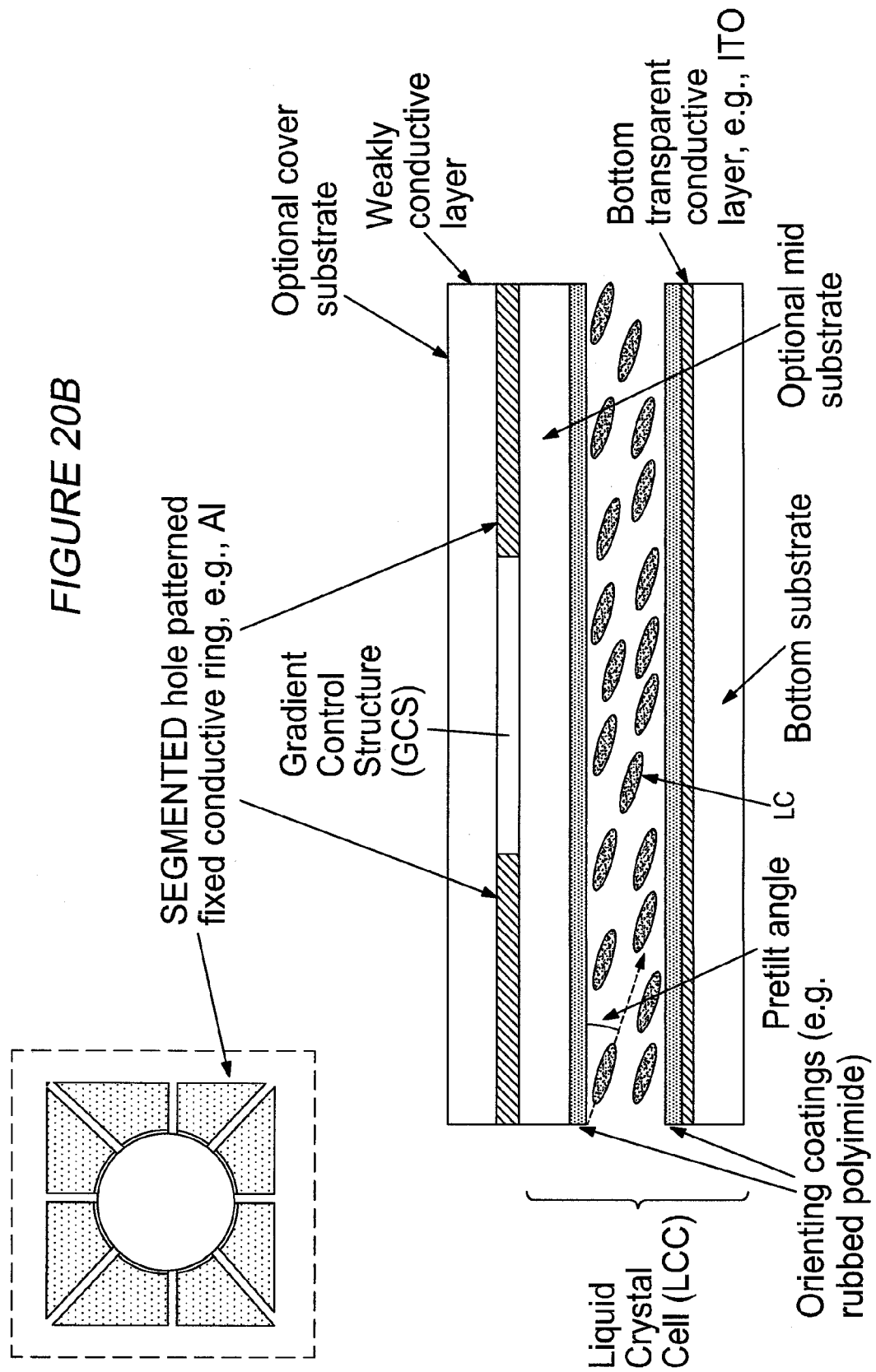
FIG. 20B illustrates a side sectional view of a tunable liquid crystal lens with an inset top view of a segmented top electrode according to an embodiment in which a frequency dependent material is within the aperture of the segmented, hole patterned electrode.
Figure 20C:
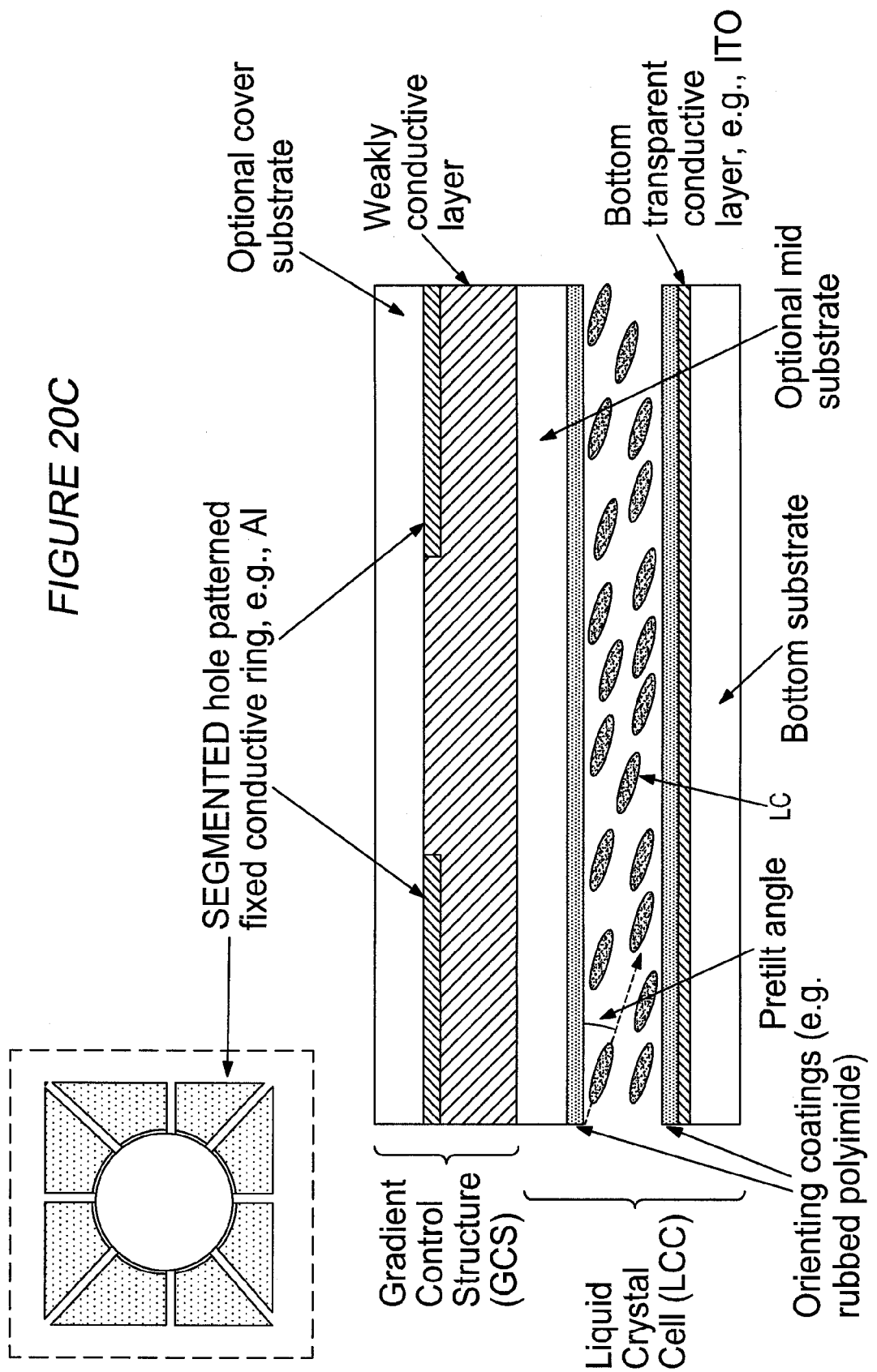
FIG. 20C illustrates a side sectional view of a tunable liquid crystal lens with an inset top view of a segmented top electrode according to an embodiment in which a frequency dependent material is below the segmented, hole patterned electrode.

FIG. 20A illustrates a side sectional view of a tunable liquid crystal lens with an inset top view of a segmented top electrode according to an embodiment of the proposed solution in which a frequency dependent material is above the segmented, hole patterned electrode. The positioning of the frequency dependent material can be on top of and covering the segmented electrode, within the aperture of the segmented electrode (see FIG. 20B) or underneath the segmented electrode (see FIG. 20C).

By varying only the voltage amplitudes of common frequency control drive signal components fed to the segments a complex electric field spatial modulation can be provided. Alternatively, the complex electric field spatial modulation can be provided by varying the frequencies of the drive signal components fed to the segments. The above described functionality of the weakly conductive layer having frequency dependent material is employed on a per electrode segment basis in order to provide a combined effect to which all electrode segments contribute. That is local charge penetration in the frequency dependent layer is controlled by each electrode segment to control the extent of the patterned electrode in the corresponding immediate vicinity of each electrode segment, the combined extent of all electrode segments being used to spatially modulate the electrical field in a complex way using a symmetric physical structure. The complex spatial modulation of the electric field in turn imparts a particular effect to the incident beam via a complex director orientation in the LC layer exhibiting a complex refractive index distribution across the LC layer. In the most general sense, the optical element provided by the LC layer is caused to "change shape" in the sense of providing a particular programmed refractive index distribution. The TLC lens can be calibrated with a desired control drive signal of a frequency and an amplitude for each segment as a function of a desired optical effect. A variety of effects can be applied to an incident beam. Both steady state and quasistatic optical effects are illustrated herein.

Without limiting the invention, for video/image acquisition applications specific sets of frequency and amplitude drive signal components are useful and a controller can draw on calibrated values from a calibration look-up-table. For example, optical power adjustment and optical axis reorientation are used in video/image acquisition to provide focusing functionality and to stabilize the image to be acquired by moving the optical axis of the TLC lens to compensate for camera motion (handheld/vibration environment). For image tracking applications, optical axis reorientation is employed to keep stable a moving scene.

Figure 22:
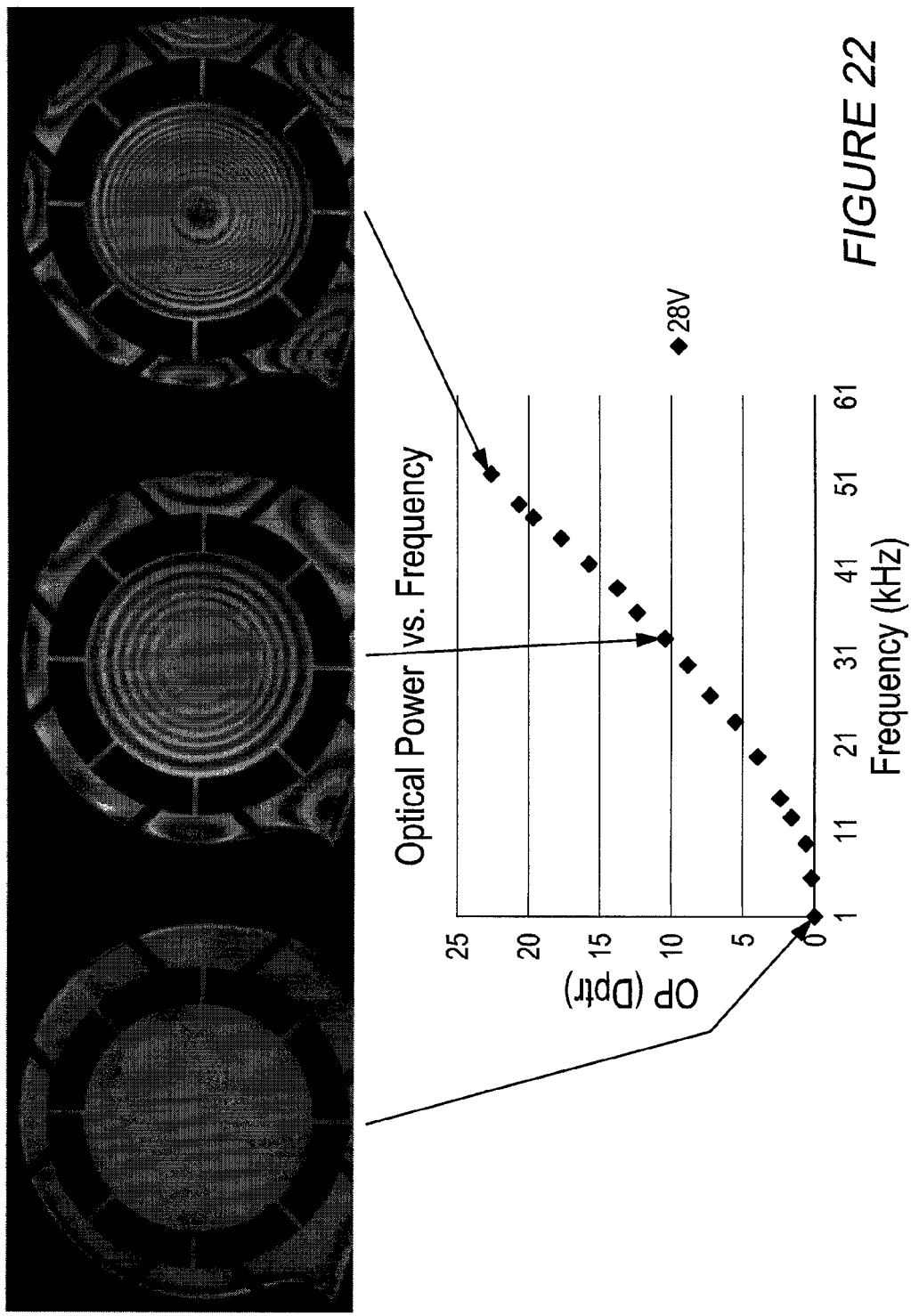
FIG. 22 illustrates experimental results showing optical power variation with frequency of a drive signal applied to all segments of a segmented electrode.
Figure 23:
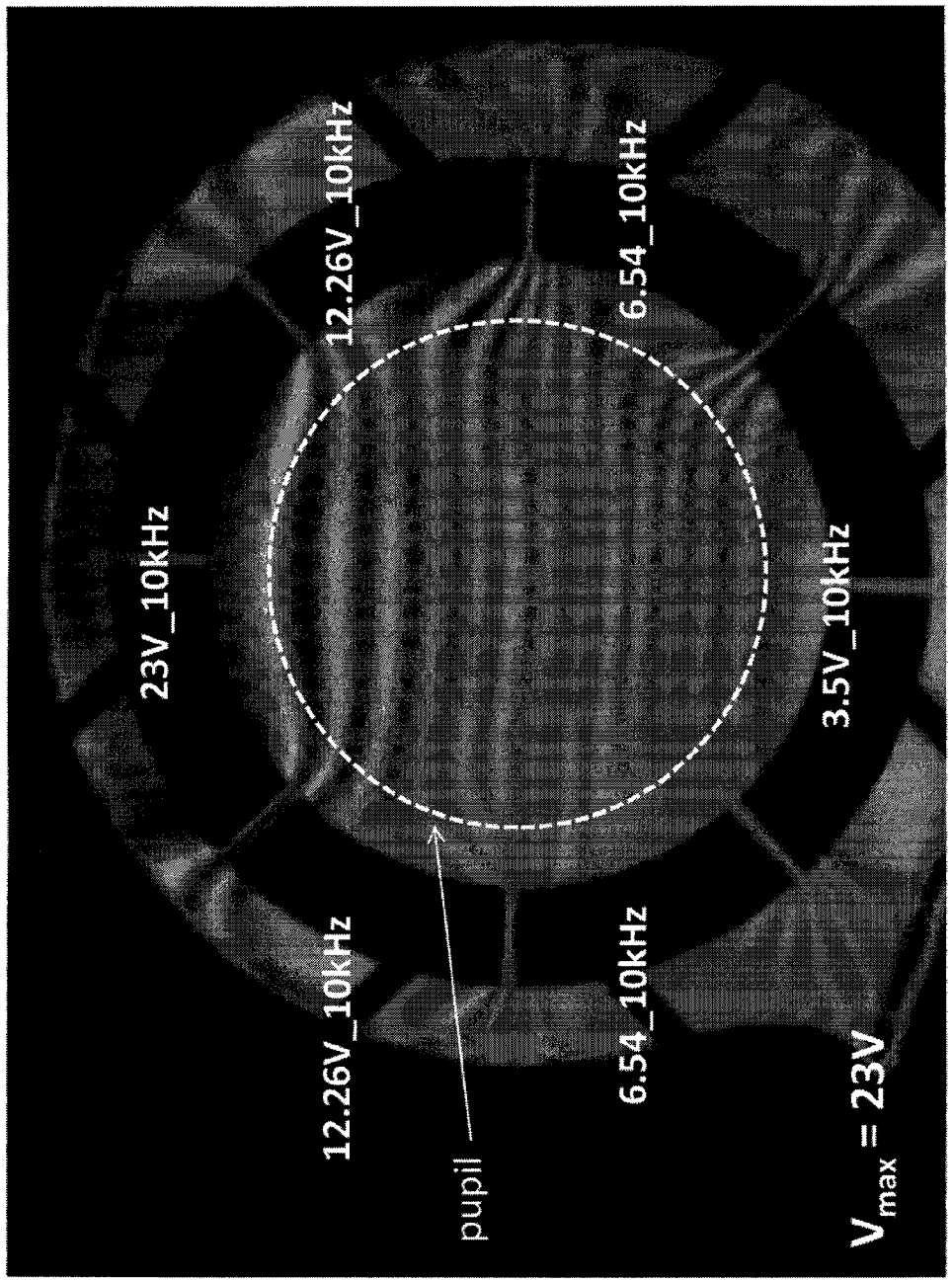
FIG. 23 illustrates experimental results showing angular optical axis reorientation.
Figure 24A:
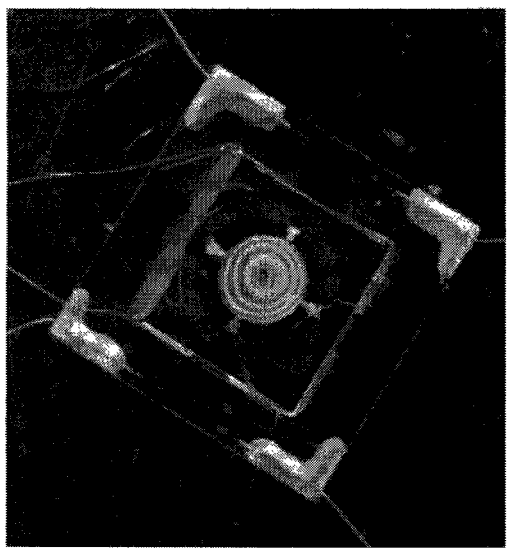
FIGS. 24A to 24D illustrate a top view of a liquid crystal lens of the embodiment of FIG. 20A in different states of shift of the optical axis using the segmented electrodes.
Figure 24D:
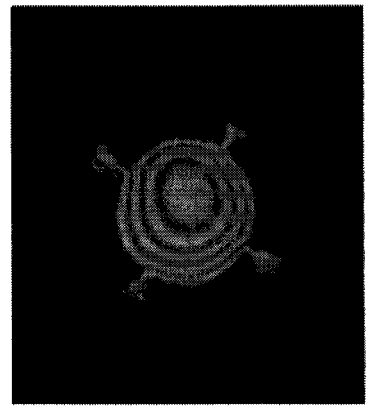
Figure 24C:
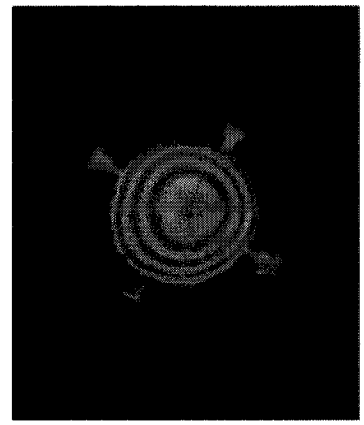
Figure 24B:
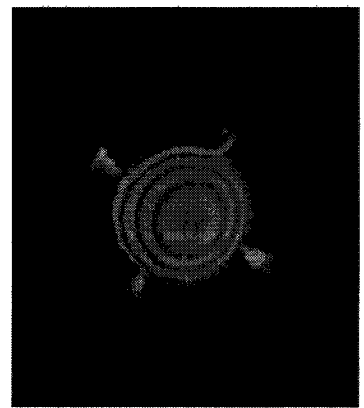

The operation of such a TLC lens with segmented electrodes and frequency dependent weakly conductive layer can best be illustrated with reference to FIG. 21 which describes optical beam shaping modes typically employed in video/image acquisition. An LC layer having a spatially invariant refractive index distribution across the TLCL aperture does not introduce differential changes in an incident optical beam and a planar phase front propagates without change. The LC layer operates much like a slab of glass (ignoring polarization effects). An LC layer having a spatially variant refractive index distribution across the aperture which is symmetric lenticular causes an incident planar phase front to focus. FIG. 22 illustrates optical power variation with the frequency of a 28V amplitude drive signal applied to all electrode segments. An LC layer having a spatially variant refractive index distribution across the aperture which is linearly variant causes an incident planar phase front to tilt or pan (angular optical axis reorientation). FIG. 23 illustrates angular optical axis reorientation for a ring electrode of a 1.85 mm diameter with a usable pupil of 1.49 mm. Applications of angular optical axis reorientation includes beam steering. Combined optical beam shaping can be provided by tilting/panning and focusing in a single TLCL using the same frequency dependent material weakly conductive layer and LC layer which results in shifting the optical axis. FIG. 24 illustrates a top view of a liquid crystal lens of the embodiment of FIG. 20A in different states of shift of the optical axis using the segmented electrodes. For certainty, the combined drive signal applied to the segmented electrodes includes frequency mixing wherein at least one frequency with appropriate voltage amplitude(s) is applied to provide optical power control in focusing an image and at the same time another frequency with appropriate voltage amplitudes is applied to provide beam steering control in image stabilization.

Figure 21:
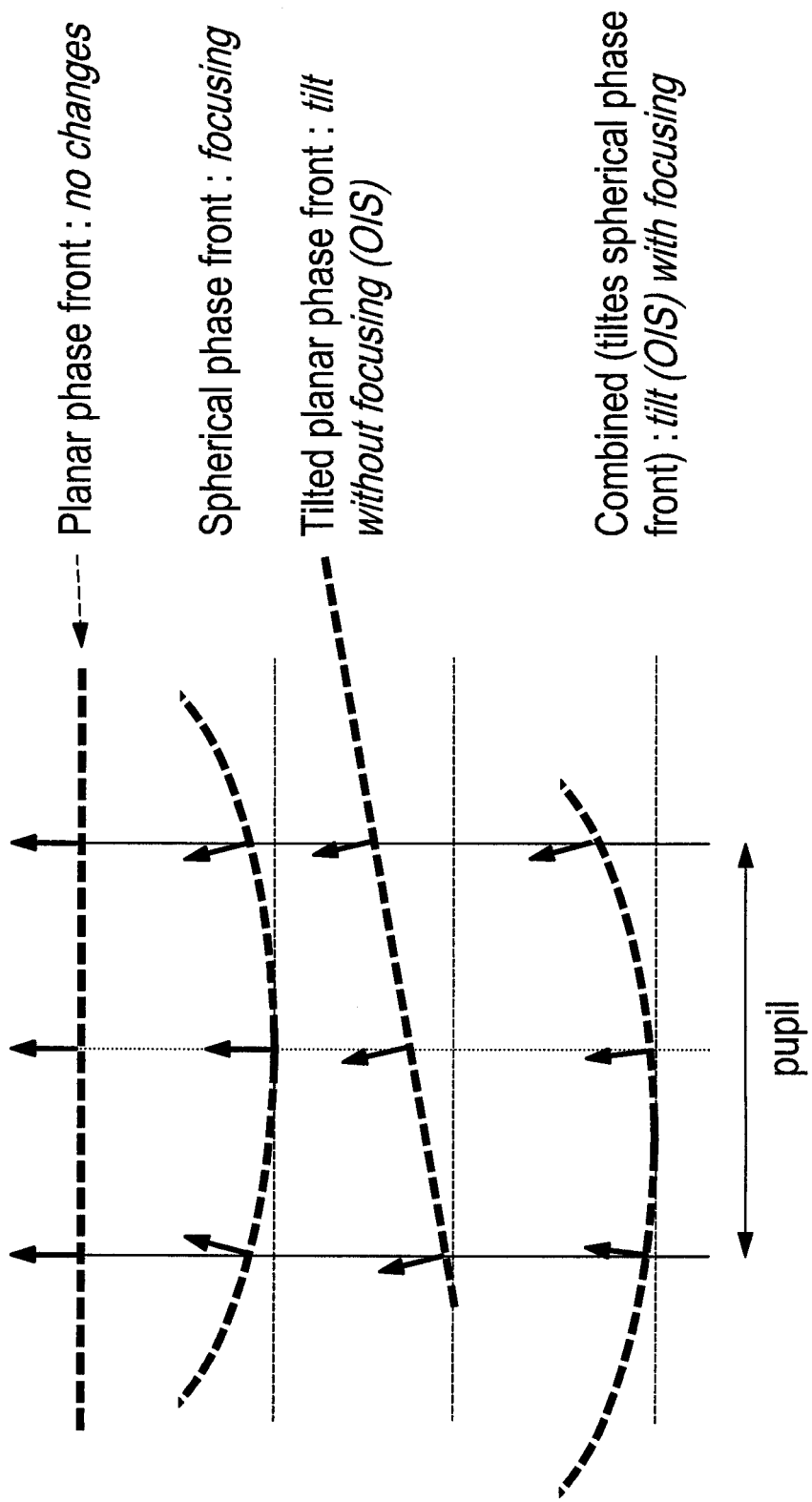
FIG. 21 is a schematic diagram illustrating optical beam shaping modes.
Figure 25:
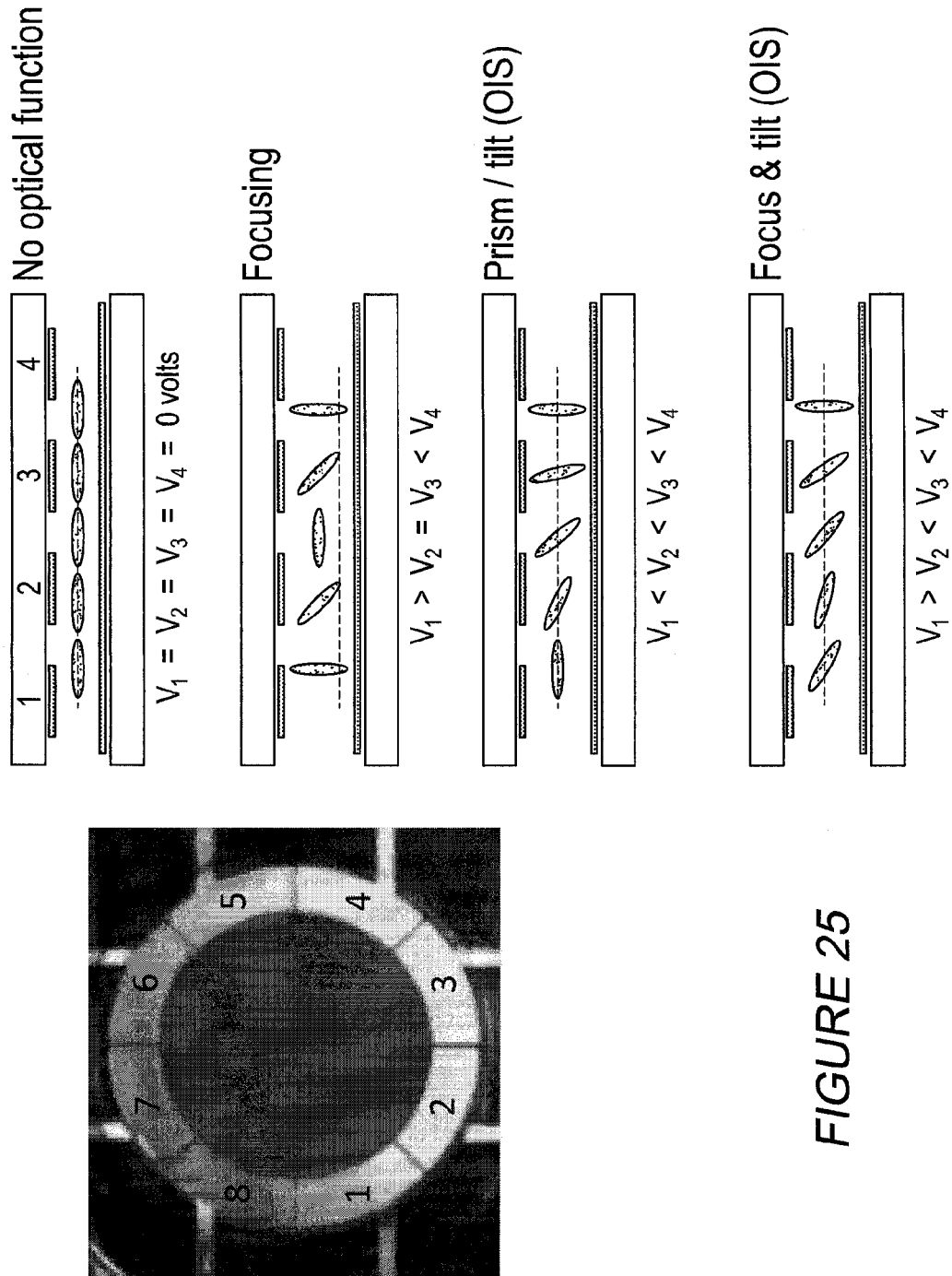
FIG. 25 schematically illustrates LC layer refractive index distributions corresponding to the wave fronts illustrated in FIG. 21.

FIG. 25 illustrates refractive index distributions in the LC layer corresponding to the wave fronts presented in FIG. 21 for a ring electrode having eight segments. Examples of relative voltage amplitudes of segment driving signal components are shown (V4=V5, V3=V6, V2=V7, V8=V1), for simplicity the corresponding frequencies are omitted.

It is important to reemphasize that a TLC lens having a frequency dependent weakly conductive layer implementing functionality described herein above can be employed in providing image stabilization, for example by employing a suitable feedback mechanism such as but not limited to an accelerometer implementing a vibration sensor. Image stabilization is important in handheld applications as well in vibrating environments. A prior art attempt by Bryan James, Andrew Hodge and Aram Lindahl described in US 20100309334 filed in Jun. 5, 2009 proposes continuous acquisition of multiple images into a very large buffer without image stabilization and the selection of an image from the acquired set in post processing based on an image acquisition time at which a motion sensor registered least motion. In contrast, employing an active feedback mechanism and active image stabilization in accordance with the proposed solution herein is enabled by a fast TLCL response and provides a reduction in image storage and vast fast memory requirements. A fast TLCL employing the above described weakly conductive layer is described in co-pending commonly assigned U.S. 61/422,115 entitled "Fast Tunable Liquid Crystal Optical Apparatus and Method of Operation" filed Dec. 10, 2010 which is incorporated herein by reference.

Figure 27:
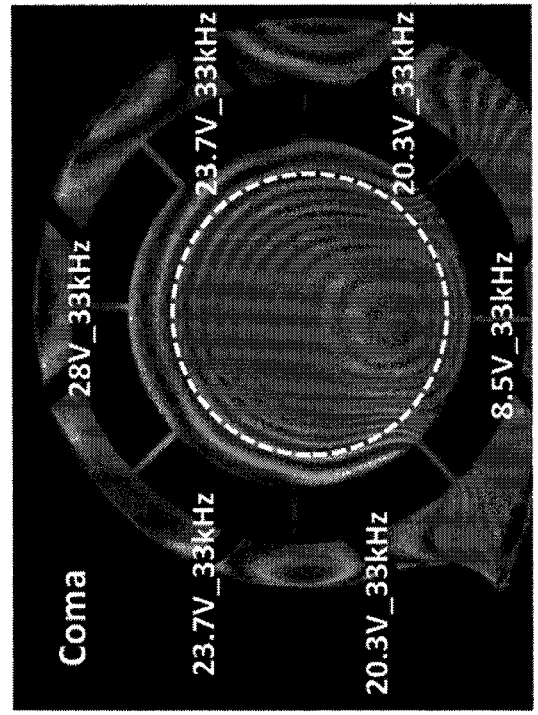
FIG. 27 illustrates a segmented electrode TLC lens configured to compensate for coma errors.
Figure 26:
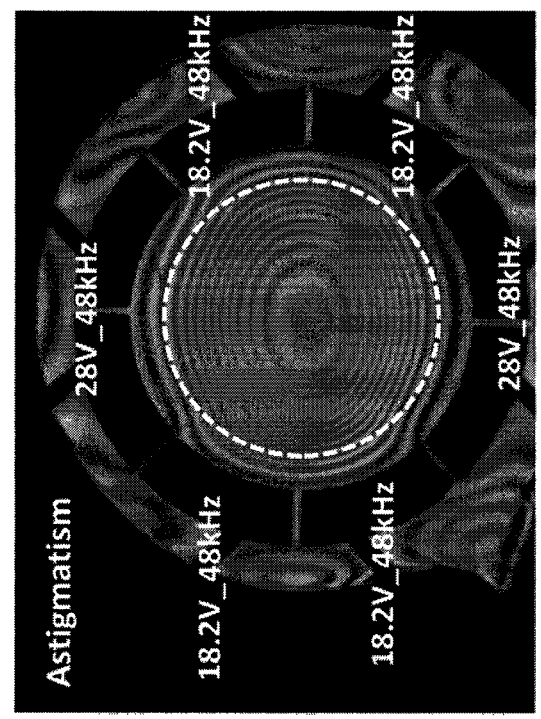
FIG. 26 illustrates a segmented electrode TLC lens configured to compensate for astigmatism errors.
Figure 28A:
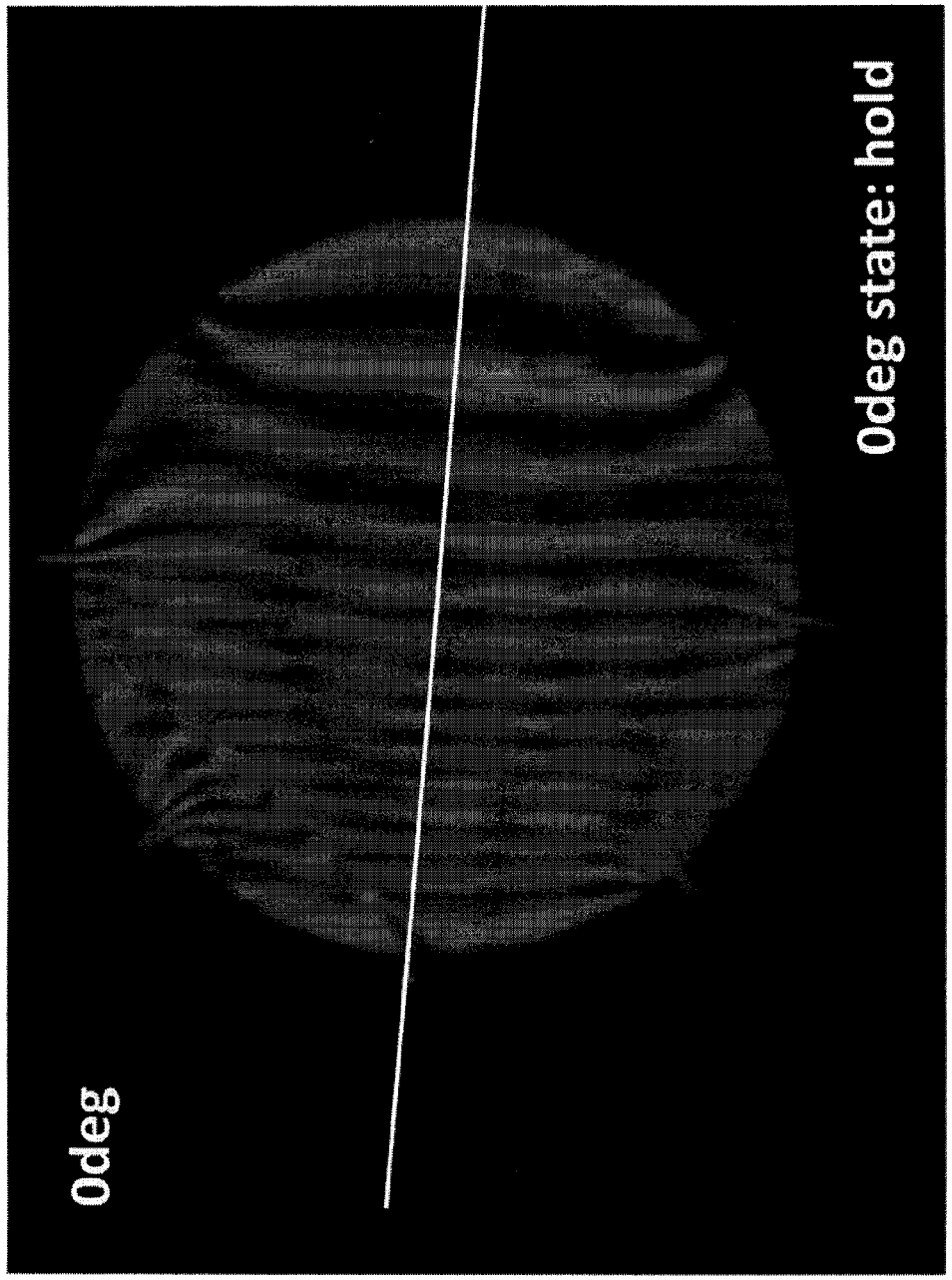
FIGS. 28A to 28E illustrate quasistatic control of a four segment hole patterned electrode providing an arbitrary direction of optical axis tilt between 0 deg and 45 deg.
Figure 28B:
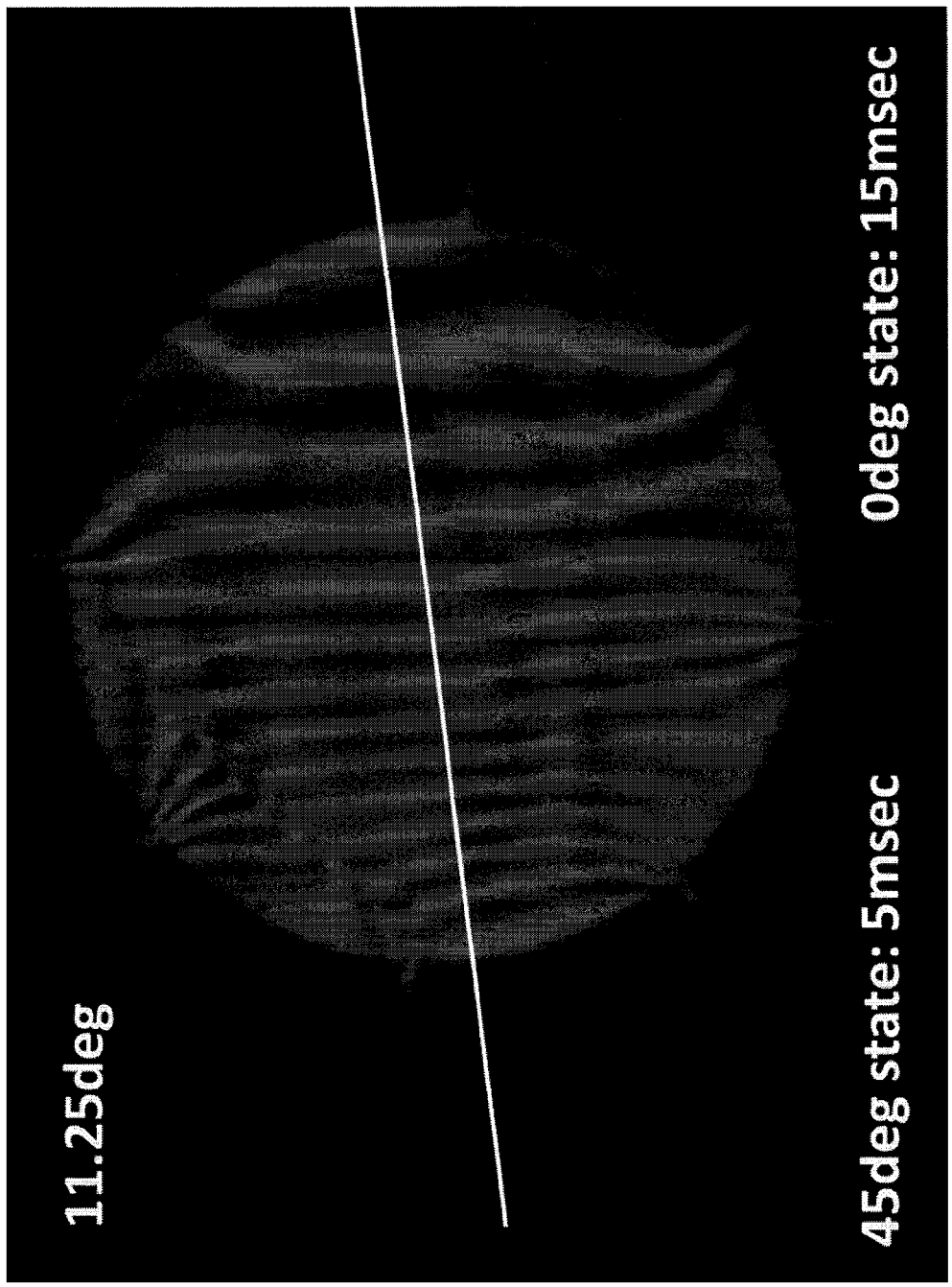
Figure 28C:
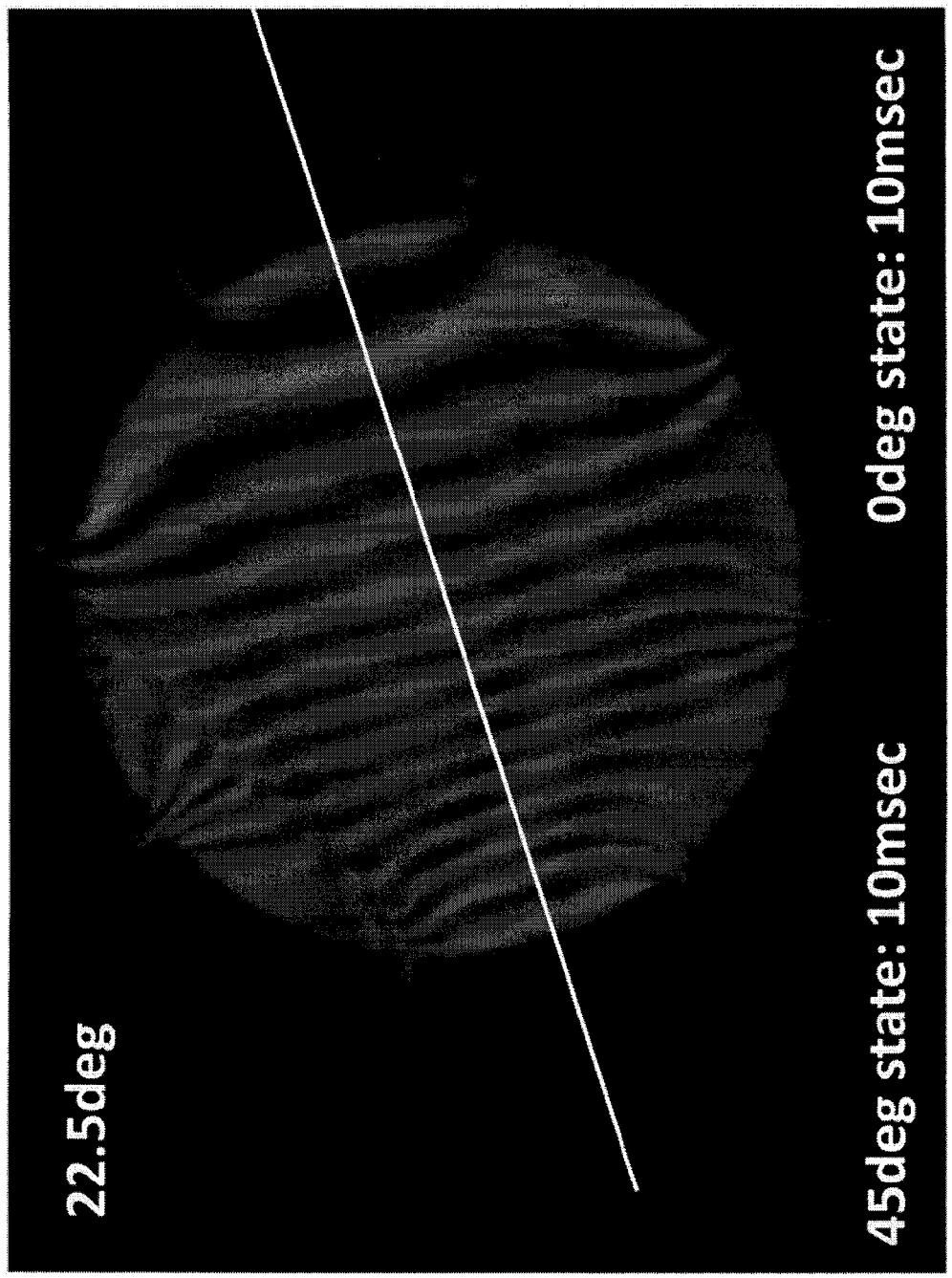
Figure 28D:
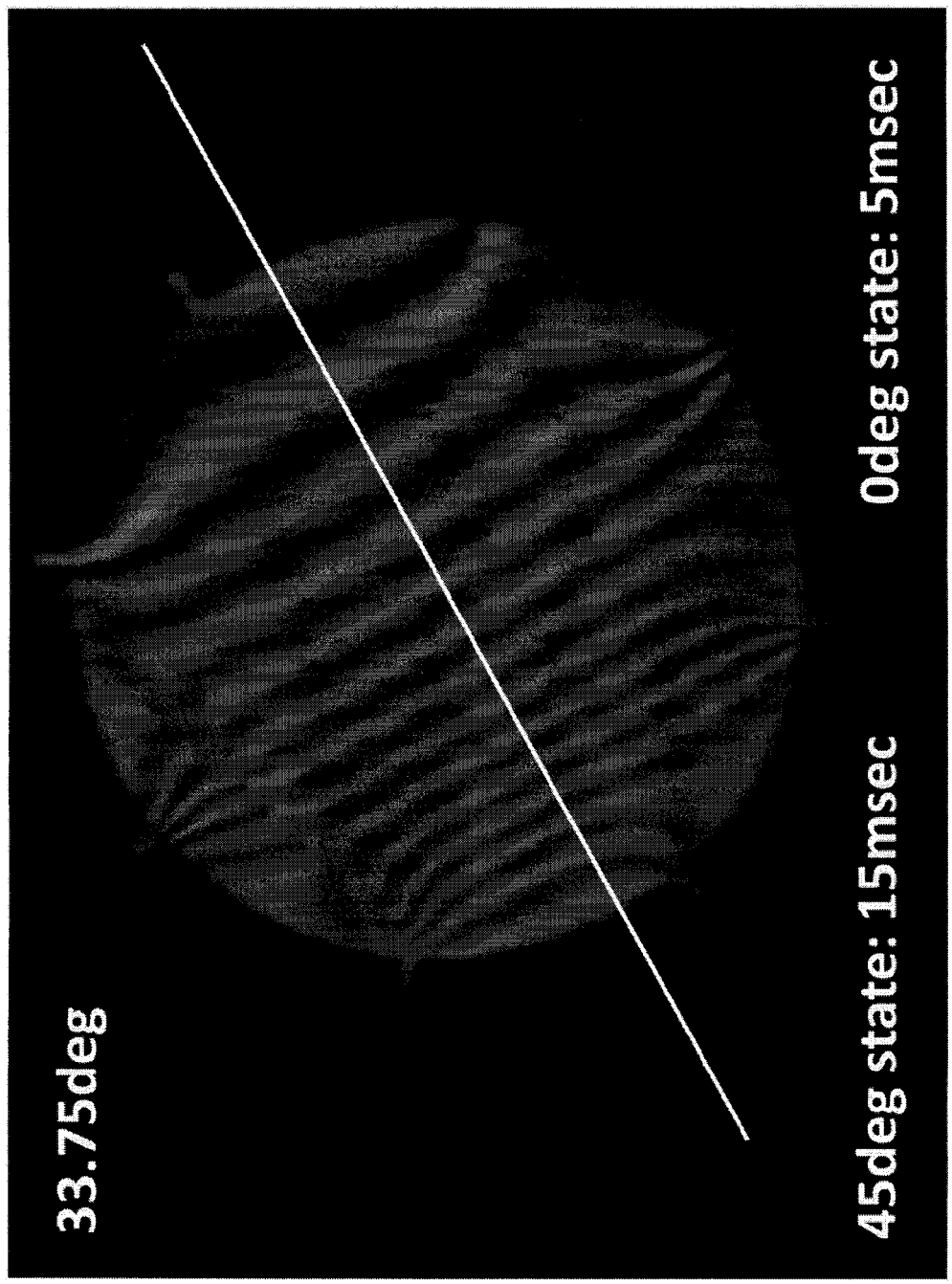
Figure 28E:
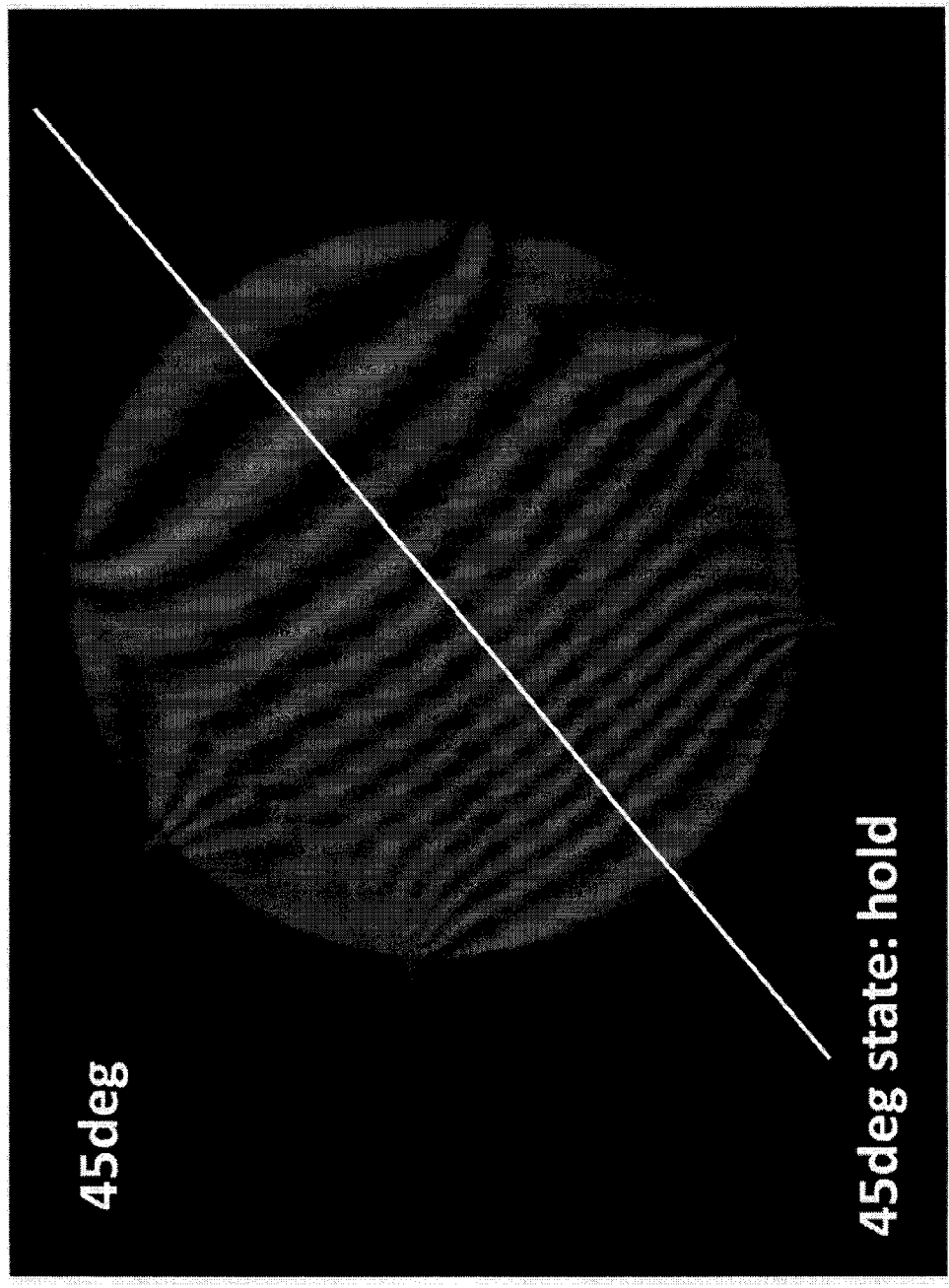

The proposed solution can also be applied to manufacturing wherein particular drive signal components are employed to cause the segmented electrode TLC lens with frequency dependent weakly conductive layer to compensate for manufacturing/assembly defects, in this sense such segmented electrode TLC lens can be understood as a parametric (lens) optical element. FIG. 26 illustrates a segmented electrode TLC lens configured to compensate for astigmatism errors. FIG. 27 illustrates a segmented electrode TLC lens configured to compensate for coma errors. Coma errors differ from optical axis shifting at least in that the modified wave front does not focus at the same point in the same plane.

Multiple time variant (phase shifted) drive signal components may be employed to provide further optical property control. For example FIGS. 28A to 28E illustrate quasistatic control of an eight segment hole patterned electrode (using four drive signal components) wherein an arbitrary direction of optical axis tilt is provided between 0 deg and 45 deg.

Multi Element Layered Structure

The invention is not limited to the above described parametric TLC lens which implements both lens functionality and image stabilization/error correction/steering/vibration reduction/etc. using the same segmented electrode, frequency dependent weakly conductive layer and LC layer.

Figure 29A:
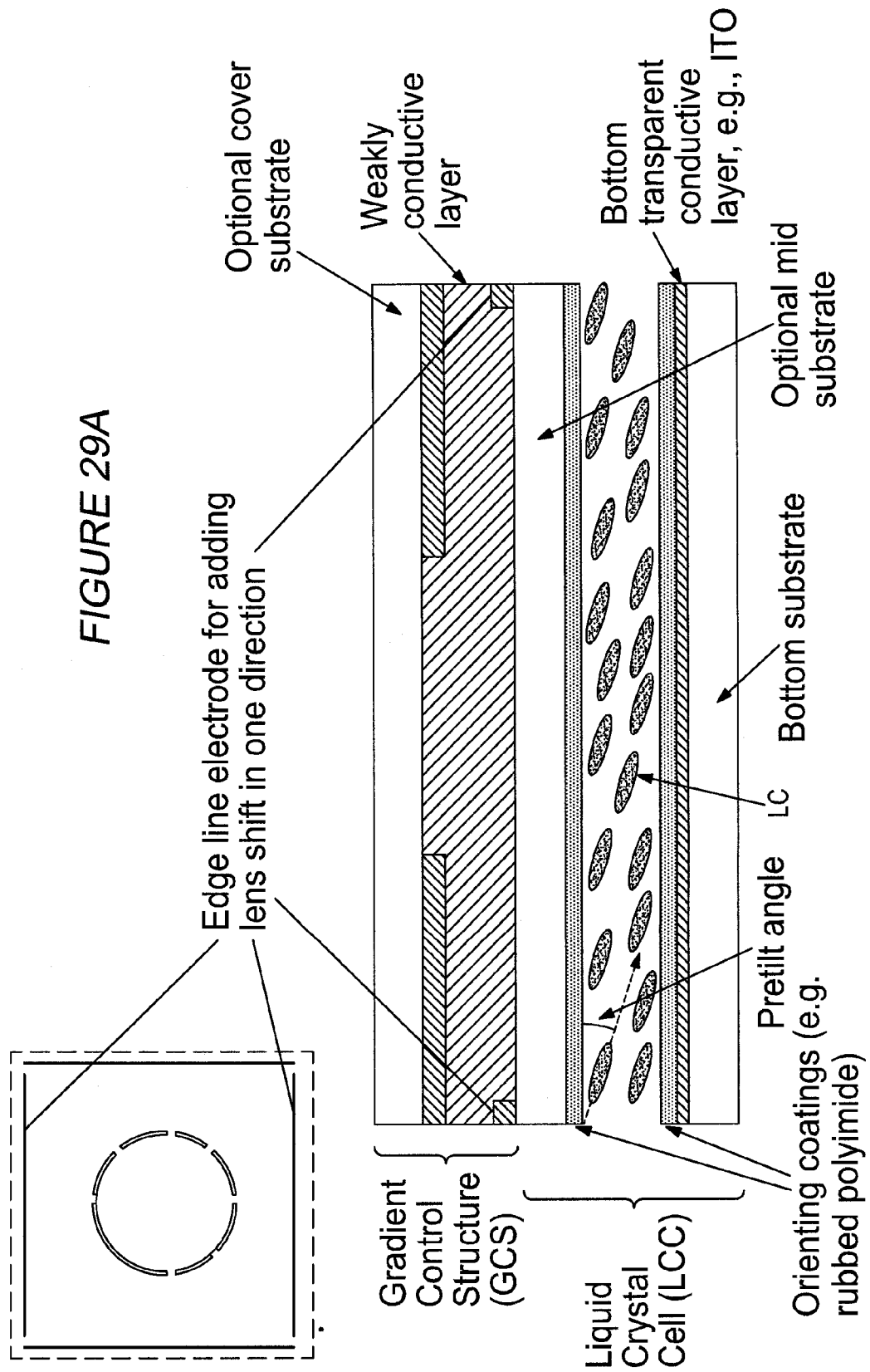
FIG. 29A illustrates a side sectional view of a tunable liquid crystal lens with an inset top view of a top, hole patterned electrode with additional lateral electrodes placed under the top hole patterned electrode according to an embodiment.
Figure 29B:
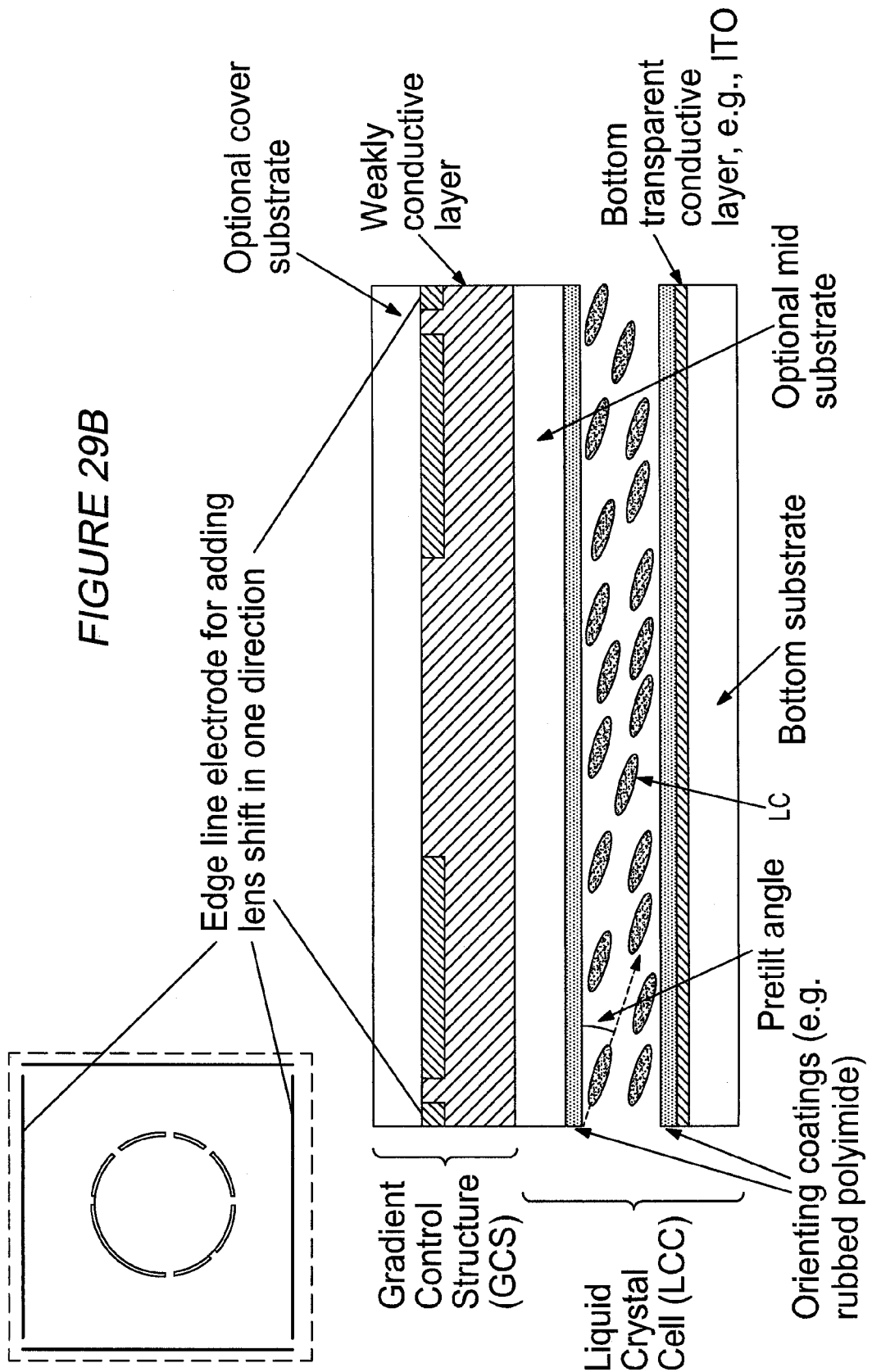
FIG. 29B illustrates a side sectional view of a tunable liquid crystal lens with an inset top view of a top, hole patterned electrode with additional lateral electrodes placed outside of periphery of the top hole patterned electrode according to an embodiment.

For example, the shifting of the electric field can be achieved in the layered structure without using a segmented electrode. For example, FIG. 29A illustrates a side sectional view of a tunable liquid crystal lens with an inset top view of a top, hole patterned electrode with additional lateral electrodes placed under the top hole patterned electrode. In this embodiment, a frequency is applied to a lateral or side electrode that increases the electric field across the liquid crystal cell in a manner that decreases from one side to the other which causes an introduction of an optical power differential (wedge) higher on one side compared to the other. This type of control is a type of beam steering that can be combined with lens formation. The side electrodes can be under the hole patterned electrode as shown or on a same substrate level on an outside of the periphery of the hole patterned electrode as shown in FIG. 29B. Notably, the shift produced is independent of the rest of the TLC lens structure. This technique provides any other TLC lens forming structure with beam steering, that is any TLCL structures, for example described in: commonly assigned U.S. Provisional Patent application 61/289,995 filed 23 Dec. 2009, co-pending commonly assigned International Patent Application WO 2010/006,420 claiming priority from U.S. Provisional Application 61/080, 493 filed 14 Jul. 2008, International Patent Application WO 2010/006,419 entitled "Surface Programming Method And Light Modulator Devices Made Thereof" filed 14, Jun. 2009, and International Patent Application WO 2007/098,602 entitled "Method and Apparatus for Spatially Modulated Electric Field Generation and Electo-Optical Tuning using Liquid Crystals" filed 2 Mar. 2007 all of which are incorporated herein by reference.

Figure 30:
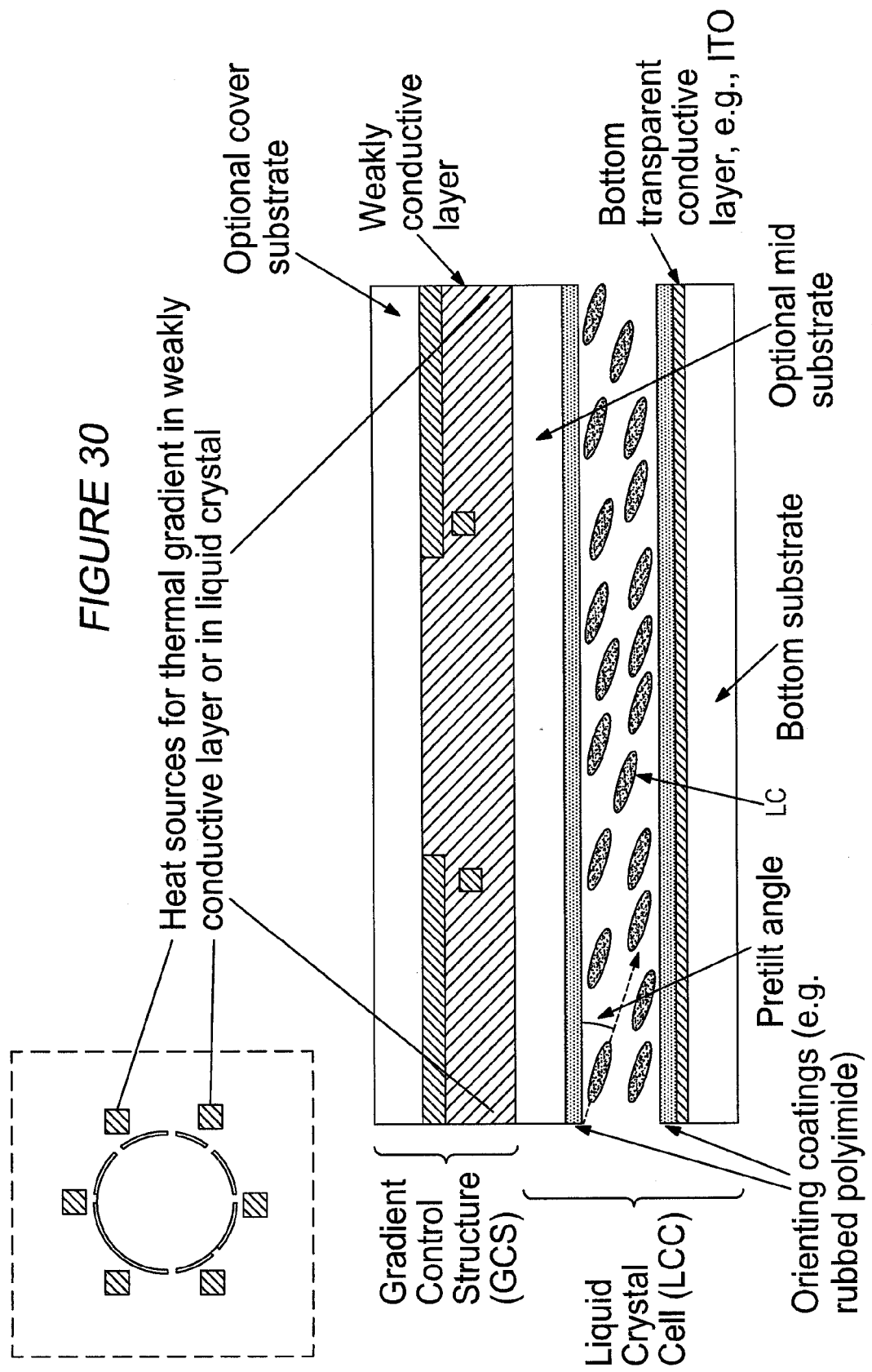
FIG. 30 illustrates a side sectional view of a tunable liquid crystal lens with an inset top view of a top, hole patterned electrode with additional resistive heat sources placed under the top hole patterned electrode according to an embodiment.

Similarly, the behavior of the frequency dependent material can be affected by temperature. As shown in FIG. 30, the creation of a controllable thermal gradient within the frequency dependent material layer can be used to move the optical axis of the lens. The temperature also affects the ability of the liquid crystal to change orientation, and thus this approach can be used within the liquid crystal layer as well. It will be appreciated that this technique for shifting the optical axis causes the introduction of an optical power differential (wedge) higher on one side compared to the other, and can be used independent of the manner in which liquid crystal orientation is provided to cause the lensing effect. Without limiting the invention, different arrangements for spatially modulating the liquid crystal orientation change include: different techniques for spatially modulating the electric field, for example described in commonly assigned U.S. Provisional Patent application 61/289,995 filed 23 Dec. 2009 which is incorporated herein by reference; different techniques for spatially modulating the liquid crystal orientation such as polymer dispersion, for example described in co-pending commonly assigned International Patent Application WO 2010/006,420 claiming priority from U.S. Provisional Application 61/080,493 filed 14 Jul. 2008, International Patent Application WO 2010/006,419 entitled "Surface Programming Method And Light Modulator Devices Made Thereof" filed 14, Jun. 2009 which are incorporated herein by reference; and techniques providing spatially programmed alignment layers, for example described in International Patent Application WO 2007/098,602 entitled "Method and Apparatus for Spatially Modulated Electric Field Generation and Electo-Optical Tuning using Liquid Crystals" filed 2 Mar. 2007 which is incorporated herein by reference.

Figure 31:
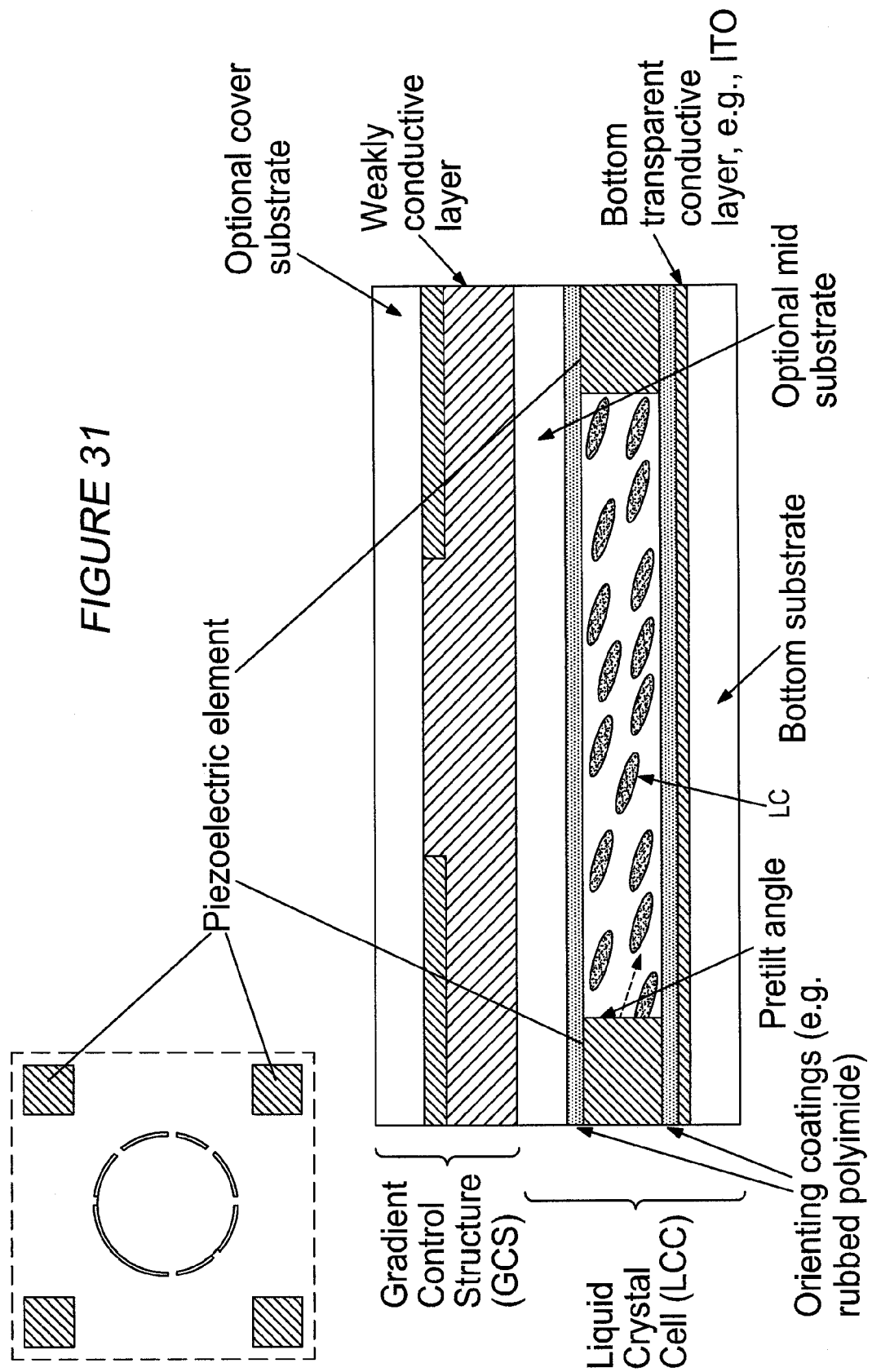
FIG. 31 illustrates a side sectional view of a tunable liquid crystal lens with an inset top view of a top, hole patterned electrode with additional piezoelectric elements placed between substrates of the liquid crystal cell in corners thereof according to an embodiment.

FIG. 31 illustrates a side sectional view of a tunable liquid crystal lens with an inset top view of a top, hole patterned electrode with additional piezoelectric elements placed between substrates of the liquid crystal cell in corners thereof. Piezo elements can be deposited on the substrate during fabrication of the lens device. Alternatively, closed, fluid filled cells can be controllably heated to expand and cause the desired tilt in the spacing between the substrates. It will be appreciated that this technique for shifting the optical axis causes the introduction of an optical power differential (wedge) higher on one side compared to the other, and can be used independent of the manner in which liquid crystal orientation is provided to cause the lensing effect. Without limiting the invention, different arrangements for spatially modulating the liquid crystal orientation change include: different techniques for spatially modulating the electric field, for example described in commonly assigned U.S. Provisional Patent application 61/289,995 filed 23 Dec. 2009 which is incorporated herein by reference; different techniques for spatially modulating the liquid crystal orientation such as polymer dispersion, for example described in co-pending commonly assigned International Patent Application WO 2010/006420 claiming priority from U.S. Provisional Application 61/080,493 filed 14 Jul. 2008, International Patent Application WO 2010/006419 entitled "Surface Programming Method And Light Modulator Devices Made Thereof" filed 14, Jun. 2009 which are incorporated herein by reference; and techniques providing spatially programmed alignment layers, for example described in International Patent Application WO 2007/098,602 entitled "Method and Apparatus for Spatially Modulated Electric Field Generation and Electo-Optical Tuning using Liquid Crystals" filed 2 Mar. 2007 which is incorporated herein by reference.

While the proposed solution has been described with reference to a TLCL structure generally shown in FIGS. 4 and 5, preferably in FIG. 13A, the invention is not limited thereto; a variety of TLCL layered structures are disclosed, for example in co-pending commonly assigned U.S. Provisional Patent application 61/289,995 filed 23 Dec. 2009, co-pending commonly assigned International Patent Application WO 2010/006,420 claiming priority from U.S. Provisional Application 61/080,493 filed 14 Jul. 2008, International Patent Application WO 2010/006,419 entitled "Surface Programming Method and Light Modulator Devices Made Thereof" filed 14, Jun. 2009, and International Patent Application WO 2007/098,602 entitled "Method and Apparatus for Spatially Modulated Electric Field Generation and Electo-Optical Tuning using Liquid Crystals" filed 2 Mar. 2007 all of which are incorporated herein by reference. With respect to the conductivity considerations of the weakly conductive layer, the consideration presented herein with reference to FIG. 13A apply with respect to such single weakly conductive layer and coupled (bonded) weakly conductive layers.

Figure 32:
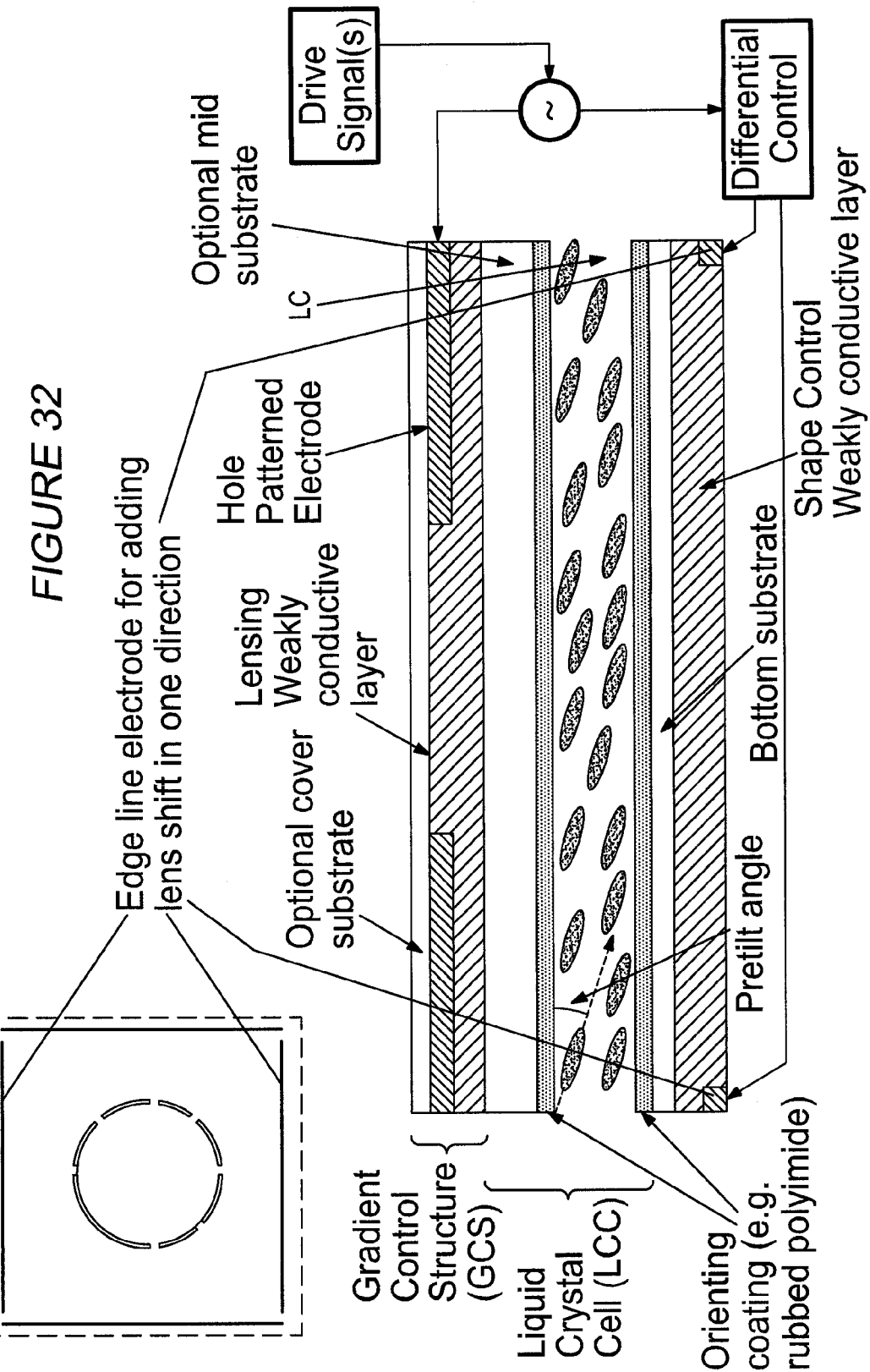
FIG. 32 illustrates a side sectional view of a tunable liquid crystal lens, with an inset top view of a top, having a hole patterned electrode employing a first frequency dependent weakly conductive layer in a TLC lens structure for lens formation, and a second frequency dependent weakly conductive layer employed separately from lens formation, for example to provide pan, tilt, beam steering, image stabilization, optical error correction in accordance with another embodiment of the proposed solution.

In particular, with reference to FIG. 32, the frequency control described herein above with respect to the use a frequency dependent weakly conductive layer can be employed in a TLC lens structure separately from lens formation, for example to provide pan, tilt, beam steering, image stabilization, optical error correction, etc. In the embodiment illustrated in FIG. 32 the bottom conductive transparent ITO electrode (423) is replaced, in accordance with the proposed solution, by a frequency dependent weakly conductive layer, and strip electrodes (shown), such as described herein above with reference to FIG. 29A; a segmented electrode (now shown), such as described herein above; or a shape control electrode structure configured to provide pan, tilt, beam steering, image stabilization, optical correction, etc. In operation, the top frequency dependent weakly conductive layer and the hole patterned electrode act on the electric field to create a (symmetric) lensing effect via the LC layer and in this sense the top weakly conductive layer is referred to as the "lensing weakly conductive layer". Separately, at the bottom frequency dependent weakly conductive layer and strip electrodes operate in accordance with a shape control drive signal. For example, if the strip electrodes are fed drive signal components having the same low frequency and same voltage amplitude, the large charge mobility causes the frequency dependent weakly conductive layer appear as a continuous electrode mimicking the flat conductive ITO electrode (423) and therefore the overall lensing effect is substantially equivalent to that provided by TLC lens structures described in FIGS. 4 and 5. However, by feeding opposed strip electrodes with different drive signal components, either different frequencies or different voltage amplitudes, the bottom frequency dependent weakly conductive layer, in electrical field terms, appears as a ramp (wedge) inducing a corresponding wage shaped distortion to the overall electric field. In this sense, the bottom frequency dependent weakly conductive layer operates as a shape control weakly conductive layer providing shape control. Depending on the bottom electrode structure used and the combination of drive signal components fed thereto, the shape control weakly conductive layer provides electric field (optical element) shaping, for example providing pan, tilt, beam steering, image stabilization, optical correction, etc. In this implementation, it can be appreciated that in the half TLCL structure shown in FIG. 32, to top and bottom weakly conductive layers have different functionality and that in each such half TLCL, conductivity variability between top and bottom weakly conductive layers is therefore less important. As well, in manufacturing full TLCL structures, the considerations and advantages described herein with respect to FIG. 13A apply only to the top lensing weakly conductive layers which couple (bonded). This extends also to patterned electrodes which combine into one central patterned electrode. If a full TLCL is manufactured using the layered structure illustrated in FIG. 13C with the shaping weakly conductive layer at the bottom of the layered structure opposite the stacked LC layers x and y, the conductivity variability between top and bottom weakly conductive layers is again less important because of the different functionalities of each weakly conductive layer.

Similarly, with reference to FIG. 33, the frequency control described herein above with respect to the use a frequency dependent weakly conductive layer can be exclusively employed in a TLC lens structure, separately from lens formation, to provide electric field shape control, for example for pan, tilt, beam steering, image stabilization, optical error correction, etc. In the embodiment illustrated in FIG. 33, a TLC lens structure employing a spatially uniform electric field to provide a lensing effect, for example as described in: International Patent Application WO 2007/098,602 entitled "Method and Apparatus for Spatially Modulated Electric Field Generation and Electo-Optical Tuning using Liquid Crystals" filed 2 Mar. 2007 (shown), co-pending commonly assigned International Patent Application WO 2010/006,420 claiming priority from U.S. Provisional Application 61/080, 493 filed 14 Jul. 2008 (not shown), or International Patent Application WO 2010/006,419 entitled "Surface Programming Method and Light Modulator Devices Made Thereof" filed 14, Jun. 2009 (not shown) all of which are incorporated herein by reference, is used with the electric field shape control structure described herein with respect to FIG. 32. In the embodiment illustrated in FIG. 33 lensing is provided, for example by a hidden electrode layer having the same index of refraction n throughout however having different $\in_1 \neq \in_2$ portions having a lenticular interface therebetween, which in the presence of a spatially uniform electric field provided by a top transparent conductive layer (e.g. ITO) and assuming a flat bottom conductive electrode causes the wave front of an incident beam to focus. Without limiting the invention, other layered structures can provide the lensing effect in a spatially uniform electric field. As with the embodiment illustrated in FIG. 32, the bottom conductive transparent ITO electrode (423) is replaced, in accordance with the proposed solution, by a frequency dependent weakly conductive layer, and strip electrodes (not shown), such as described herein above with reference to FIG. 29A; a segmented electrode (shown), such as described herein above; or a shape control electrode structure configured to provide pan, tilt, beam steering, image stabilization, optical correction, etc. In operation, the bottom frequency dependent weakly conductive layer and segmented electrodes operate in accordance with a shape control drive signal. For example, if the segmented electrodes are fed drive signal components having the same low frequency and same voltage amplitude, the large charge mobility causes the frequency dependent weakly conductive layer appear as a continuous electrode mimicking the flat conductive ITO electrode (423) and therefore the overall lensing effect is substantially equivalent to that provided by a TLC lens structure. However, by feeding electrode segments with different drive signal components, either different frequencies or different voltage amplitudes, the bottom frequency dependent weakly conductive layer, in electrical filed terms, appears as a spatially modulated potential surface inducing a corresponding spatially modulated distortion to the overall electric field. In this sense, the bottom frequency dependent weakly conductive layer operates as a shape control weakly conductive layer providing shape control. Depending on the bottom electrode structure used and the combination of drive signal components fed thereto, the shape control weakly conductive layer provides electric field (optical element) shaping, for example providing pan, tilt, beam steering, image stabilization, optical correction, etc. In this implementation, it is noted that a single weakly conductive layer is employed in each half TLCL providing only optical element shaping functionality. A full TLCL would employ either a single shaping weakly conductive layer on one half TLCL whereas the other half TLCL would simply have a thin transparent ITO electrode, or two shaping conductive layers. In the later case, the conductivity variability of the two shaping weakly conductive layers can be addressed during characterization/calibration. It is also envisioned that in a dual shaping weakly conductive layer implementation, each of the outer shaping weakly conductive layers are employed for different purposes. For example, without limiting the invention, the lower shaping weakly conductive layer can be employed for error correction/compensation and the top shaping weakly conductive layer can be employed for image stabilization.

While the invention has been shown and described with referenced to preferred embodiments thereof, it will be recognized by those skilled in the art that various changes in form and detail can be made therein without departing from the spirit and scope of the invention as defined by the appended claims.

What is claimed is:

1. A tunable lens optical device for controlling the propagation of light passing through the device using a dynamically-configured effective electrode geometry, said optical device comprising:
    a liquid crystal layer configured to pass said light therethrough, optical properties of the liquid crystal layer controlling said light propagation;
    an electrode system arranged to generate an electric field acting on said liquid crystal layer the electrode system including a segmented ring electrode; and
    an electrical signal generator for generating a drive signal at a plurality of different frequencies and applying the drive signal to the electrode system to generate said electric field, the electrical signal generator being further configured to apply a separate drive signal component of the drive signal to each electrode segment of the segmented ring electrode, each drive signal component having a corresponding frequency;
    wherein:
    said electrode system comprises a frequency dependent material interacting with the electric field, the frequency dependent material having a charge mobility therein that varies with a frequency of the drive signal such that a spectral content of said drive signal dynamically configures an effective electrode geometry of said electrode system whereby a spatial profile of the electric field varies as a function of said spectral content to alter the optical properties of the liquid crystal layer; and
    said electrode system is configured to controllably move an optical axis of the lens created in said liquid crystal layer by said electric field, driving said segmented ring electrode providing a parametric lens.

2. The device as claimed in claim 1, further comprising a controller for dynamically adjusting said electrical signal generator.

3. The device as claimed in claim 2, further comprising a vibration sensor, wherein said controller adjusts optical axis position in response to vibration.

4. The device as claimed in claim 3, wherein said vibration sensor is an accelerometer.

5. The device as claimed in claim 3, wherein said vibration sensor is an image analyzer for analyzing a position of an image captured by an image sensor.

6. The device as claimed in claim 1, the segmented ring electrode comprising six or more electrode segments.

7. The device as claimed in claim 1, each drive signal component further having a corresponding voltage, wherein different voltages are applied to different electrode segments, driving said segmented ring electrode providing a parametric lens.

8. The device as claimed in claim 1, said electrode system further comprising an arrangement of strip electrodes coupled to the frequency dependent material, wherein said electrical signal generator generates a drive signal component having a frequency and a voltage, said electrical signal generator being configured to apply to each strip electrode said drive signal component.

9. The device as claimed in claim 8, said arrangement of strip electrodes is configured to operate in combination with said ring electrode via the same frequency dependent material.

10. The device as claimed in claim 9, said arrangement of strip electrodes and corresponding frequency dependent material operate as a planar uniform electrode when substantially similar low frequency drive signal components are applied by the electrical signal generator.

11. The device as claimed in claim 9, said arrangement of strip electrodes and corresponding frequency dependent material operate as a potential ramp electrode when dissimilar drive signal components of moderate to high frequencies are applied by the electrical signal generator, said potential ramp electrode altering said spatial profile of the electric field to provide beam steering.

12. The device as claimed in claim 8, said arrangement of strip electrodes is configured to operate independently of said ring electrode, said arrangement of strip electrodes being coupled to an additional frequency dependent material.

13. The device as claimed in claim 12, wherein said additional frequency dependent material and said arrangement strip electrodes are not involved in modulating said electric field to provide lensing.

14. A tunable lens optical device for controlling the propagation of light, said optical device comprising:
    a liquid crystal layer containing a liquid crystal;
    an electric field source configured to generate a spatially non-uniform electric field acting on said liquid crystal layer via an electrode system including a segmented ring electrode, such that an optical axis position of the lens can be controlled; and
    a variable frequency electrical drive signal having a plurality of different frequencies that can be applied by said electric field source to the electrode system to generate said electric field, the electrical field source being further configured to apply a separate drive signal component of the drive signal to each electrode segment of the segmented ring electrode, each drive signal component having a corresponding frequency such that a spectral content of said drive signal dynamically configures an effective electrode geometry of said electrode system;
    wherein the liquid crystal layer has a charge mobility that varies as a function of a frequency of said drive signal, and said liquid crystal shapes said electric field to be more spatially uniform so as to provide a desired light propagation behaviour.

* * * * *